(12) United States Patent
Ochiai et al.

(10) Patent No.: US 12,080,893 B2
(45) Date of Patent: Sep. 3, 2024

(54) CONDUCTOR, POWER STORAGE DEVICE, ELECTRONIC DEVICE, AND METHOD FOR FORMING CONDUCTOR

(71) Applicant: Semiconductor Energy Laboratory Co., Ltd., Atsugi (JP)

(72) Inventors: Teruaki Ochiai, Atsugi (JP); Takahiro Kawakami, Atsugi (JP); Takuya Miwa, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/202,523

(22) Filed: May 26, 2023

(65) Prior Publication Data

US 2023/0299305 A1    Sep. 21, 2023

Related U.S. Application Data

(60) Division of application No. 17/731,538, filed on Apr. 28, 2022, now Pat. No. 11,699,794, which is a (Continued)

(30) Foreign Application Priority Data

Jun. 25, 2015   (JP) ................. 2015-128002

(51) Int. Cl.
  *H01M 4/00* (2006.01)
  *H01G 11/36* (2013.01)
  (Continued)

(52) U.S. Cl.
  CPC ............ *H01M 4/663* (2013.01); *H01G 11/36* (2013.01); *H01G 11/38* (2013.01); *H01G 11/50* (2013.01);
  (Continued)

(58) Field of Classification Search
  CPC ...... H01M 4/663; H01M 4/131; H01M 4/587; H01G 11/50; Y02E 10/70; Y02T 10/70
  See application file for complete search history.

(56) References Cited

U.S. PATENT DOCUMENTS 8,883,351 B2    11/2014   Todoriki et al.
9,219,280 B2    12/2015   He et al.
(Continued)

FOREIGN PATENT DOCUMENTS

CN       102583340 A    7/2012
EP         2518103 A   10/2012
(Continued)

OTHER PUBLICATIONS

Bagri.A et al., "Structural evolution during the reduction of chemically derived graphene oxide", Nature Chemistry, Jun. 6, 2010, vol. 2, No. 7, pp. 581-587.

(Continued)

*Primary Examiner* — Cynthia H Kelly
*Assistant Examiner* — Monique M Wills
(74) *Attorney, Agent, or Firm* — Eric J. Robinson; Robinson Intellectual Property Law Office, P.C.

(57) ABSTRACT

A novel electrode is provided. A novel power storage device is provided. A conductor having a sheet-like shape is provided. The conductor has a thickness of greater than or equal to 800 nm and less than or equal to 20 μm. The area of the conductor is greater than or equal to 25 mm$^2$ and less than or equal to 10 m$^2$. The conductor includes carbon and oxygen. The conductor includes carbon at a concentration of higher than 80 atomic % and oxygen at a concentration of higher than or equal to 2 atomic % and lower than or equal to 20 atomic %.

14 Claims, 61 Drawing Sheets

Related U.S. Application Data continuation of application No. 16/936,566, filed on Jul. 23, 2020, now Pat. No. 11,322,746, which is a division of application No. 15/189,517, filed on Jun. 22, 2016, now Pat. No. 10,784,516.

(51) Int. Cl.

| | | |
|---|---|---|
| *H01G 11/38* | (2013.01) | |
| *H01G 11/50* | (2013.01) | |
| *H01G 11/86* | (2013.01) | |
| *H01M 4/131* | (2010.01) | |
| *H01M 4/36* | (2006.01) | |
| *H01M 4/587* | (2010.01) | |
| *H01M 4/62* | (2006.01) | |
| *H01M 4/66* | (2006.01) | |
| *H01M 10/0525* | (2010.01) | |

(52) U.S. Cl.
CPC ............ *H01G 11/86* (2013.01); *H01M 4/131* (2013.01); *H01M 4/366* (2013.01); *H01M 4/587* (2013.01); *H01M 4/625* (2013.01); *H01M 10/0525* (2013.01)

(56) References Cited

U.S. PATENT DOCUMENTS

| | | | |
|---|---|---|---|
| 9,559,384 B2 | 1/2017 | Takahashi | |
| 9,645,454 B2 | 5/2017 | Naito et al. | |
| 10,038,221 B2 | 7/2018 | Takahashi | |
| 10,243,214 B2 | 3/2019 | Todoriki et al. | |
| 10,461,332 B2 | 10/2019 | Todoriki et al. | |
| 2001/0051125 A1 | 12/2001 | Watanabe et al. | |
| 2002/0012625 A1 | 1/2002 | Watanabe et al. | |
| 2003/0165745 A1 | 9/2003 | Watanabe et al. | |
| 2003/0185742 A1 | 10/2003 | Watanabe et al. | |
| 2006/0078799 A1 | 4/2006 | Watanabe et al. | |
| 2011/0111303 A1 | 5/2011 | Kung et al. | |
| 2011/0227000 A1 | 9/2011 | Ruoff et al. | |
| 2012/0214068 A1 | 8/2012 | Dai et al. | |
| 2012/0256138 A1 | 10/2012 | Suh et al. | |
| 2012/0261612 A1 | 10/2012 | Suh et al. | |
| 2012/0308891 A1 | 12/2012 | Todoriki et al. | |
| 2013/0052526 A1 | 2/2013 | Momo et al. | |
| 2013/0119321 A1 | 5/2013 | Lettow | |
| 2013/0143067 A1 | 6/2013 | Kim et al. | |
| 2013/0189592 A1 | 7/2013 | Roumi et al. | |
| 2013/0212879 A1 | 8/2013 | Ogino | |
| 2013/0266859 A1 | 10/2013 | Todoriki et al. | |
| 2014/0050910 A1 | 2/2014 | Mukherjee et al. | |
| 2014/0199580 A1* | 7/2014 | Yamazaki .......... H01M 10/4242 429/158 |
| 2015/0180073 A1 | 6/2015 | Frost et al. | |
| 2015/0360477 A1 | 12/2015 | Khe et al. | |
| 2017/0047588 A1 | 2/2017 | Mukherjee et al. | |
| 2019/0221848 A1 | 7/2019 | Todoriki et al. | |
| 2020/0052299 A1 | 2/2020 | Todoriki et al. | |
| 2020/0274165 A1 | 8/2020 | Todoriki et al. | |
| 2020/0350585 A1 | 11/2020 | Todoriki et al. | |
| 2023/0378473 A1 | 11/2023 | Todoriki et al. | |

FOREIGN PATENT DOCUMENTS

| | | |
|---|---|---|
| EP | 2518805 A | 10/2012 |
| EP | 2787029 A | 10/2014 |
| EP | 2816078 A | 12/2014 |
| JP | 2000-058069 A | 2/2000 |
| JP | 2008-126088 A | 6/2008 |
| JP | 2012-009414 A | 1/2012 |
| JP | 2012-190738 A | 10/2012 |
| JP | 2013-030463 A | 2/2013 |
| JP | 2013-082606 A | 5/2013 |
| JP | 2013-514963 | 5/2013 |
| JP | 2013-140770 A | 7/2013 |
| JP | 2013-191827 A | 9/2013 |
| JP | 2014-200926 A | 10/2014 |
| JP | 2014-241283 A | 12/2014 |
| KR | 2010-0127577 A | 12/2010 |
| WO | WO-2011/057074 | 5/2011 |
| WO | WO-2012/165358 | 12/2012 |
| WO | WO-2013/047630 | 4/2013 |
| WO | WO-2014/009721 | 1/2014 |

OTHER PUBLICATIONS

Ishihara.T et al., "PF6-Intercalation into Graphitic Carbon in High Concentration LiPF6 Electrolyte for High Energy Density Dual Carbon Battery", 220th ECS Meeting Abstract, Oct. 9, 2011, p. 449, ECS.

* cited by examiner

201

202

100

100

FIG. 28A1 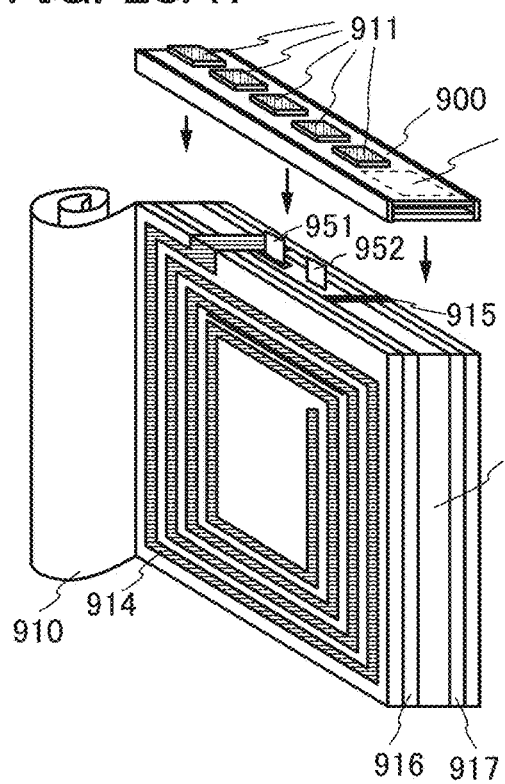
FIG. 28A2 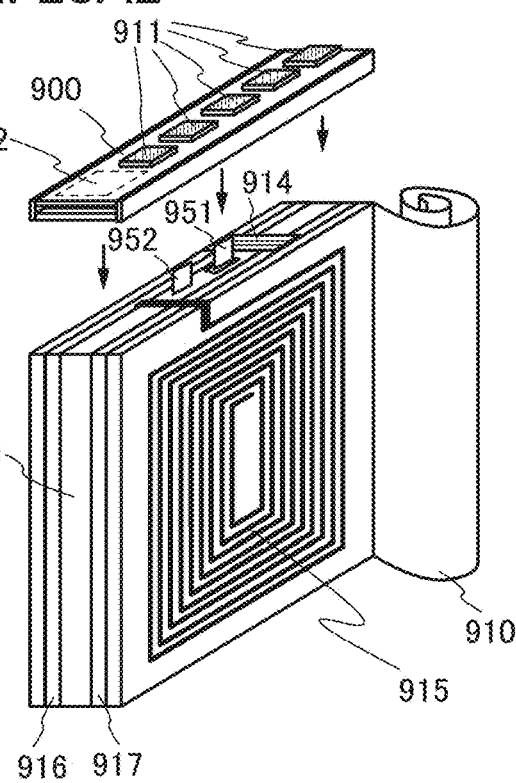
FIG. 28B1 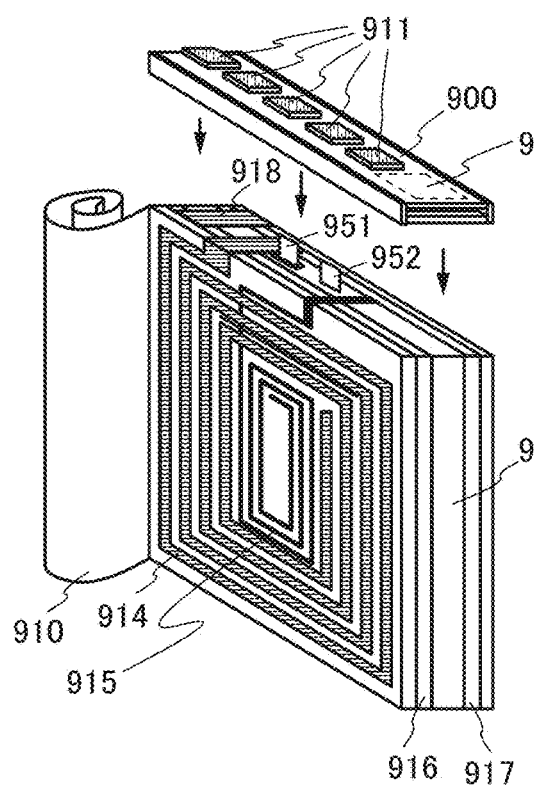
FIG. 28B2 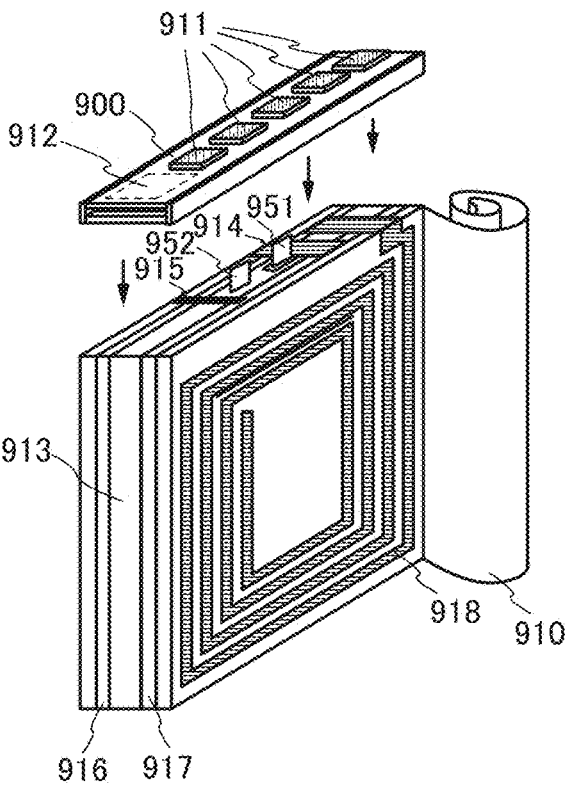

FIG. 41
281a

GO-1

5 μm

5 μm

CONDUCTOR, POWER STORAGE DEVICE, ELECTRONIC DEVICE, AND METHOD FOR FORMING CONDUCTOR

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power.

2. Description of the Related Art

In recent years, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

Graphene has been attracting a great deal of attention because of its excellent conductivity and the like, and a large-scale production method and the like have been searched. As described in Non-Patent Document 1, a compound obtained by reduction of graphene oxide (GO) is referred to as reduced GO (rGO) in some cases and the physical property thereof has been attracting attention.

An increase in the capacity of a power storage device has been needed year by year. For example, as described in Patent Document 1, development has been advanced in order to increase the capacity of a power storage device by devising its electrode.

REFERENCE

Patent Document

[Patent Document 1] Japanese Published Patent Application No. 2012-009414.

Non-Patent Document

[Non-Patent Document 1]
A. Bagri et al., "Structural evolution during the reduction of chemically derived graphene oxide", NATURE CHEMISTRY, vol. 2, 2010, pp. 581-587.

SUMMARY OF THE INVENTION

An object of one embodiment of the present invention is to provide a novel electrode. Another object of one embodiment of the present invention is to provide a novel power storage device.

Another object of one embodiment of the present invention is to provide an electrode with a high capacity. Another object of one embodiment of the present invention is to provide a power storage device with high energy density.

Another object of one embodiment of the present invention is to provide a flexible power storage device. Another object of one embodiment of the present invention is to provide a long-life power storage device. Another object of one embodiment of the present invention is to provide a highly reliable power storage device. Another object of one embodiment of the present invention is to provide a power storage device in which a reduction in characteristics is small.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a conductor. The conductor has a sheet-like shape. The conductor has a thickness of greater than or equal to 800 nm and less than or equal to 20 μm. The area of the conductor is greater than or equal to 25 mm$^2$ and less than or equal to 10 m$^2$. The conductor includes carbon and oxygen. The conductor includes a portion including carbon at a concentration of higher than 80 atomic % and oxygen at a concentration of higher than or equal to 2 atomic % and lower than or equal to 20 atomic %.

In the above structure, the conductor preferably includes a portion whose electrical conductivity is greater than or equal to 0.1 S/cm and less than or equal to $10^7$ S/cm.

In any of the above structures, the conductor preferably includes an aggregate of graphene. Here, "including an aggregate of graphene" means to include a plurality sheets of graphene or a plurality of graphene compounds.

In the above structure, the conductor includes a plurality of sheets of graphene including two or more and one hundred or less layers, and the length in a direction of a long side of graphene is preferably greater than or equal to 50 nm and less than or equal to 100 μm. Furthermore, in each of the above structures, the interlayer distance between adjacent layers in the graphene is preferably greater than or equal to 0.335 nm and less than or equal to 0.7 nm.

In any of the above structures, the concentration of oxygen included in the conductor is preferably measured by X-ray photoelectron spectroscopy. Furthermore, in any of the above structures, the conductor preferably includes a bond of carbon and oxygen.

In any of the above structures, the conductor preferably includes at least one of an epoxy group, a carbonyl group, and a hydroxyl group bonded to carbon.

In any of the above structures, the conductor preferably includes sulfur at a concentration of higher than or equal to 10 ppm and lower than or equal to 5%.

Another embodiment of the present invention is a power storage device. The power storage device includes a positive electrode and a negative electrode. One of the positive electrode and the negative electrode includes the conductor described in any one of the above structures and a layer containing an active material. The layer is in contact with at least one of surfaces of the conductor.

Another embodiment of the present invention is a power storage device. The power storage device includes a positive electrode and a negative electrode. The positive electrode includes the conductor described in any one of the above structures.

Another embodiment of the present invention is a power storage device. The power storage device includes a positive electrode and a negative electrode. The positive electrode includes the conductor described in any one of the above structures and a layer. The layer is in contact with at least one of surfaces of the conductor. The layer includes a positive electrode active material.

In the power storage device described in any one of the above structures, it is preferable that the conductor be stacked over a separator and wound.

Another embodiment of the present invention is an electronic device including the power storage device described in any one of the above structures.

The conductor of one embodiment of the present invention can be formed in such a manner that a plurality of graphene compounds are stacked so as to partly overlap with each other. A sheet-like graphene compound in which a plurality of graphene compounds partly overlap with each other is referred to as a graphene compound sheet in some cases.

For example, the conductor of one embodiment of the present invention can be formed in such a manner that a sheet having a thickness of greater than or equal to 50 nm and an area of greater than or equal to 1 mm$^2$ is formed by stacking a plurality of sheets of graphene oxide so as to partly overlap with each other, and the sheet is subjected to reduction treatment. In the conductor, the concentration of carbon is preferably higher than 80 atomic %, the concentration of oxygen is preferably higher than or equal to 2 atomic % and lower than or equal to 20 atomic %, and the interlayer distance is preferably greater than or equal to 0.335 nm and less than or equal to 0.7 nm.

Another embodiment of the present invention is a method for forming a conductor. In the method, a sheet having a thickness of greater than or equal to 50 nm and an area of greater than or equal to 1 mm$^2$ is formed by stacking a plurality of sheets of graphene oxide so as to partly overlap with each other and subjected to reduction treatment. In the conductor, the concentration of carbon is preferably higher than 80 atomic %, the concentration of oxygen is preferably higher than or equal to 2 atomic % and lower than or equal to 20 atomic %, and the interlayer distance is preferably greater than or equal to 0.335 nm and less than or equal to 0.7 nm.

One embodiment of the present invention can provide a novel electrode. Another embodiment of the present invention can provide a novel power storage device.

Another embodiment of the present invention can provide an electrode with a high capacity. Another embodiment of the present invention can provide a power storage device with high energy density.

Another embodiment of the present invention can provide a flexible power storage device. Another embodiment of the present invention can provide a power storage device with a long lifetime. Another embodiment of the present invention can provide a highly reliable power storage device. Another embodiment of the present invention can provide a power storage device in which a reduction in characteristics is small.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 28A1, 28A2, 28B1, and 28B2 each illustrate an example of a power storage system.

FIG. 41 is a photograph showing one embodiment of the present invention.

DETAILED DESCRIPTION OF THE INVENTION

Figure 1A:
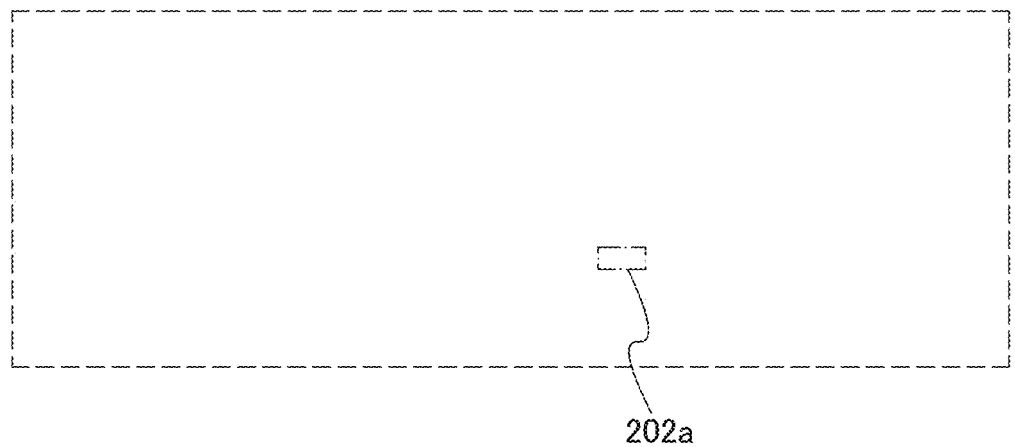
FIGS. 1A and 1B are diagrams illustrating part of a conductor.

Hereinafter, embodiments and examples of the present invention will be described in detail with reference to the accompanying drawings. However, the present invention is not limited to the description of the embodiments and examples and it is easily understood by those skilled in the art that the mode and details can be changed variously. Accordingly, the present invention should not be interpreted as being limited to the description of the embodiments below.

Note that in drawings used in this specification, the sizes, thicknesses, and the like of components such as films, layers, substrates, regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

Here, a charge rate and a discharge rate of a power storage battery will be described. For example, in the case of charging a secondary battery with a certain capacity X[Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

In this embodiment, a graphene compound of one embodiment of the present invention and a conductor including the graphene compound of one embodiment of the present invention are described.

Graphene has carbon atoms arranged in one atomic layer. A π bond exists between the carbon atoms. Graphene including two or more and one hundred or less layers is referred to as multilayer graphene in some cases. Graphene and multilayer graphene has a length of the major axis in a surface or a length in the longitudinal direction of greater than or equal to 50 nm and less than or equal to 100 μm or greater than or equal to 800 nm and less than or equal to 50 μm, for example.

In this specification and the like, a compound including graphene or multilayer graphene as a basic skeleton is referred to as graphene compound. The graphene compound includes graphene and multilayer graphene.

The graphene compound is described in detail below.

The graphene compound is, for example, a compound in which graphene or multilayer graphene is modified with an atom other than a carbon atom or an atomic group including an atom other than a carbon atom. Alternatively, the graphene compound may be a compound in which graphene or multilayer graphene is modified with an atomic group mainly including carbon, such as an alkyl group or an alkylene group. Note that an atomic group with which graphene or multilayer graphene is modified is referred to as a substituent, a functional group, a characteristic group, or the like in some cases. In this specification and the like, the term "being modified" means that an atom other than a carbon atom or an atomic group including an atom other than a carbon atom is introduced into graphene, multilayer graphene, a graphene compound, or graphene oxide (to be described later) by a substitution reaction, an addition reaction, or the other reaction.

Note that a front surface and a back surface of graphene may be modified with different atoms or different atomic groups. In multilayer graphene, layers may be modified with different atoms or different atomic groups.

As an example of graphene modified with the atom or the atomic group described above, graphene or multilayer graphene modified with oxygen or a functional group containing oxygen can be given. Here, examples of a functional group containing oxygen include an epoxy group, a carbonyl group such as a carboxy group, a hydroxyl group, and a lactol group. A graphene compound modified with oxygen or a functional group containing oxygen is referred to as graphene oxide in some cases. In this specification, graphene oxide includes multilayer graphene oxide.

Next, an example of a method for forming graphene oxide is described. Graphene oxide can be obtained by oxidation of graphene or multilayer graphene described above. Alternatively, graphene oxide can be obtained by separation of layers of graphite oxide. Graphite oxide can be obtained by oxidation of graphite. Here, graphene oxide may be further modified with the atom or the atomic group described above.

Graphene oxide can be formed by any of a variety of synthesis methods such as a Hummers method, a modified Hummers method, and oxidation of graphite.

For example, the Hummers method and the modified Hummers method are each a method for forming graphite oxide by oxidizing graphite such as flake graphite. The obtained graphite oxide is graphite which is oxidized in places and thus to which a functional group such as a carbonyl group, a carboxy group, a hydroxyl group, or a lactol group is bonded. In the graphite oxide, the crystallinity of the graphite is lost and the distance between layers is increased. Therefore, the layers can be easily separated by ultrasonic treatment or the like to obtain graphene oxide.

Here, an example of a method for forming graphene oxide by the modified Hummers method is described. A Hummers method is as follows: a sulfuric acid solution of potassium permanganate or the like is mixed into graphite powder to cause oxidation reaction; thus, a mixed solution containing graphite oxide is formed. Because of the oxidation of carbon in graphite, graphite oxide has a functional group such as an epoxy group, a carbonyl group, a carboxy group, or a hydroxyl group. Accordingly, the interlayer distance in graphite oxide is longer than the interlayer distance in graphite. Then, ultrasonic vibration is applied to the mixed solution containing the graphite oxide, so that the graphite oxide whose interlayer distance is long can be cleaved to separate graphene oxide and to form a dispersion liquid containing the graphene oxide.

When graphene oxide is formed by the modified Hummers method, the obtained graphene oxide includes an element such as sulfur or nitrogen in some cases, for example.

The concentration of sulfur contained in a graphene compound of one embodiment of the present invention is preferably 5% or lower, and further preferably 3% or lower, for example.

The graphene compound of one embodiment of the present invention includes sulfur at a concentration of higher than or equal to 10 ppm and lower than or equal to 5%, higher than or equal to 100 ppm and lower than or equal to 3%, or higher than or equal to 0.1% and lower than or equal to 3% in some cases, for example.

Here, the concentration of sulfur contained in the graphene compound can be measured by elementary analysis such as X-ray photoelectron spectroscopy (XPS), for example.

The graphene compound of one embodiment of the present invention includes nitrogen at a concentration of higher than or equal to 0.1% and lower than or equal to 3% in some cases, for example.

A compound that can be obtained by reducing graphene oxide is referred to as reduced graphene oxide (RGO) in some cases. Here, in some cases, RGO is expressed as "rGO" as described in Non-Patent Document 1. In RGO, in some cases, all oxygen atoms contained in the graphene oxide are not extracted and some oxygen atoms remain in a state where oxygen or an atomic group containing oxygen is bonded. In some cases, RGO includes a functional group, e.g., an epoxy group, a carbonyl group such as a carboxy group, or a hydroxyl group.

A graphene compound may have a sheet-like shape where a plurality of graphene compounds partly overlap each other. Such a graphene compound is referred to as a graphene compound sheet in some cases. The graphene compound sheet has, for example, an area with a thickness larger than or equal to 0.33 nm and smaller than or equal to 10 mm, or preferably larger than 0.34 nm and smaller than or equal to 10 µm. The graphene compound sheet may be modified with an atom other than carbon, an atomic group containing an atom other than carbon, an atomic group mainly composed of carbon such as an alkyl group, or the like. A plurality of layers in the graphene compound sheet may be modified with different atoms or atomic groups.

A graphene compound may have a five-membered ring composed of carbon atoms or a poly-membered ring that is a seven or more-membered ring composed of carbon atoms, in addition to a six-membered ring composed of carbon atoms. In the neighborhood of a poly-membered ring that is a seven or more-membered ring, a region through which an ion can pass may be generated. As an example of an ion, a lithium ion can be given. Furthermore, an ion of an alkali metal other than a lithium ion; an anion and a cation used for an electrolyte; an anion and a cation contained in an electrolyte solution; and the like can be given.

A plurality of graphene compounds may be gathered to form a sheet-like shape. A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

A graphene compound may also be used as an insulator. For example, a graphene compound sheet may be used as a sheet-like insulator. Graphene oxide, for example, has a higher insulation property than a graphene compound that is not oxidized in some cases. A graphene compound modified with an atomic group may have an improved insulation property, depending on the type of the modifying atomic group.

Figure 3A:
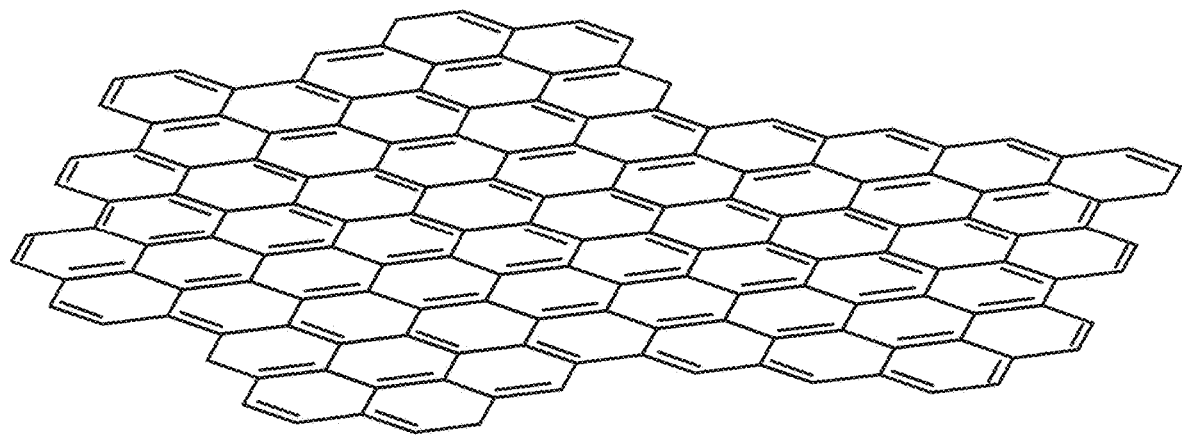
FIGS. 3A and 3B are diagrams each illustrating a graphene compound.
Figure 3B:
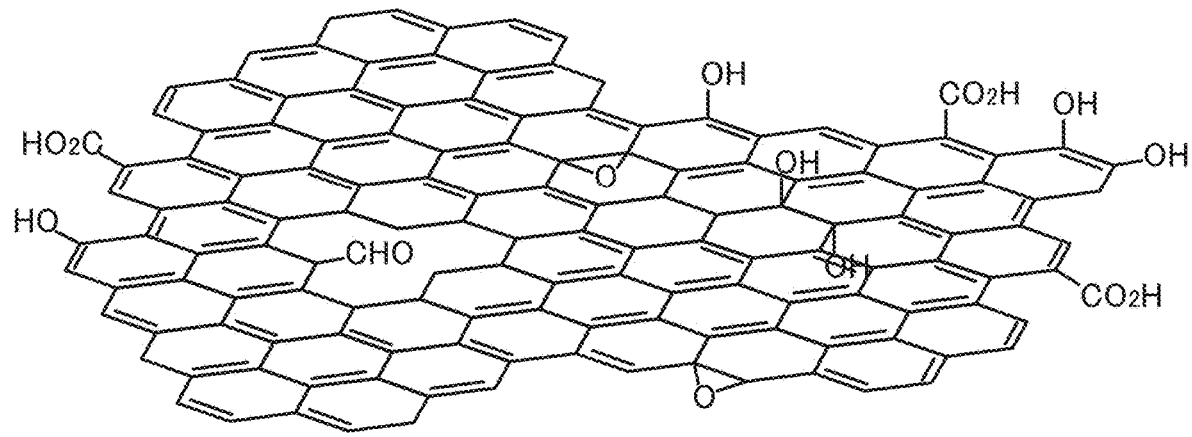

FIG. 3A is a schematic view illustrating single-layer graphene. FIG. 3B illustrates an example of graphene modified with functional groups such as an epoxy group, a carboxy group, and a hydroxyl group. Note that FIG. 3B is merely an example, and graphene modified with functional groups is not limited to this example.

<Conductor>

Figure 2:
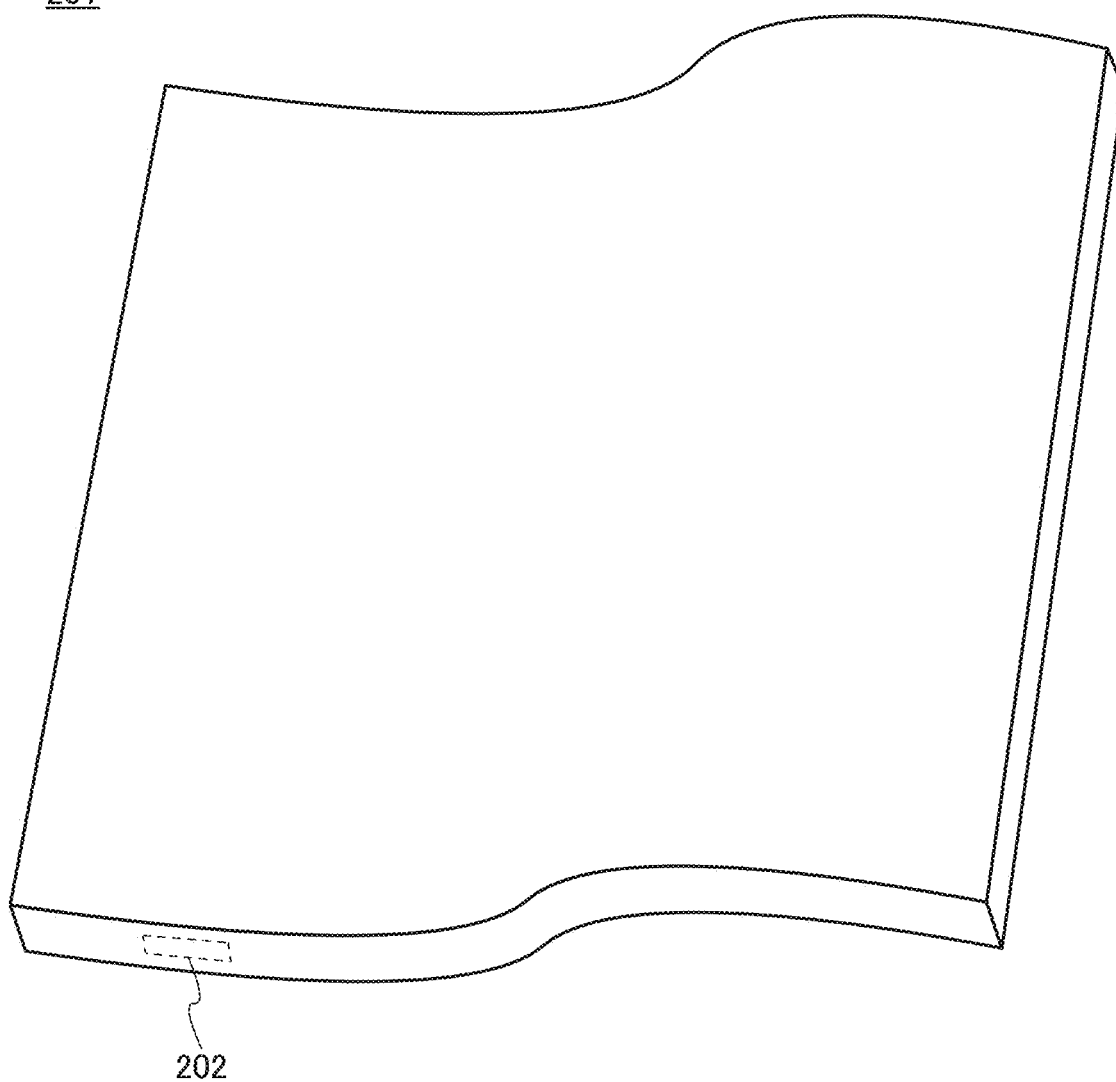
FIG. 2 is a diagram illustrating a conductor of one embodiment of the present invention.

FIG. 2 is an external view of a conductor 201 of one embodiment of the present invention. The conductor 201 preferably has a sheet-like shape.

The conductor 201 preferably includes a graphene compound.

The thickness of the conductor 201 is greater than or equal to 0.33 nm and less than or equal to 100 μm, greater than or equal to 50 nm and less than or equal to 100 μm, or greater than or equal to 800 nm and less than or equal to 20 μm, for example.

The area of the conductor 201 is larger than or equal to 1 mm$^2$ and smaller than or equal to 100 m$^2$, larger than or equal to 25 mm$^2$ and smaller than or equal to 10 m$^2$, or larger than or equal to 100 mm$^2$ and smaller than or equal to 3 m$^2$, for example.

Figure 1B:
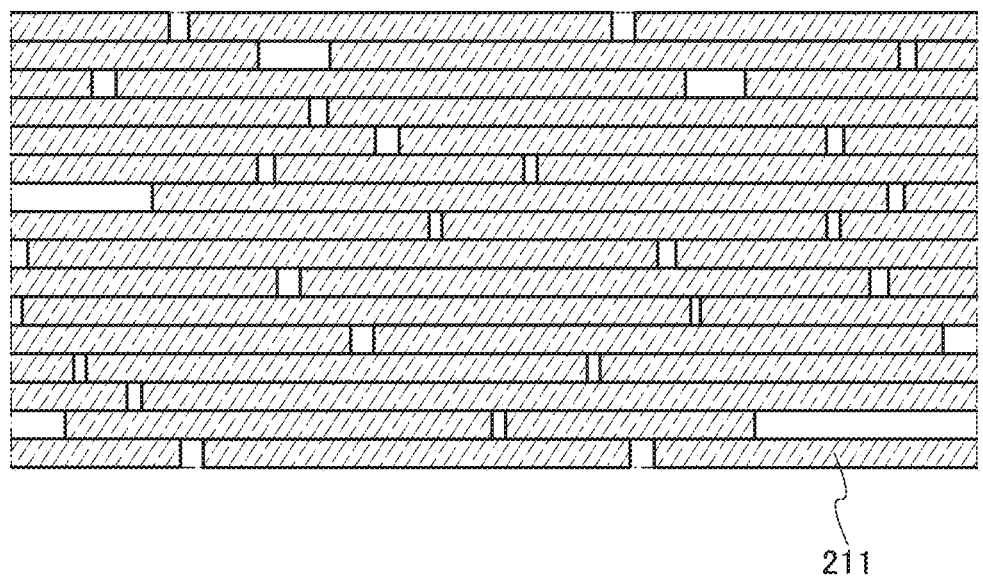

The conductor 201 is described in detail below. A region 202 surrounded by a dashed line in FIG. 2 is part of a cross section of the conductor 201. FIG. 1A is an enlarged view of the region 202. FIG. 1B is an enlarged view of a region 202a illustrated in FIG. 1A. It is preferable that the region 202a include a plurality of graphene compounds 211 and that the plurality of graphene compounds 211 partly overlap with each other. A sheet having one sheet-like shape formed of a plurality of graphene compounds that partly overlap with each other is referred to as a graphene compound sheet in some cases. A graphene compound sheet is preferably used as the conductor 201.

The length of one side (also referred to as a flake size) of the graphene compound is greater than or equal to 50 nm and less than or equal to 100 μm, preferably greater than or equal to 800 nm and less than or equal to 20 μm.

In a graphene compound sheet in which a plurality of graphene compounds overlap with each other, a region through which an ion can pass between adjacent graphene compounds may be generated, for example. Accordingly, a graphene compound sheet may have high ionic conductivity. A graphene compound sheet may adsorb an ion easily.

It is considered that a graphene compound sheet in which a plurality of graphene compounds overlap with each other may be changed in shape in the case where external force is applied such that graphene compounds overlapping in a planar manner slide on each other and thus less likely to be cracked.

Figure 61:
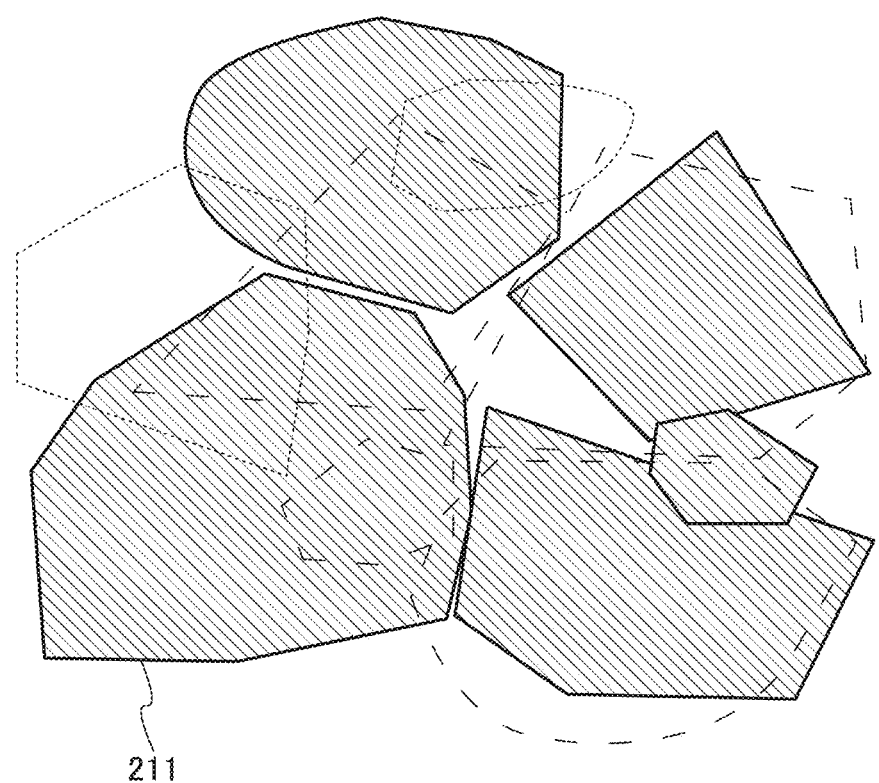
FIG. 61 is a top view illustrating one embodiment of the present invention.

FIG. 61 illustrates an example of a top view illustrating part of the conductor 201. FIG. 61 illustrates an example of a state in which the plurality of graphene compounds 211 overlap with each other. Thus, a surface of the conductor 201 may have a step corresponding to the thickness of the graphene compound. Furthermore, the surface of the conductor 201 may have a region which is substantially surrounded by a step and flatter than the step. The area of the region may correspond to the area of the graphene compound.

Figure 4A:
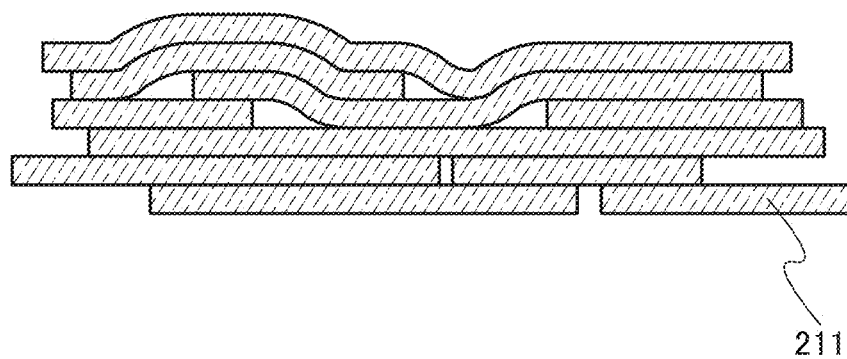
FIGS. 4A and 4B are diagrams each illustrating part of a conductor of one embodiment of the present invention.
Figure 4B:
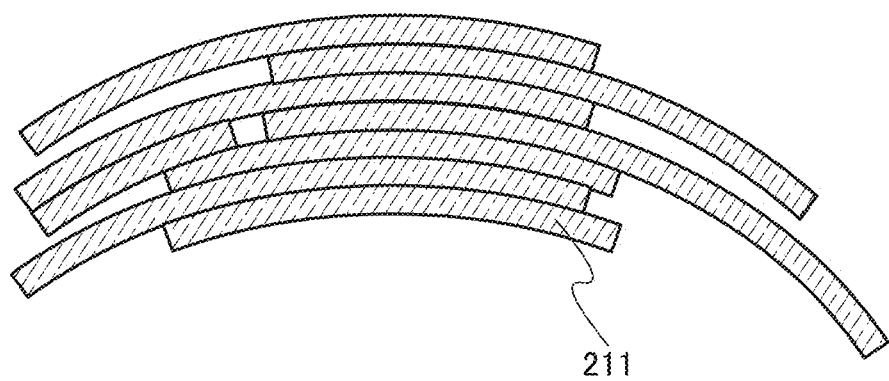

FIGS. 4A and 4B each illustrate an example of the region 202a different from the region 202a in FIG. 1B.

The conductor 201 can be flexible and likely to be changed in shape by including a graphene compound. The conductor 201 may have higher mechanical strength by including a graphene compound.

The conductor 201 can have higher conductivity by including graphene or multilayer graphene as a graphene compound.

The electrical conductivity of the conductor 201 of one embodiment of the present invention is preferably greater than or equal to 0.1 S/cm and less than or equal to 10$^7$ S/cm, further preferably greater than or equal to 1 S/cm and less than or equal to 10$^6$ S/cm, and still further preferably greater than or equal to 10 S/cm and less than or equal to 10$^6$ S/cm. In the case where the conductor 201 has a sheet-like shape, the electrical conductivity of the conductor 201 can be measured by a four-terminal method in which terminals are touched to a sheet surface.

An example of the interlayer distance in a graphene compound 211 included in the conductor 201 is described. The interlayer distance in the graphene compound 211 is, for example, longer than or equal to 0.335 nm and shorter than or equal to 0.7 nm, longer than 0.34 nm and shorter than or equal to 0.6 nm, longer than 0.34 nm and shorter than or equal to 0.5 nm, or longer than 0.34 nm and shorter than 0.44 nm. Examples of a method for calculating the interlayer distance in the graphene compound 211 include XRD and TEM.

In observation with a TEM, a small region, e.g.: a several-nanometer to several-micrometer square region, is observed. In XRD evaluation, average data on a larger region can be evaluated in some cases.

Next, the proportion of oxygen included in the conductor 201 can be measured by X-ray photoelectron spectroscopy (XPS), EDX, or the like. The proportion of oxygen included in the conductor 201 which is measured by XPS is higher than or equal to 2 atomic % and lower than or equal to 20 atomic %, preferably higher than or equal to 2 atomic % and lower than or equal to 11 atomic %, and further preferably higher than or equal to 3 atomic % and lower than or equal to 10 atomic %, with respect to the whole conductor 201. In the case where the conductor 201 is analyzed by XPS and the spectrum of binding energy of carbon corresponding to C1s is subjected to waveform separation, the proportion of peaks indicating sp$^2$ with respect to the whole spectrum of C1s can be estimated as an area ratio. The proportion of sp$^2$ in the conductor 201 is preferably higher than or equal to 50% and lower than or equal to 90% with respect to the whole spectrum of C1s.

The proportion of carbon included in the conductor 201 is preferably higher than 80% with respect to the whole conductor 201. The proportion of carbon can be measured by XPS, EDX, or the like, for example.

The proportion of oxygen in the graphene compound 211 included in the conductor 201, which is measured by XPS, is higher than or equal to 2 atomic % and lower than or equal to 20 atomic %, preferably higher than or equal to 2 atomic % and lower than or equal to 11 atomic %, and further preferably higher than or equal to 3 atomic % and lower than or equal to 10 atomic %, with respect to the whole conductor 201. In a bond of carbon in the graphene compound 211, the proportion of a double bond of carbon is preferably higher than or equal to 50% and lower than or equal to 90%, for example. In the case where the proportion of a double bond of carbon is analyzed by XPS, for example, the spectrum of binding energy of carbon corresponding to C1s is subjected to waveform separation, so that the proportion of peaks indicating sp$^2$ with respect to the whole spectrum of C1s can be estimated as an area ratio in some cases. Alternatively, in the case where a $^{13}$C NMR spectrum is evaluated, a peak indicating a double bond of carbon in a chemical shift of 130 ppm to 140 ppm or in the vicinity thereof can be observed, for example. Alternatively, in the case where a $^{13}$C NMR spectrum is evaluated, a peak indicating a C—O—C bond in a chemical shift of 50 ppm to 60 ppm or in the vicinity thereof or a peak indicating a bond of carbon and a hydroxyl group in a chemical shift of 70 ppm to 80 ppm or in the vicinity thereof can be observed, for example. The peaks indicating sp$^2$ may be obtained as the proportion of the area of the peak indicating the double bond of carbon with respect to the area of all peaks indicating a bond of carbon which are observed by NMR, for example. For example, the peaks indicating $sp^2$ may be obtained as the proportion of the area of the peak indicating the double bond of carbon with respect to the area of all peaks in a range of −50 ppm to 250 ppm.

The proportion of carbon in the graphene compound 211 included in the conductor 201 is preferably higher than 80% with respect to the whole conductor 201, for example. The proportion of carbon can be measured by XPS, EDX, or the like, for example.

<Intercalation Compound>

An intercalation compound including molecules or ions between layers may be used as the graphene compound included in the conductor 201. In the case where the graphene compound is an intercalation compound, the electrical conductivity may be changed depending on the kind of a molecule or an ion included between layers. For example, the electrical conductivity of the graphene compound may be improved. The interlayer distance may be increased depending on the size and the content of a molecule or an ion included between the layers.

<Method for Forming Conductor>

An example of a method for forming the conductor 201 including the graphene compounds 211 is described below.

First, a graphene compound sheet 222 is formed. The graphene compound sheet 222 can be formed using a graphene compound as a raw material by a method such as a spray drying method or a coating method. Here, as an example, the graphene compound sheet 222 including graphene oxide is formed by a spray drying method using a graphene oxide dispersion liquid as a raw material. Here, at least part of the graphene oxide included in the graphene oxide dispersion liquid may be multilayer graphene oxide.

The graphene oxide dispersion liquid is used as a raw material, and a plurality of sheets of graphene oxide are formed over a plate by a spray drying method, so that the graphene compound sheet 222 including the graphene oxide can be obtained. Note that the spray drying method is suitable for manufacture of the graphene compound sheet of one embodiment of the present invention because the thickness of an obtained graphene compound sheet can be controlled in some cases by adjustment of the deposition time, the concentration of dispersion liquid, or the like. The obtained graphene compound sheet may be separated from the plate. As a solvent used for the graphene oxide dispersion liquid, a polar solvent is preferably used, and water, NMP, or the like can be used.

Figure 5A:
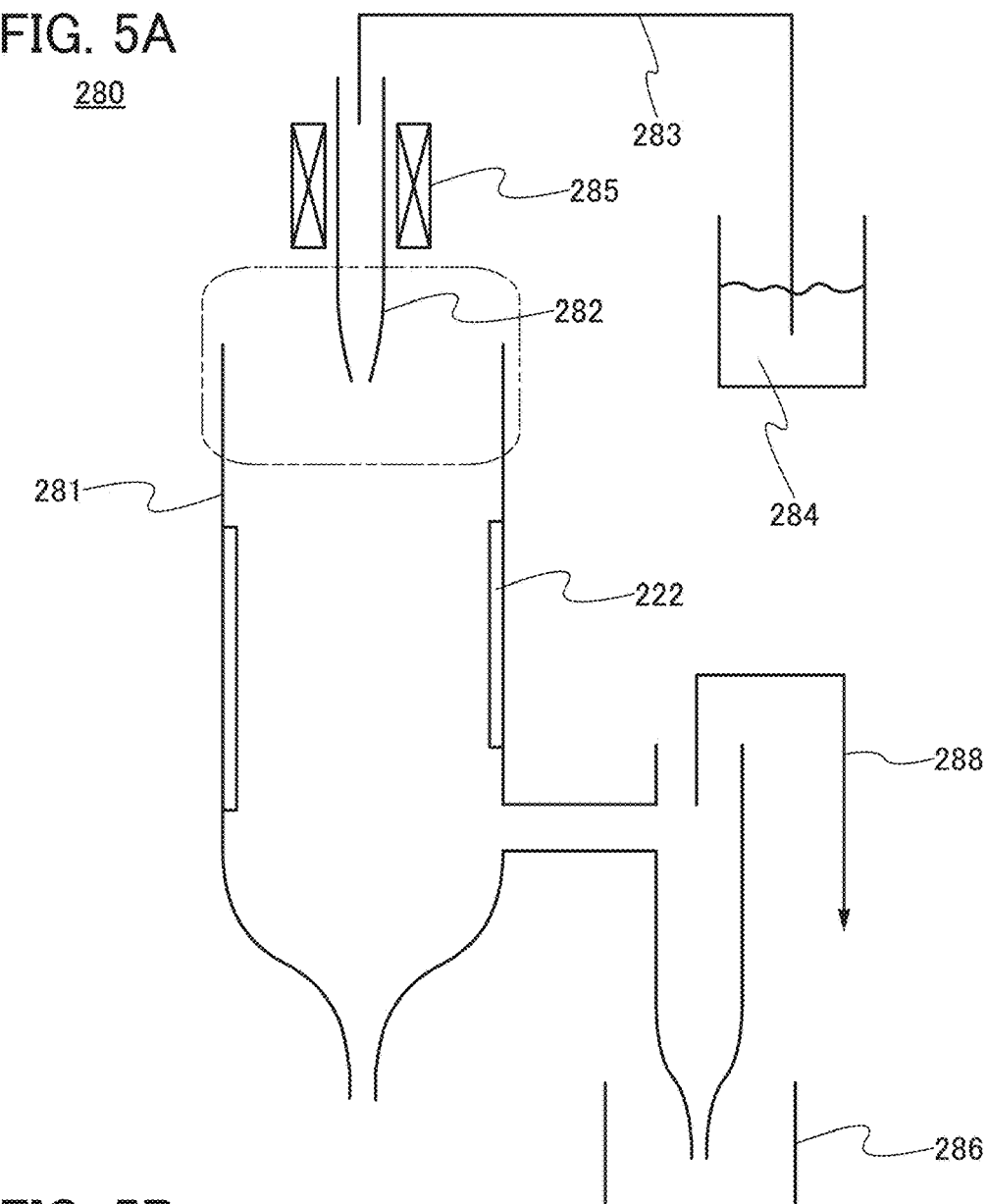
FIGS. 5A and 5B are diagrams each illustrating a spray dry apparatus.

FIG. 5A is a schematic view of a spray dry apparatus 280. The spray dry apparatus 280 includes a chamber 281 and a nozzle 282. Dispersion liquid 284 is supplied to the nozzle 282 through a tube 283. The dispersion liquid 284 is supplied from the nozzle 282 to the chamber 281 in the form of mist and dried in the chamber 281. The nozzle 282 may be heated with a heater 285. Here, a region of the chamber 281 which is close to the nozzle 282, for example, a region surrounded by dashed-two dotted line in FIG. 5A, is also heated with the heater 285. In the case of using graphene oxide dispersion liquid as the dispersion liquid 284, part of graphene oxide supplied from the graphene oxide dispersion liquid is collected as powder to a collection container 286 through the chamber 281, and another part of the graphene oxide is deposited as the graphene compound sheet 222 on a wall surface of the chamber 281. The air in the chamber 281 may be suctioned by an aspirator or the like through a path indicated by an arrow 288.

Figure 5B:
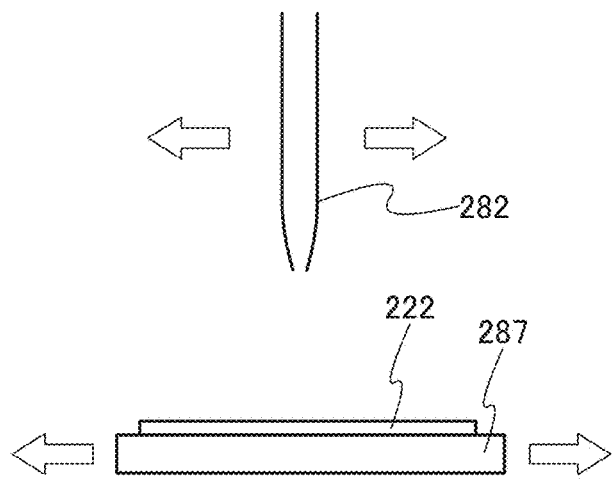

Alternatively, a substrate may be set in the chamber 281 and a graphene compound sheet may be deposited over the substrate. The substrate may have a flat-plate like shape or a curved surface. The substrate may be set parallel to the nozzle 282 or at a certain angle. For example, the substrate may be set perpendicular to the nozzle 282. FIG. 5B illustrates an example in which a substrate 287 is set perpendicular to the nozzle 282 and the graphene compound sheet 222 is deposited over the substrate. Here, the thickness uniformity in the sheet can be improved in some cases by deposition while the nozzle 282 is moved from side to side, for example. Alternatively, the substrate 287 may be moved from side to side. Further alternatively, both the nozzle 282 and the substrate 287 may be moved from side to side.

The formed graphene compound sheet 222 preferably has a peak in a range of greater than or equal to 7° and less than or equal to 10° in XRD evaluation, for example. Here, a "peak" means a maximum value and/or a local maximum value, for example.

Here, the interlayer distance in the graphene compound sheet 222 is greater than 0.8 nm and less than or equal to 2 nm, or greater than or equal to 0.85 nm and less than or equal to 1.3 nm.

In observation with a TEM, a small region, e.g.: a several-nanometer to several-micrometer square region, is observed. In XRD evaluation, average data on a larger region can be evaluated, for example.

The interlayer distance observed by TEM is smaller than that calculated from XRD evaluation in some cases. For example, the interlayer distance in the graphene compound sheet 222 which is observed by TEM is smaller than 0.5 nm in some cases.

Next, the graphene compound sheet 222 is subjected to reduction treatment to obtain the conductor 201. Here, the conductor 201 can be referred to as a graphene compound sheet. When the graphene compound sheet 222 is subjected to reduction treatment, graphene oxide included in the graphene compound sheet 222 is reduced, leading to higher conductivity. Accordingly, the conductor 201 has higher conductivity than the graphene compound sheet 222. Through the above process, the sheet-like conductor 201 is obtained. For example, the sheet-like conductor 201 may be processed by being cut so that the belt-shaped conductor 201 is obtained.

As a method for reduction treatment, chemical reduction in which reduction is performed with reaction with a reducing agent, thermal reduction in which heat treatment is performed, or the like can be used.

The chemical reduction are described. Examples of the reducing agent include ascorbic acid, hydrazine, dimethyl hydrazine, hydroquinone, sodium boron hydride ($NaBH_4$), lithium aluminum hydride ($LiAlH_4$), N,N-diethylhydroxylamine, and a derivative thereof. For example, ascorbic acid and hydroquinone are preferable to hydrazine and sodium tetrahydroborate in that they are safe owing to low reducing ability and utilized industrially with ease.

A polar solvent can be used as the solvent. Any material can be used for the polar solvent as long as it can dissolve the reducing agent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a mixed solution of ethanol and ascorbic acid, or a mixed solution of water, ascorbic acid, and lithium hydroxide can be used.

Protons are added to graphene oxide by ascorbic acid. Then, the graphene oxide is reduced by release of $H_2O$.

The reduction temperature in the chemical reduction is, for example, higher than or equal to room temperature and lower than or equal to 100° C., preferably higher than or equal to 40° C. and lower than or equal to 70° C. The treatment time can be longer than or equal to 3 minutes and shorter than or equal to 10 hours.

After the reduction treatment, cleaning may be performed. The washing is preferably performed using a solution given as the solvent contained in the reducing solution. The solution may be either the same as or different from the solvent contained in the reducing solution. After the cleaning, drying may be performed.

Next, thermal reduction is described. The step for thermal reduction is performed, for example, at a temperature higher than or equal to 50° C. and lower than 500° C., preferably higher than or equal to 120° C. and lower than or equal to 400° C. for 1 hour to 48 hours. The step for thermal reduction may be performed under a reduced pressure (in vacuum), in a reduction atmosphere, or under an atmospheric pressure. As a gas, air or an inert gas such as nitrogen or another gas may be used.

Here, the conductor 201 obtained after reduction preferably has a peak in a range of greater than or equal to 21° and less than or equal to 27° in XRD evaluation, for example.

Embodiment 2

In this embodiment, an example in which the conductor 201 of one embodiment of the present invention is applied to an electrode is described. The conductor 201 includes the graphene compound 211.

The conductor 201 of one embodiment of the present invention preferably serves as an active material of an electrode. That is, the conductor 201 preferably contributes to a charging reaction or a discharging reaction. When the conductor 201 of one embodiment of the present invention is used as an electrode of a power storage device, for example, the conductor 201 may contribute to an oxidation-reduction reaction. Here, oxidation-reduction reaction means donation and acceptance of electrons, for example. As a more specific example, an oxidation-reduction reaction means donation and acceptance of electrons by a reaction with an ion such as an anion or a cation.

Alternatively, the conductor 201 of one embodiment of the present invention can be used as an electrode of a capacitor in some cases by an electric double layer being formed over its surface. The surface area of the conductor of one embodiment of the present invention is larger than that of graphite in some cases, for example. When an electrode with a large surface area is used, the capacity of a power storage device can be increased.

The conductor 201 may also be used as a current collector of an electrode. For example, an electrode of one embodiment of the present invention may include the conductor 201 and an active material other than the conductor 201. When the conductor 201 is used as a current collector, the current collector can be thinned, leading to a reduction in weight of the electrode in some cases. Furthermore, the electrode may be likely to be changed in its shape.

An example of an electrode is described below.

Example 1 of Electrode

The inventors have found that the power storage device can have high capacity in the case where the conductor 201 of one embodiment of the present invention is used as an electrode of the power storage device. Although the detail is described in Examples to be described later, it was found that in the case where the conductor 201 was used as an electrode, the discharge capacity was as high as about 100 mAh/g in some cases. Here, the discharge capacity of the conductor 201 is preferably higher than or equal to 10 mAh/g, and further preferably higher than or equal to 40 mAh/g, for example.

An example in which the conductor 201 of one embodiment of the present invention is used as an electrode of a power storage device is described. The conductor 201 includes the graphene compound 211. The above embodiment can be referred to for the graphene compound 211.

Figure 6A:
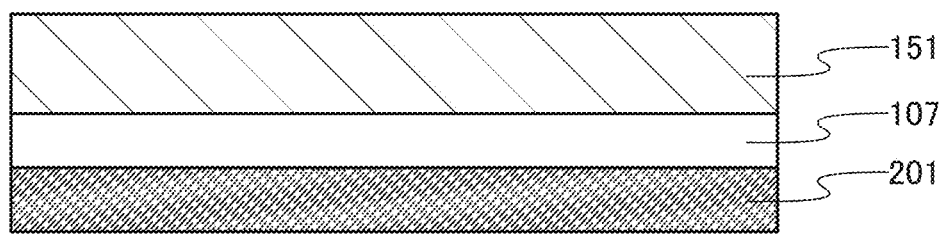
FIGS. 6A and 6B are diagrams each illustrating part of a cross section of a power storage device.
Figure 6B:
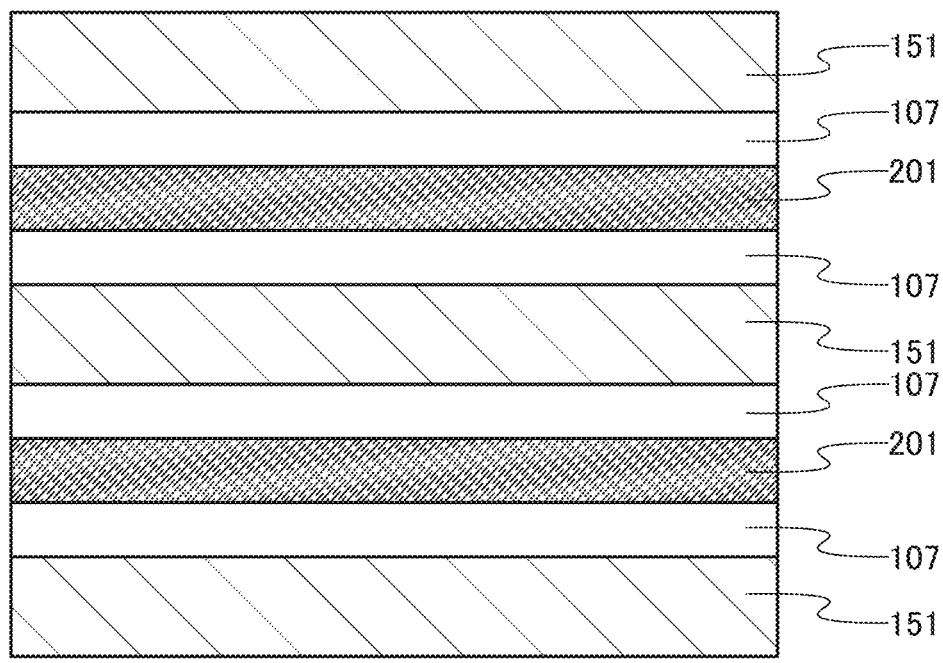

A power storage device 100 illustrated in FIG. 6A includes the conductor 201, a separator 107, and an electrode 151. The separator 107 is interposed between the conductor 201 and the electrode 151. The power storage device 100 preferably includes an electrolyte solution (not illustrated) between the conductor 201 and the electrode 151. As illustrated in FIG. 6B, the power storage device 100 may include a plurality of pairs each including the electrode 151 and the conductor 201 between which the separator 107 is interposed. For example, the electrode 151 includes a current collector and a first layer over the current collector. Here, the first layer preferably includes an active material. The components of the electrode 151 are described in detail later.

Figure 7A:
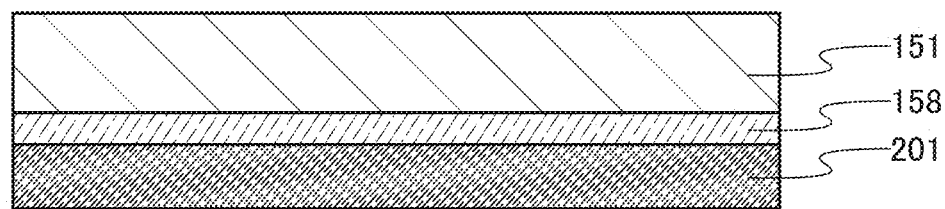
FIGS. 7A and 7B are diagrams each illustrating part of a cross section of a power storage device.
Figure 7B:
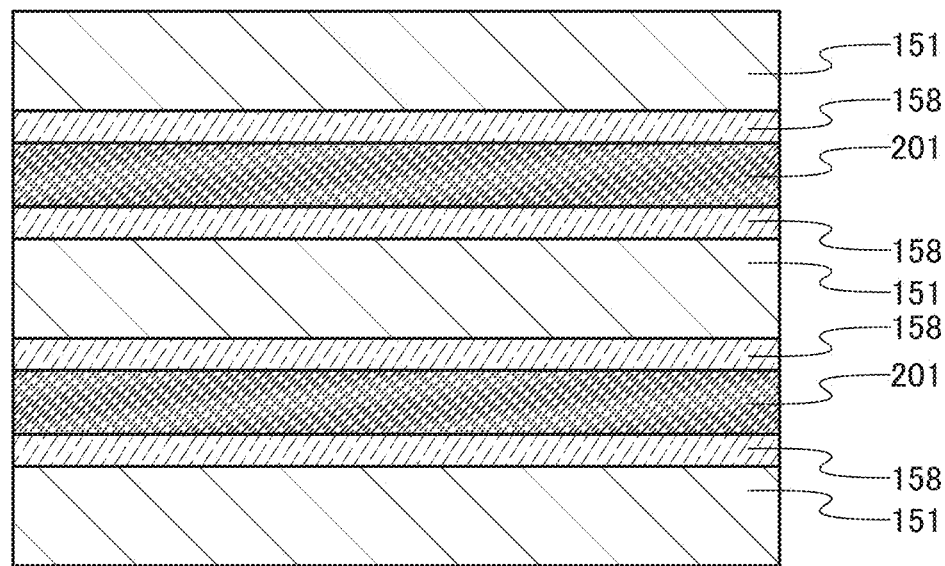

The power storage device 100 illustrated in FIG. 7A includes the conductor 201, an electrolyte 158, and the electrode 151. The electrolyte 158 is interposed between the conductor 201 and the electrode 151. As the electrolyte 158, a solid electrolyte is preferably used, for example. The electrolyte 158 is in contact with both the conductor 201 and the electrode 151. As illustrated in FIG. 7B, the power storage device 100 may include a plurality of pairs each including the electrode 151 and the conductor 201 between which the electrolyte 158 is interposed.

Here, the graphene compound sheet used as the conductor 201 can serve as both a current collector and an active material. Accordingly, the capacity of the power storage device can be increased as compared to the case where an active material is provided over a current collector of metal foil or the like.

<Method for Forming Conductor>

Here, for example, a sheet-like separator or a belt-like separator may be used as the separator 107, and the conductor 201 may be formed over at least one of surfaces of the separator 107. The conductor 201 can be formed by a spray dry method, a coating method, or the like. A coating method is described later.

As the electrolyte solution and the separator, an electrolyte solution and a separator which are described in detail in an embodiment below can be used.

Example 2 of Electrode

Figure 8A:
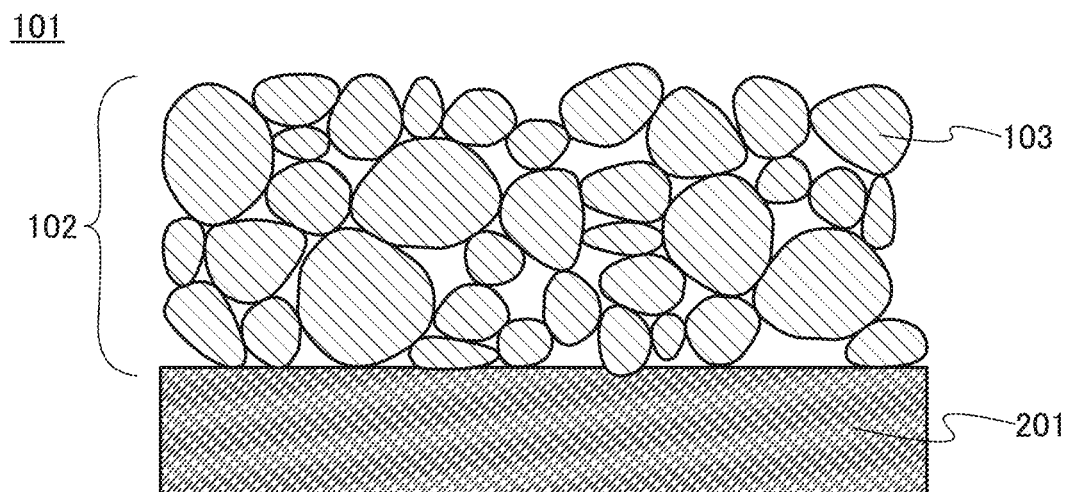
FIGS. 8A and 8B are diagrams each illustrating part of a cross section of a power storage device.
Figure 8B:
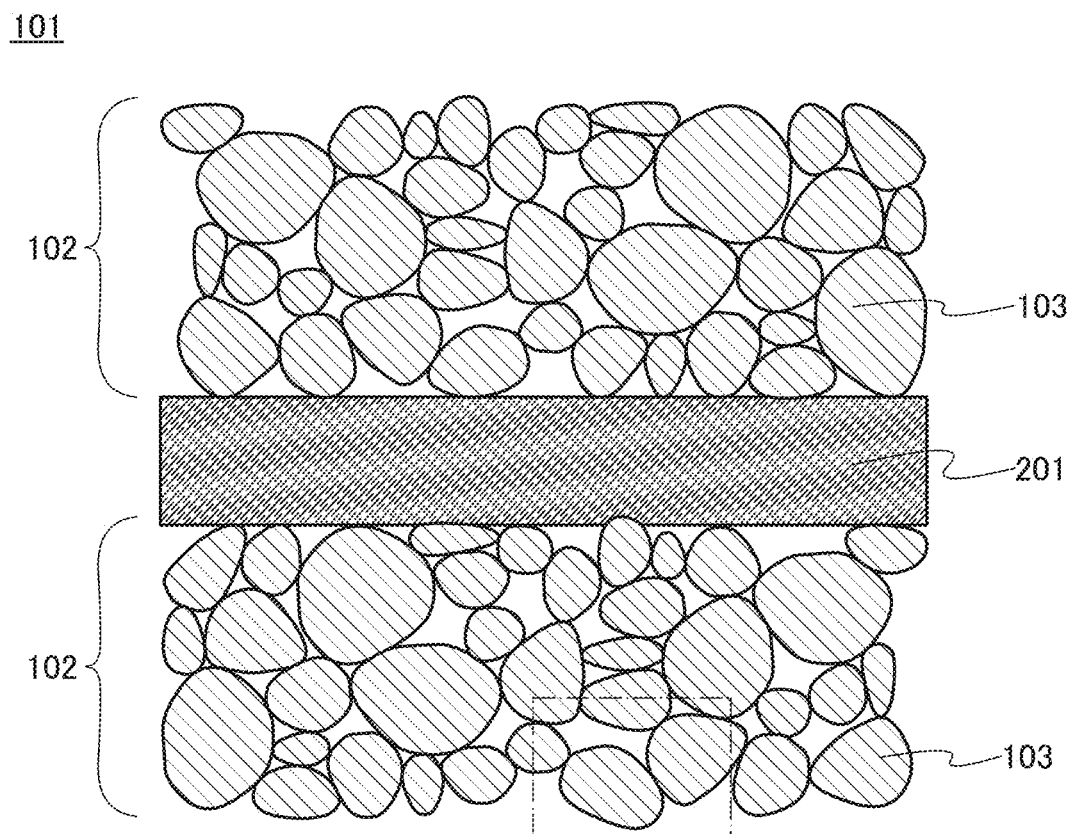

Next, an example of an electrode including the conductor 201 of one embodiment of the present invention and an active material different from the conductor 201 is described. Electrodes 101 illustrated in FIGS. 8A and 8B each include the conductor 201 and a layer 102. The layer 102 includes an active material 103. The layer 102 is preferably provided over at least one of surfaces of the conductor 201. In FIG. 8A, one surface of the conductor 201 is provided with the layer 102. In FIG. 8B, both surfaces of the conductor 201 are provided with the layers 102.

Figure 9A:
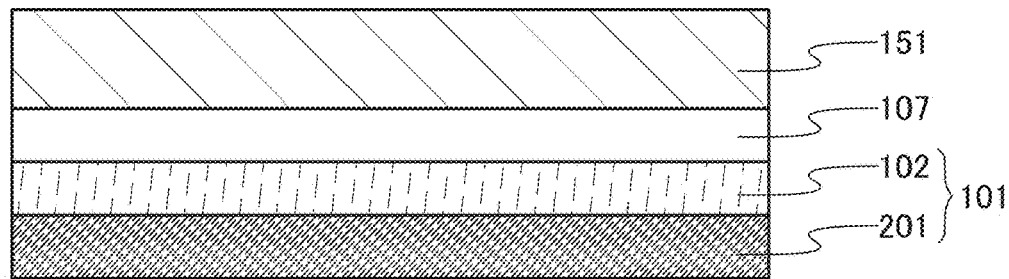
FIGS. 9A and 9B are diagrams each illustrating part of a cross section of a power storage device.
Figure 9B:
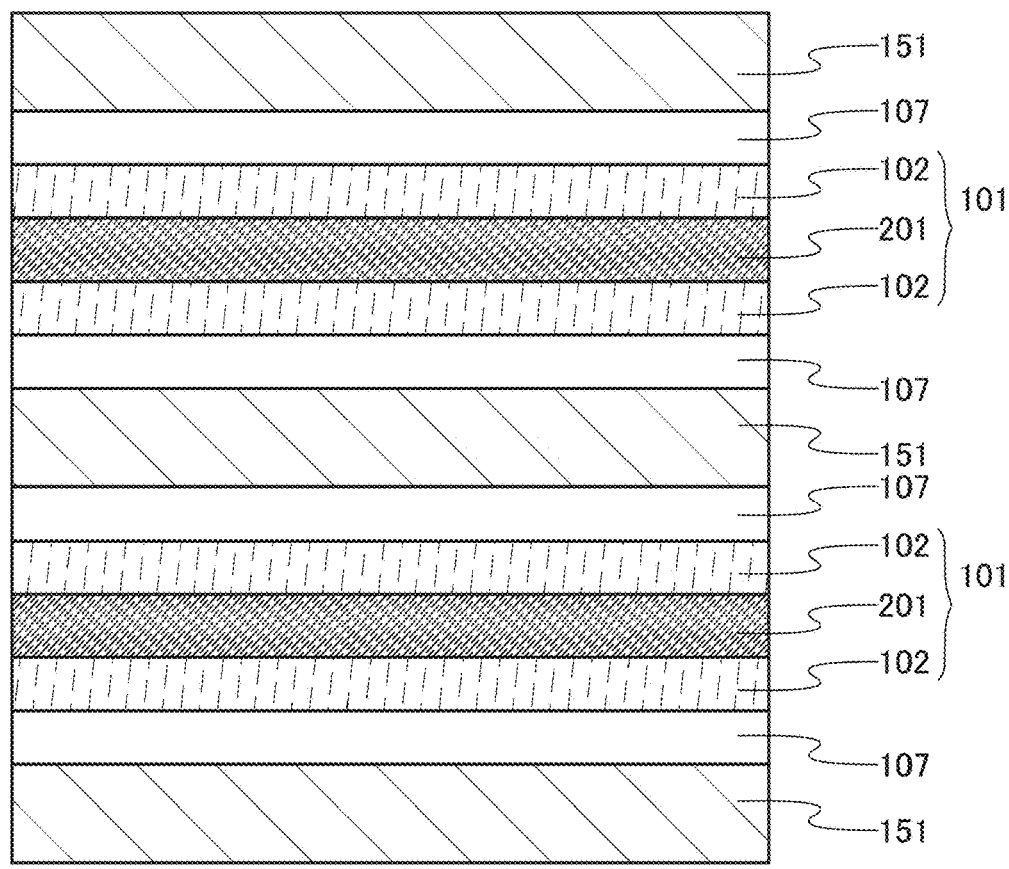

The power storage device 100 illustrated in FIG. 9A includes the electrode 101, the electrode 151, and the separator 107. As illustrated in FIG. 9B, the power storage device 100 may include a plurality of pairs each including the electrode 101 and the electrode 151 between which the separator 107 is interposed. It is preferable that the power storage devices 100 illustrated in FIGS. 9A and 9B each include an electrolyte solution (not illustrated) between the electrode 101 and the electrode 151. The power storage devices 100 may each include the electrolyte 158 between the electrode 101 and the electrode 151.

The layer 102 may include a conductive additive, a binder, or the like.

In the case where the electrode 101 is a positive electrode, the layer 102 preferably include a positive electrode active material as the active material 103. In the case where the electrode 101 is a negative electrode, the layer 102 preferably include a negative electrode active material as the active material 103.

In the case where the electrode 101 is a positive electrode, the electrode 151 preferably includes a negative electrode active material as the active material, and in the case where the electrode 101 is a negative electrode, the electrode 151 preferably includes a positive electrode active material as the active material.

For example, the electrode 151 includes a current collector and a first layer over the current collector. Here, the first layer preferably includes an active material. The first layer may include a conductive additive, a binder, or the like.

The current collector included in the electrode 151 can be formed using a material that has high conductivity, such as a metal like stainless steel, gold, platinum, aluminum, or titanium, or an alloy thereof. In the case where the current collector is used in the positive electrode, it is preferred that it not dissolve at the potential of the positive electrode. In the case where the current collector is used in the negative electrode, it is preferred that it not be alloyed with carrier ions such as lithium ions. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector can have a foil-like shape, a plate-like shape (sheet-like shape), a net-like shape, a punching-metal shape, an expanded-metal shape, or the like as appropriate. The current collector preferably has a thickness of more than or equal to 5 μm and less than or equal to 30 μm. The conductor 201 may be used as the current collector included in the electrode 151.

Examples of a positive electrode active material include a composite oxide with an olivine crystal structure, a composite oxide with a layered rock-salt crystal structure, and a composite oxide with a spinel crystal structure.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used. $LiCoO_2$ is particularly preferable because it has high capacity, stability in the air higher than that of $LiNiO_2$, and thermal stability higher than that of $LiNiO_2$, for example. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because characteristics of the secondary battery using such a material can be improved.

The average diameter of primary particles of the positive electrode active material is preferably greater than or equal to 5 nm and less than or equal to 50 μm, further preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

In addition, a lithium-manganese composite oxide that is represented by a composition formula $Li_aMn_bM_cO_d$ can be used as the positive electrode active material. Here, the element M is preferably a metal element other than lithium and manganese, or silicon or phosphorus, further preferably nickel. Furthermore, in the case where a whole particle of a lithium manganese complex oxide is measured, it is preferable to satisfy the following at the time of discharging: $0<a/(b+c)<2$; $c>0$; and $0.26<(b+c)/d<0.5$. To achieve high capacity, the lithium manganese complex oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \le a \le 1.848$; $0.19 \le c/b \le 0.935$; and $2.5 \le d \le 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$:$MnCO_3$:NiO=0.84:0.8062:0.318. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium manganese complex oxide can be measured with, for example, an inductively coupled plasma mass spectrometer (ICP-MS). The ratio of oxygen to the total composition in the whole particle of a lithium manganese complex oxide can be measured by, for example, energy dispersive X-ray spectroscopy (EDX). Alternatively, the composition ratio of oxygen in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 10A:
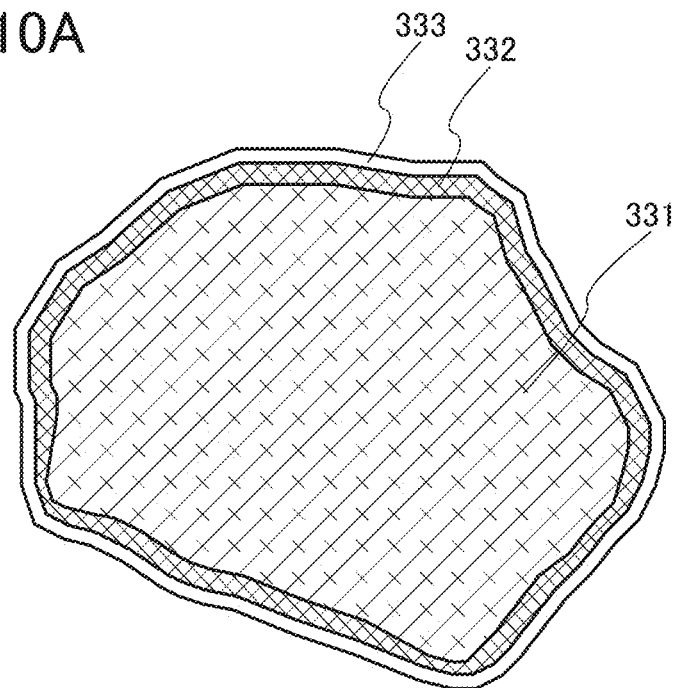
FIGS. 10A and 10B are diagrams each illustrating a particle of one embodiment of the present invention.
Figure 10B:
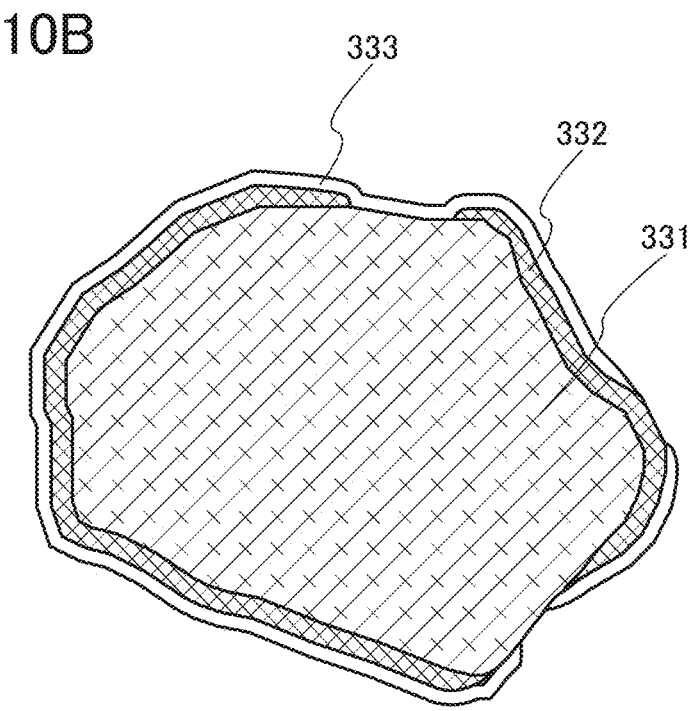

FIGS. 10A and 10B each illustrate an example of a cross-sectional view of a particle of a lithium-manganese composite oxide having a region with different crystal structures, crystal orientations, or oxygen contents.

As illustrated in FIG. 10A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 10B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by a1:b1:c1:d1; and the atomic ratio of lithium to manganese, the element M, and oxygen in the region 332 is represented by a2:b2:c2:d2. Note that the composition of each of the region 331 and the region 332 can be measured by energy dispersive X-ray spectroscopy (EDX) using a transmission electron microscope (TEM), for example. In measurement by EDX, the proportion of lithium is sometimes difficult to measure. Thus, a difference between the region 331 and the region 332 in composition except for lithium will be described below. Here, $d1/(b1+c1)$ is preferably greater than or equal to 2.2, further preferably greater than or equal to 2.3, and still further preferably greater than or equal to 2.35 and less than or equal to 3. Furthermore, $d2/(b2+c2)$ is preferably less than 2.2, further preferably less than 2.1, and still further preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d \leq 0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the region 332 and the region 331. The transition layer is a region where the composition, crystal structure, or crystal lattice constant changes continuously or gradually. A mixed layer may be provided between the second region and the first region. The mixed layer is a layer in which, for example, two or more crystals having different crystal orientations are mixed, two or more crystals having different crystal structures are mixed, or two or more crystals having different compositions are mixed.

The region 333 preferably contains carbon or a metal compound. Examples of the metal include cobalt, aluminum, nickel, iron, manganese, titanium, zinc, and lithium. The region 333 may contain an oxide or a fluoride of the metal as an example of the metal compound.

It is particularly preferable that the region 333 contain carbon. Since carbon has high conductivity, a particle coated with carbon in an electrode of the power storage device can reduce the resistance of the electrode, for example. The region 333 preferably includes a graphene compound. The use of the graphene compound in the region 333 allows the lithium-manganese composite oxide particle to be efficiently coated with the region 333. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the secondary battery using the lithium-manganese composite oxide as a positive electrode material can have improved cycle performance.

The thickness of the region 333 is preferably greater than or equal to 0.4 nm and less than or equal to 40 nm.

Furthermore, the average size of primary particles of the lithium-manganese composite oxide is preferably greater than or equal to 5 nm and less than or equal to 50 μm, and further preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average size of secondary particles is preferably greater than or equal to 5 μm and less than or equal to 50 μm.

As a negative electrode active material, for example, a carbon-based material or an alloy-based material can be used.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.1 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, and further preferably 0.3 or more and 1.2 or less.

Alternatively, as the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The reaction potential of the negative electrode active material is preferably as low as possible, in which case the voltage of the power storage device can be high. On the other hand, when the potential is low, power of reducing an electrolyte solution is increased, so that an organic solvent or the like in an electrolyte solution might be subjected to reductive decomposition. The range of potentials in which the electrolysis of an electrolyte solution does not occur is referred to as a potential window. The electrode potential of the negative electrode needs to be within a potential window of an electrolyte solution; however, the potentials of many active materials used for negative electrodes of lithium-ion secondary batteries and lithium-ion capacitors are out of the potential windows of almost all electrolyte solutions. Specifically, materials with low reaction potentials such as graphite and silicon can increase the voltage of power storage devices but are likely to cause the reductive decomposition of electrolyte solutions.

Carrier ions such as lithium ions may be occluded by a negative electrode active material in advance.

The electrode 101 and the electrode 151 may each include a conductive additive. Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, and further preferably greater than or equal to 1 wt % and less than or equal to 5 wt %.

A network for electrical conduction can be formed in the electrode by the conductive additive. The conductive additive also allows maintaining of a path for electric conduction between the particles of the positive electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

As the conductive additive, a graphene compound may be used.

A graphene compound has excellent electrical characteristics of high conductivity and excellent physical properties of high flexibility and high mechanical strength in some cases. Furthermore, a graphene compound has a planar shape. A graphene compound is capable of making low-resistance surface contact and has extremely high conductivity even with a small thickness in some cases. Therefore, even with a small amount of a graphene compound, a conductive path can be formed efficiently in an active material layer. For this reason, it is preferable to use a graphene compound as the conductive additive because the area where the active material and the conductive additive are in contact with each other can be increased. In addition, it is preferable to use a graphene compound as the conductive additive because the electrical resistance can be reduced in some cases. Here, it is particularly preferable to use, for example, graphene, multilayer graphene, or RGO as a graphene compound.

In the case where an active material with a small average particle size (e.g., 1 µm or less) is used, the specific surface area of the active material is large and thus more conductive paths for the active materials are needed. In such a case, it is particularly preferable to use a graphene compound that can efficiently form a conductive path even with a small amount.

A cross-sectional structure example of the layer 102 including a graphene compound as a conductive additive is described below.

Figure 11A:
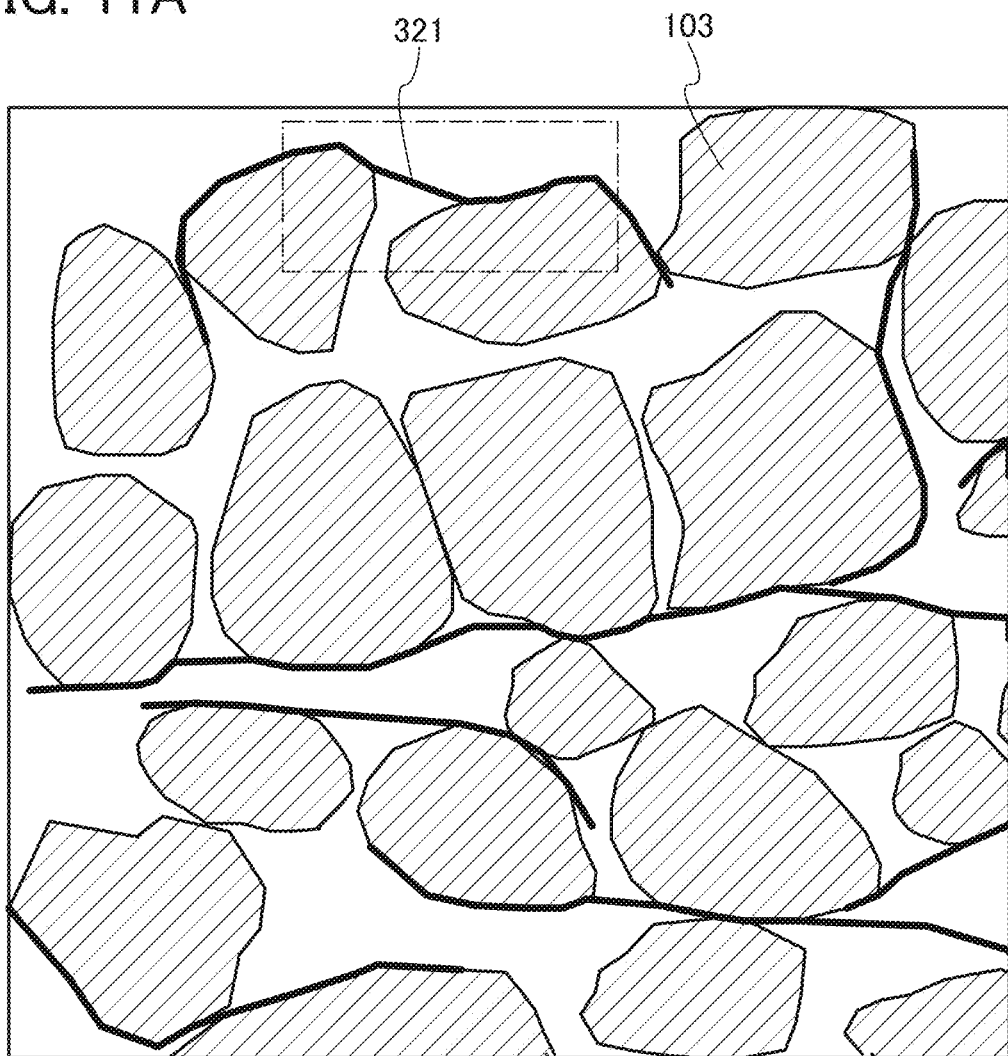
FIGS. 11A and 11B are diagrams illustrating part of a cross section of an electrode.
Figure 11B:
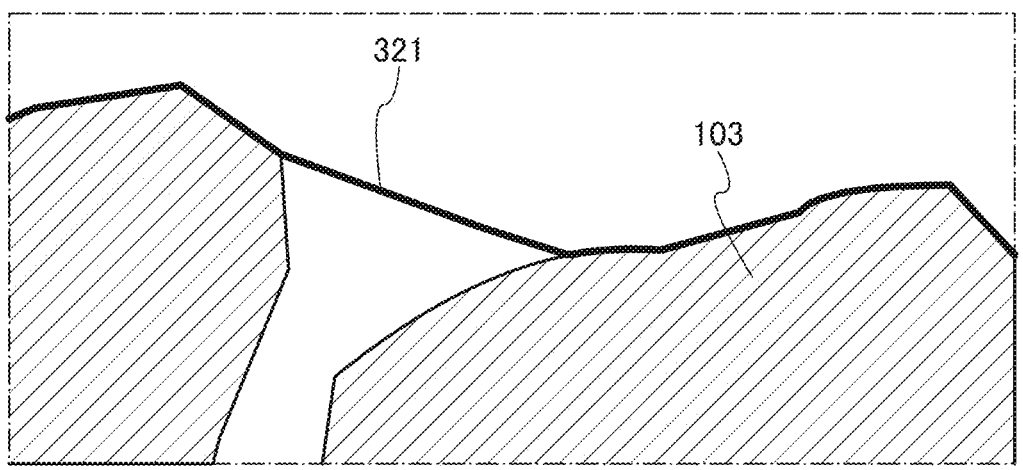

FIG. 11A is a longitudinal sectional view of the layer 102. The layer 102 includes particles of the active material 103, a graphene compound 321 serving as a conductive additive, and a binder 104. Here, graphene or multilayer graphene may be used as the graphene compound 321, for example. The graphene compound 321 preferably has a sheet-like shape. The graphene compound 321 may have a sheet-like shape formed of a plurality of sheets of multilayer graphene and/or a plurality sheets of graphene that partly overlap with each other. FIG. 11B is an enlarged view of a region surrounded by dashed-dotted line in FIG. 11A.

The longitudinal section of the layer 102 of FIG. 11A shows substantially uniform dispersion of the graphene compounds 321 in the layer 102. The graphene compounds 321 are schematically shown by thick lines in FIG. 11A but are actually thin films each having a thickness corresponding to the thickness of a single layer or a multilayer of carbon molecules. The plurality of graphene compounds 321 are formed in such a way as to wrap, coat, or adhere to the surfaces of the plurality of particles of the active material 103, so that the graphene compounds 321 make surface contact with the plurality of particles of the active material 103.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is, the capacity of the power storage device can be increased.

Here, it is preferable to perform reduction after a layer to be the layer 102 is formed in such a manner that graphene oxide is used as the graphene compound 321 and mixed with an active material. When graphene oxide with extremely high dispersibility in a polar solvent is used for the formation of the graphene compounds 321, the graphene compounds 321 can be substantially uniformly dispersed in the layer 102. The solvent is removed by volatilization from a dispersion medium in which graphene oxide is uniformly dispersed, and the graphene oxide is reduced; hence, the graphene compounds 321 remaining in the layer 102 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the particles of the active material 103 and the graphene compounds 321 can be improved with a smaller amount of the graphene compound 321 than that of a normal conductive additive. Thus, the proportion of the particles of the active material 103 in the layer 102 can be increased. Accordingly, the discharge capacity of the power storage device can be increased.

The electrode 101 and the electrode 151 may each include a binder. As the binder, for example, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), polymethylmethacrylate (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, for example, it is preferable to mix with a material having a significant viscosity modifying effect. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while suppressing electric conduction.

<Method for Forming Electrode>

An example of a method for forming an electrode is described. First, the conductor 201 is prepared. Here, the sheet-like conductor 201 is used as an example. The above embodiment can be referred to for the method for forming the conductor 201.

Next, the active material 103 and a solvent are mixed to form a first mixture. Here, a conductive additive or a binder may be added and mixed. A polar solvent can be used as the solvent. Examples of the material of the polar solvent are water, methanol, ethanol, acetone, tetrahydrofuran (THF), dimethylformamide (DMF), N-methylpyrrolidone (NMP), dimethyl sulfoxide (DMSO), and a mixed solution of any two or more of the above. In the case where a rubber material and a water-soluble polymer are used as the first material and the second material, respectively, water is preferably used as the solvent.

Next, the formed first mixture is applied to the conductor 201. After that, the solvent in the first mixture is volatilized by heat treatment or the like, so that the layer 102 is formed.

Embodiment 3

In this embodiment, power storage devices of embodiments of the present invention are described.

Examples of the power storage device of one embodiment of the present invention include a secondary battery such as a lithium ion battery which utilizes an electrochemical reaction; an electrochemical capacitor such as an electric double-layer capacitor or a redox capacitor; an air battery; and a fuel battery.

<Wound Storage Battery>

Figure 12:
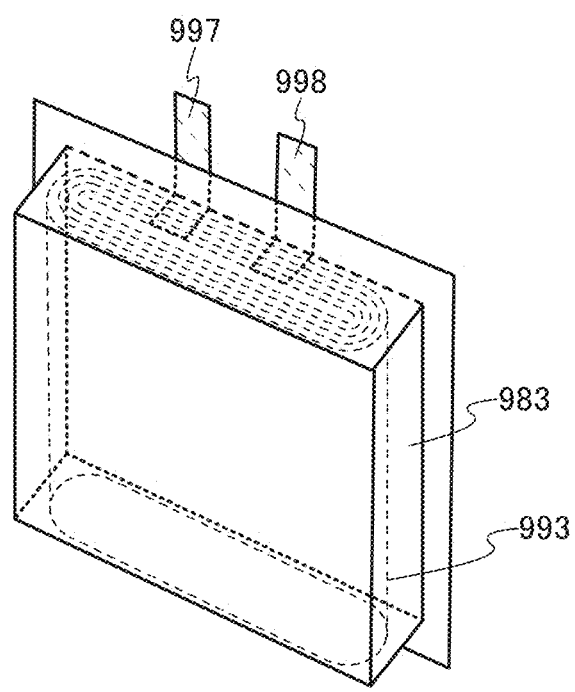
FIG. 12 is a diagram illustrating a power storage device.

As an example of the power storage device, a wound storage battery is described. FIG. 12 illustrates an example of the wound storage battery.

A power storage device 980 illustrated in FIG. 12 includes a wound body 993 and an exterior body 983. The wound body 993 includes the electrode 101, the electrode 151, and a separator 996. A space surrounded by the exterior body 983 is filled with an electrolyte solution. The power storage device 980 preferably includes a lead electrode 997 connected to the conductor 201 and a lead electrode 998 connected to the electrode 151. The above embodiment can be referred to for the electrode 101 and the electrode 151.

Here is described an example of using, as the electrode 101, an electrode including the layer 102 formed over the belt-like conductor 201. Here, an example in which the layer 102 includes a lithium-manganese composite oxide as an active material is described.

The area of the conductor 201 may be, for example, greater than or equal to 1 mm$^2$ and less than or equal to 100 mm$^2$, greater than or equal to 25 mm$^2$ and less than or equal to 10 m$^2$, or greater than or equal to 100 mm$^2$ and less than or equal to 3 m$^2$.

Note that although an example in which the electrode including the layer 102 formed over the belt-like conductor 201 is used as the electrode 101 is described here, an electrode which does not include the layer 102 can also be used in the power storage device 980 illustrated in FIG. 12.

Figure 13A:
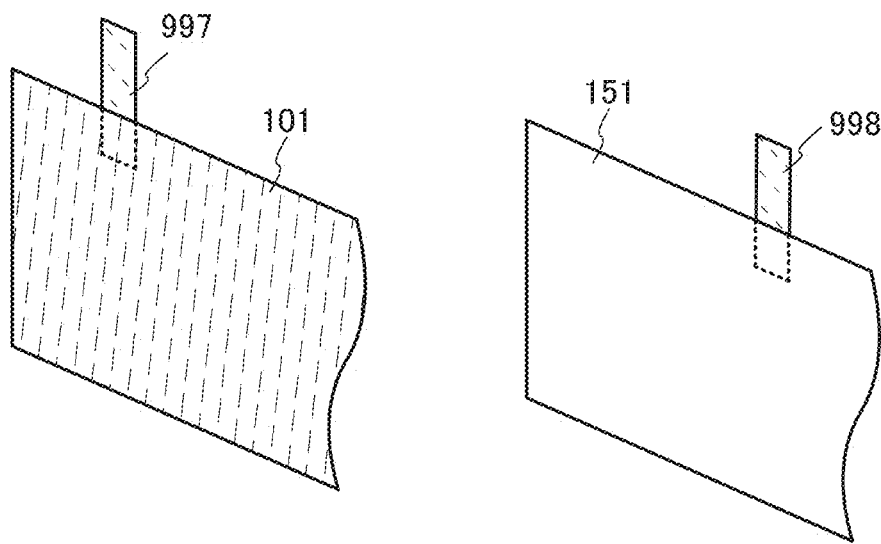
FIGS. 13A and 13B are diagrams illustrating a method for manufacturing a power storage device.

First, the electrode 101 and the electrode 151 are prepared. The belt-like electrode 151 may be formed in such a manner that an active material layer is formed over at least one of surfaces of a belt-like current collector. Here, as an example, copper is used for the current collector, and graphite is used as an active material included in the active material layer. Next, as illustrated in FIG. 13A, the lead electrode 997 is bonded to the conductor 201 included in the electrode 101, and the lead electrode 998 is bonded to the current collector included in the electrode 151. The bonding of the lead electrodes can be performed by ultrasonic welding, for example.

Figure 13B:
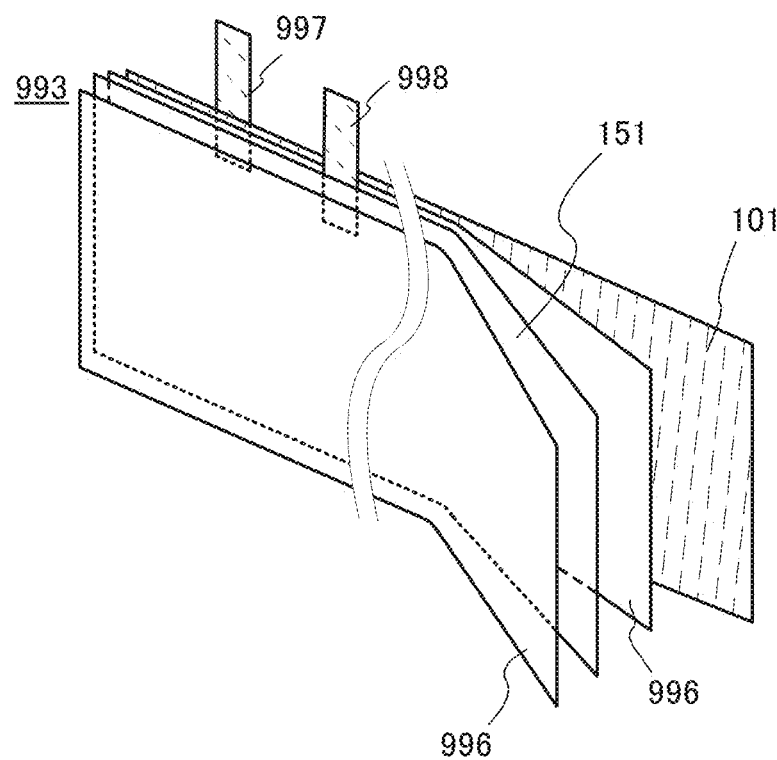
Figure 14A:
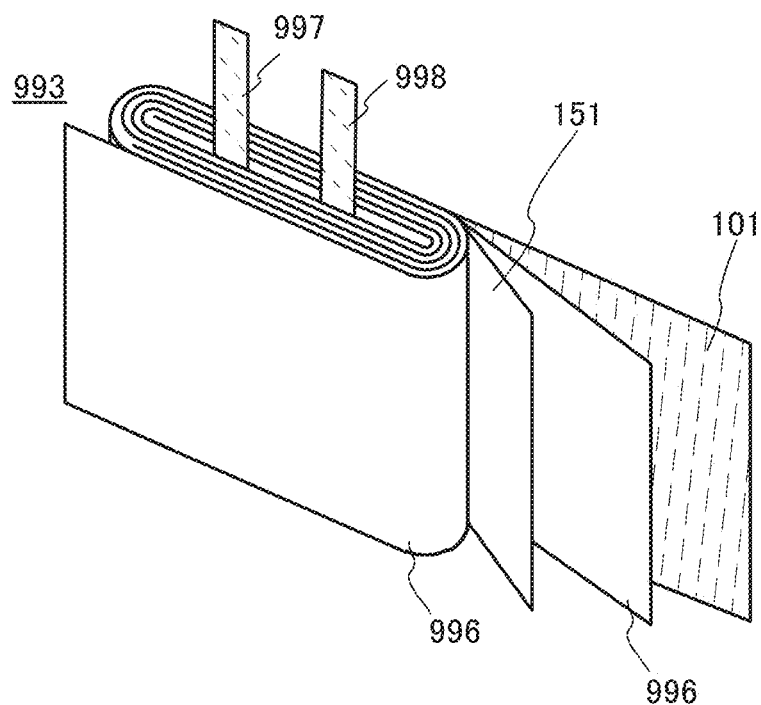
FIGS. 14A and 14B are diagrams illustrating a method for manufacturing a power storage device.

Next, as illustrated in FIG. 13B, the electrode 101, the separator 996, the electrode 151, and the separator 996 are stacked in this order from the bottom. After that, as illustrated in FIG. 14A, the electrode 101, the electrode 151, and the separators 996, which are stacked, are wound to form the wound body 993. At this time, they may be wound with a core.

Figure 14B:
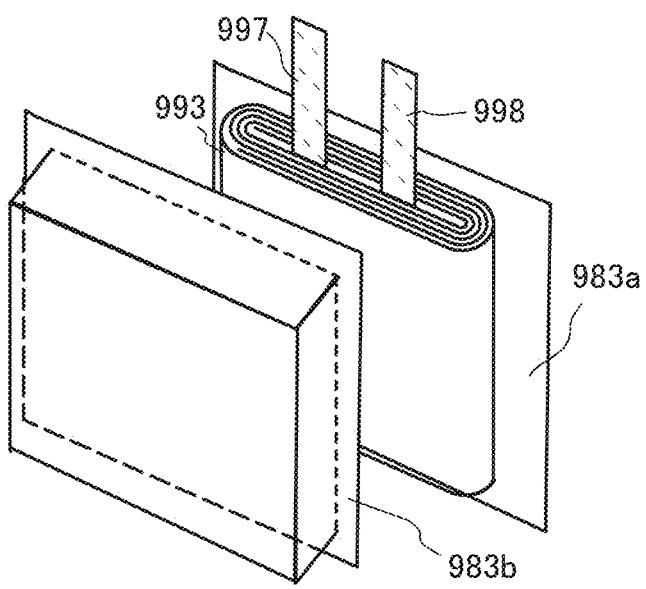

Next, as illustrated in FIG. 14B, the wound body 993 is surrounded by an exterior body 983$a$ and an exterior body 983$b$. After that, the exterior body 983$a$ and the exterior body 983$b$ are bonded to each other. Here, the bonded exterior body is referred to as an exterior body 983. It is preferable to leave a portion of the exterior body 983 where the exterior body 983$a$ and the exterior body 983$b$ are not bonded to each other for introduction of an electrolyte solution. The unbonded portion is referred to as an inlet in some cases. An electrolyte solution is injected from the inlet. After that, the inlet is bonded, so that the power storage device 980 is manufactured.

Here, the conductor 201 may be formed over one of surfaces of the belt-like separator 996, and then, the layer 102 may be formed over the conductor 201. That is, the structure may be as follows: the conductor 201 and the layer 102 are stacked over the separator 996, the separator 996, the conductor 201, and the layer 102 are fixed, and then, the electrode 151 and the separator 996 are stacked.

In the case where an aprotic organic solvent is used as a solvent of the electrolyte solution, for example, one of ethylene carbonate (EC), propylene carbonate (PC), butylene carbonate, chloroethylene carbonate, vinylene carbonate (VC), g-butyrolactone, g-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolyte solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolyte solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as a salt used for the electrolyte solution, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for the power storage device is preferably a highly purified one so as to contain a negligible amount of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolyte solution. The concentration of such an additive agent in the whole solvent is, for example, higher than or equal to 0.1 wt % and lower than or equal to 5 wt %.

Alternatively, a polymer gel electrolyte obtained in such a manner that a polymer is swelled with an electrolyte solution may be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. In the case of using the solid electrolyte, a separator or a spacer is not necessary. Furthermore, the battery can be entirely solidified; therefore, there is no possibility of liquid leakage and thus the safety of the battery is dramatically increased.

As the separator 996, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 15A:
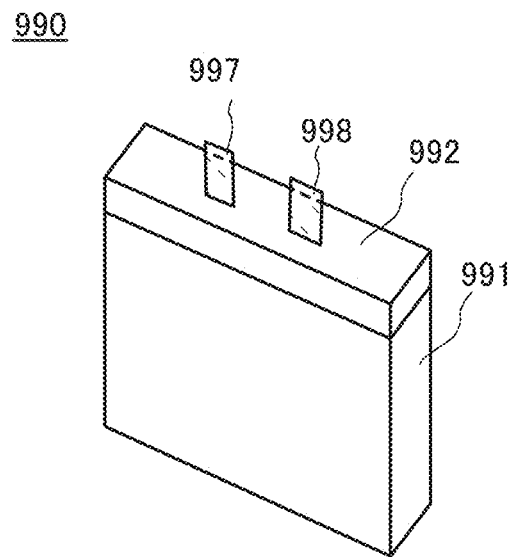
FIGS. 15A and 15B are diagrams illustrating a power storage device and a method for manufacturing the power storage device.
Figure 15B:
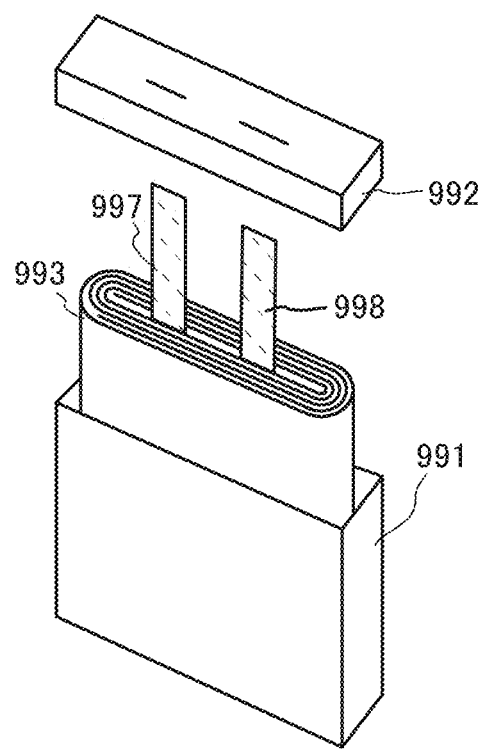

A storage battery 990 illustrated in FIG. 15A includes an exterior body 991 and an exterior body 992 which have a shape different from the exterior body in FIG. 12. FIG. 15B illustrates components of the storage battery 990. The above wound body 993 is stored in the exterior body 991.

For example, a metal material such as aluminum or a resin material can be used for the exterior bodies 983, 991, and 992. With the use of a resin material for the exterior bodies, the exterior bodies can be deformed when external force is applied; thus, a flexible storage battery can be manufactured. As the exterior body, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Here, for example, in the case where the electrode 101 is used as a positive electrode, the electrode 151 serves as a negative electrode, and in the case where the electrode 101 is used as a negative electrode, the electrode 151 serves as a positive electrode.

Specifically, for example, the electrode 101 is used as a positive electrode, any of the positive electrode active materials described in Embodiment 2 is used as the active material 103 included in the electrode 101. For example, a lithium-manganese composite oxide represented by $Li_aMn_bM_cO_d$ is used as the active material 103. The electrode 151 is used as a negative electrode. The electrode 151 includes any of the negative electrode active materials described in Embodiment 2.

Examples of various modes of a storage battery are described below. The description of the electrode 101 and the electrode 151 in FIGS. 13A and 13B and the like can be referred to for storage batteries described below. For example, the description of the electrode 101 in FIGS. 13A and 13B can be referred to for a positive electrode 503 illustrated in FIG. 17, and the description of the electrode 151 in FIGS. 13A and 13B can be referred to for a negative electrode 506 illustrated in FIG. 17.

Figure 16A:
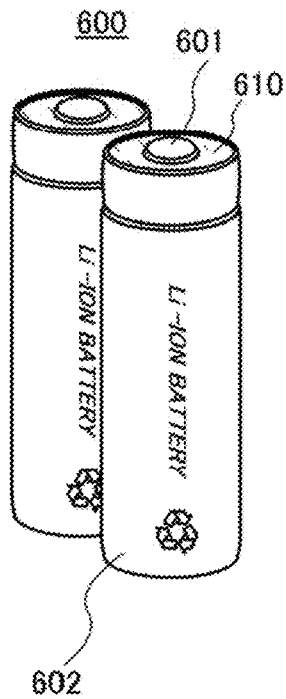
FIGS. 16A and 16B are diagrams illustrating a power storage device.
Figure 16B:
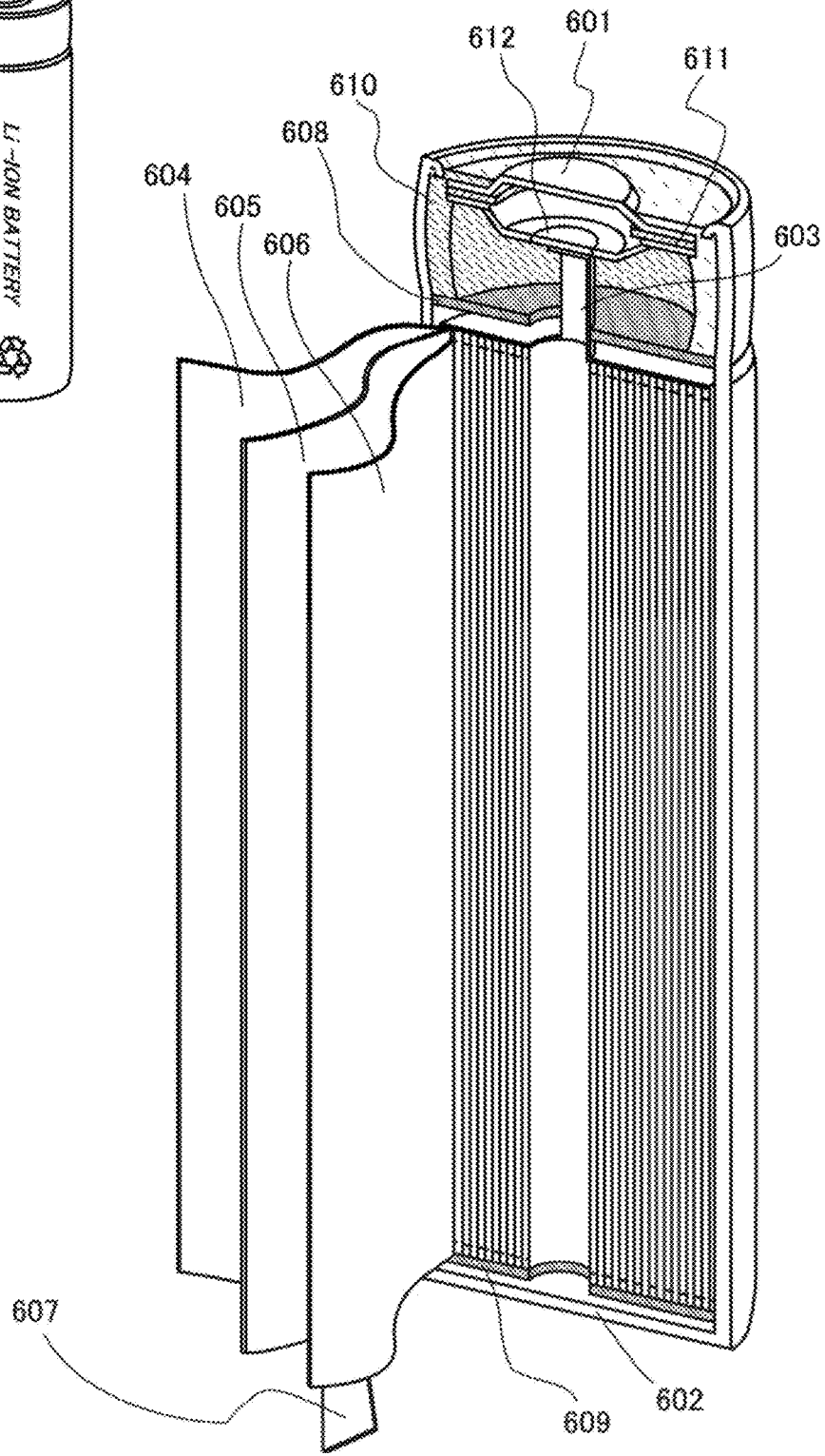

As another example of a wound storage battery, a cylindrical storage battery is illustrated in FIGS. 16A and 16B. As illustrated in FIG. 16A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

FIG. 16B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is interposed between a pair of insulating plates 608 and 609 which face each other. Further, a nonaqueous electrolyte solution (not illustrated) is injected inside the battery can 602 provided with the battery element. As the nonaqueous electrolyte solution, a nonaqueous electrolyte solution which is similar to that of the above coin-type storage battery can be used.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed with a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

In the case where an electrode is wound as in the cylindrical storage battery illustrated in FIGS. 16A and 16B, a great stress is caused at the time of winding the electrode. In addition, an outward stress from an axis of winding is applied to the electrode all the time in the case where a wound body of the electrode is stored in a housing. However, the active material can be prevented from being cleaved even when such a great stress is applied to the electrode.

<Thin Storage Battery>

Figure 17:
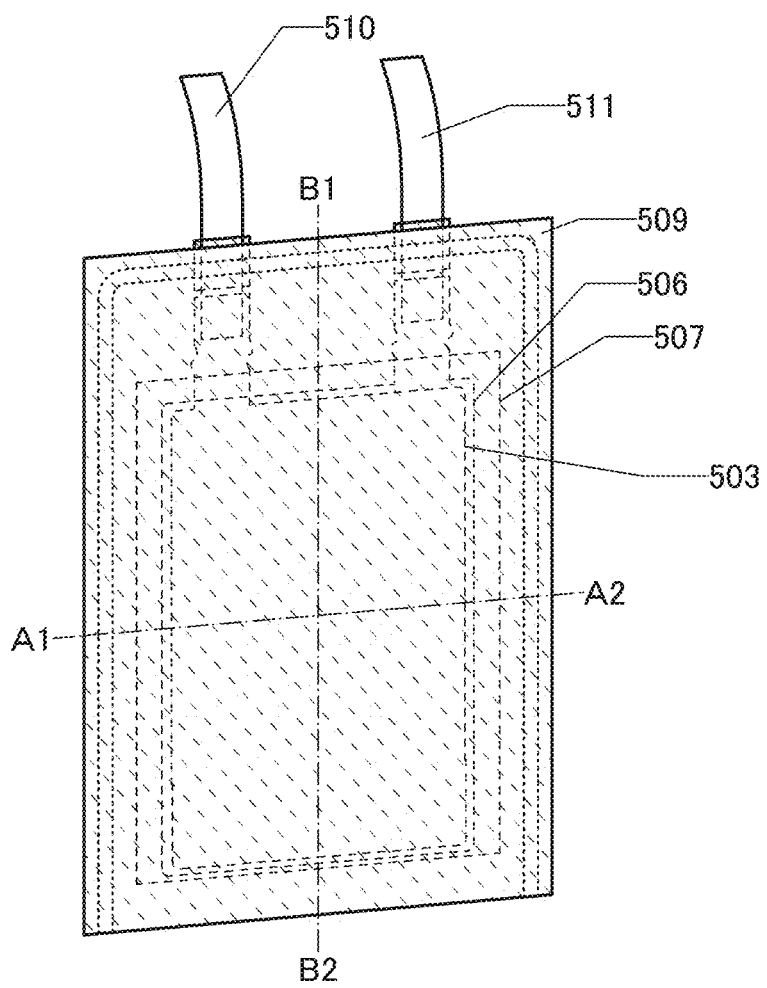
FIG. 17 is a diagram illustrating a power storage device.

FIG. 17 illustrates a thin storage battery as an example of a power storage device. When a flexible thin storage battery is used in an electronic device at least part of which is flexible, the storage battery can be bent as the electronic device is bent.

Figure 18A:
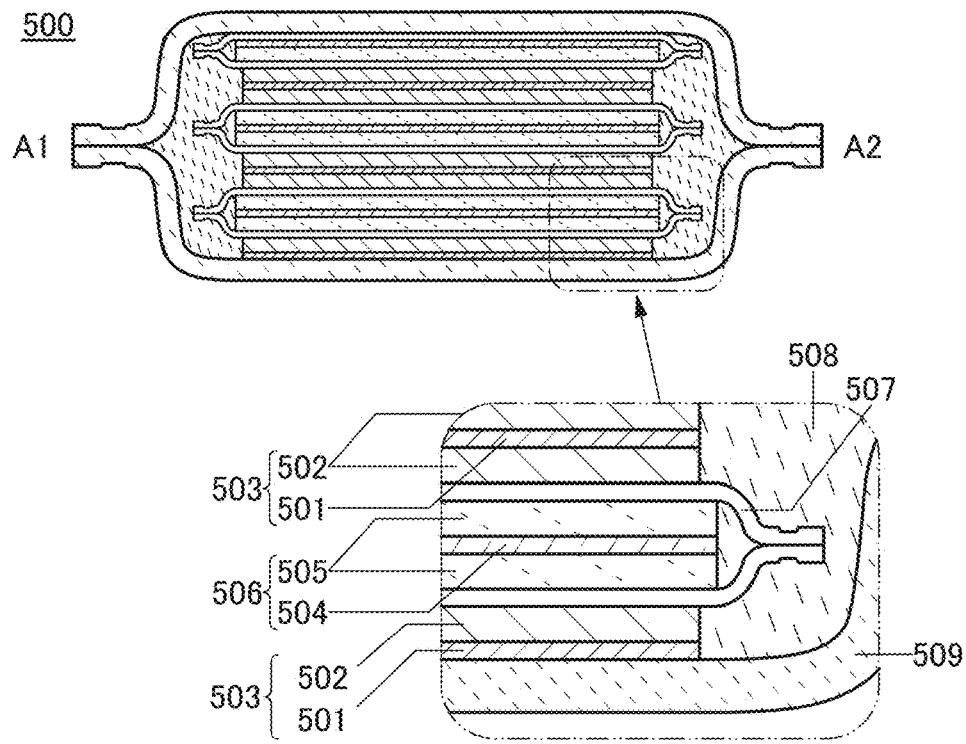
FIGS. 18A and 18B are cross-sectional views each illustrating a power storage device.
Figure 18B:
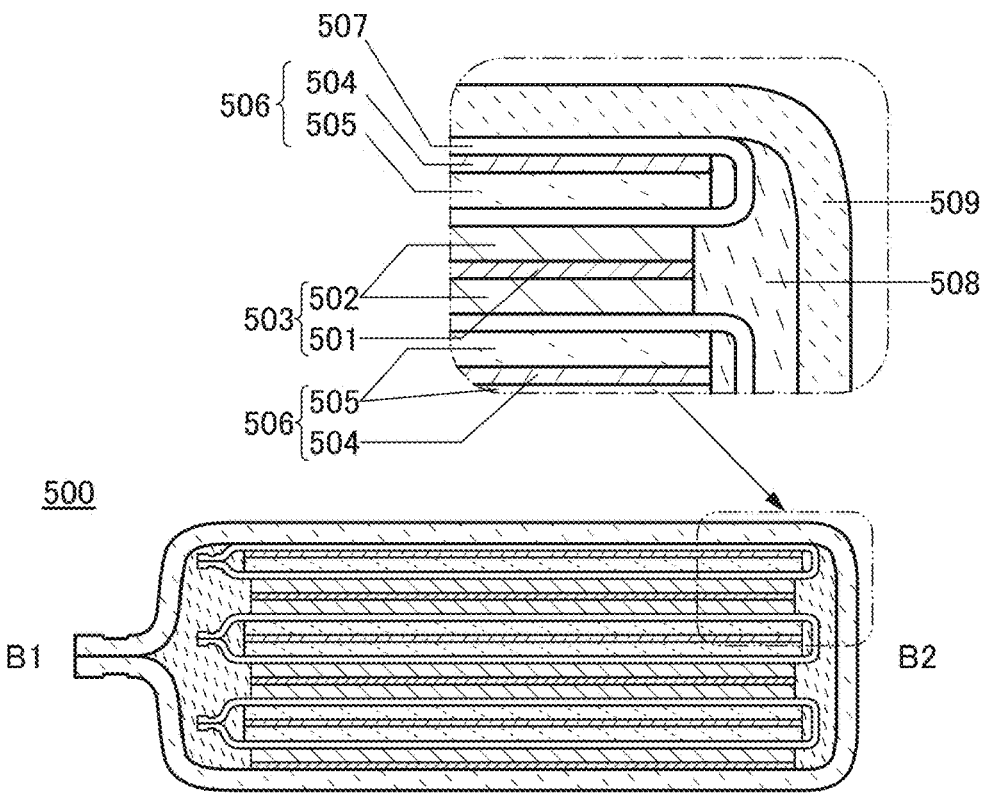

FIG. 17 is an external view of a thin storage battery 500. FIG. 18A is a cross-sectional view along dashed-dotted line A1-A2 in FIG. 17, and FIG. 18B is a cross-sectional view along dashed-dotted line B1-B2 in FIG. 17. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The electrolyte solution 508 is contained in the exterior body 509.

Figure 19A:
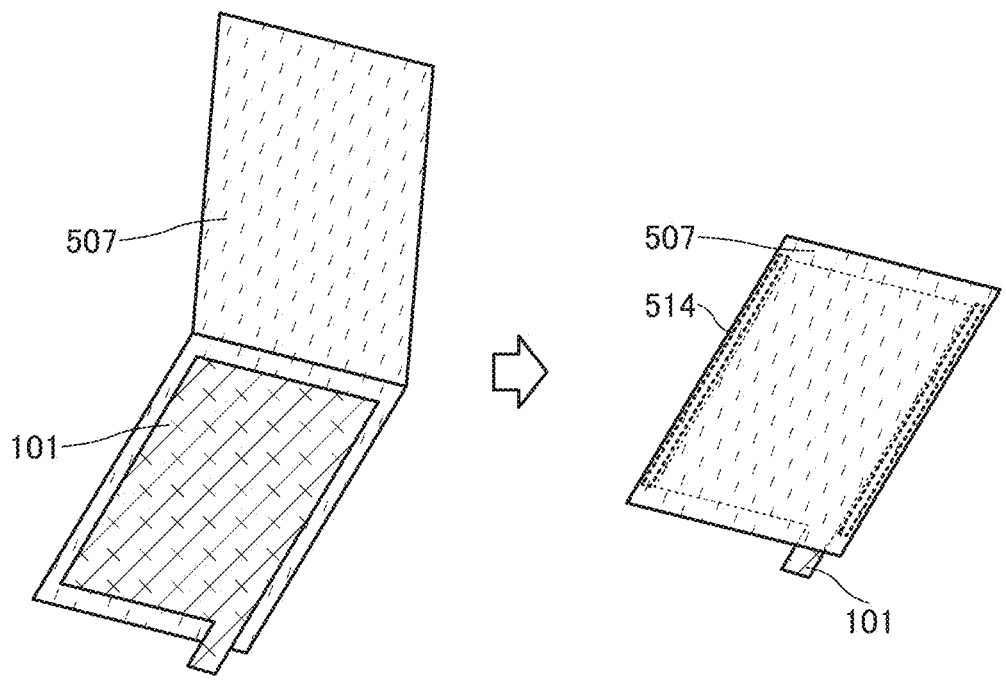
FIGS. 19A and 19B are diagrams each illustrating a power storage device.
Figure 19B:
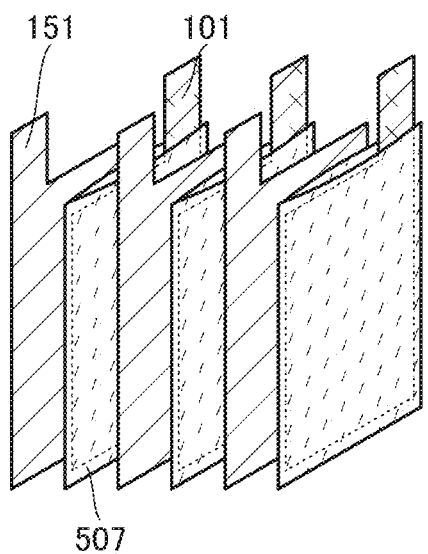

The separator 507 is preferably formed to have a bag-like shape to surround one of the positive electrode 503 and the negative electrode 506. For example, as illustrated in FIG. 19A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 19B, the positive electrodes 503 surrounded by the separators 507 and the negative electrodes 506 are alternately stacked and provided in the exterior body 509, whereby the thin storage battery 500 can be formed.

Figure 20:
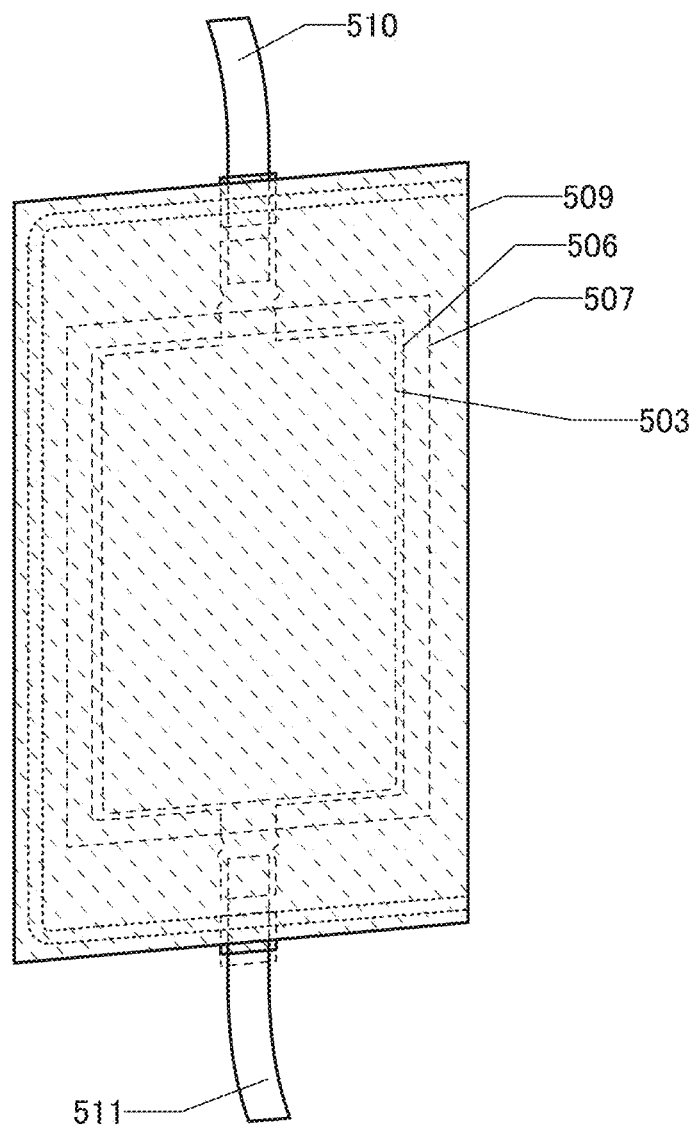
FIG. 20 is a diagram illustrating a power storage device.

Although the positive electrode lead electrode 510 and the negative electrode lead electrode 511 are provided on the same side in FIG. 17, the positive electrode lead electrode 510 and the negative electrode lead electrode 511 may be provided on different sides as illustrated in FIG. 20. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

The description of the exterior body 983 or the like can be referred to for a material and a structure of the exterior body 509.

Although the examples in FIGS. 18A and 18B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of electrode active material layers, the storage battery can have a high capacity. In contrast, in the case of using a small number of electrode active material layers, the storage battery can have a small thickness and high flexibility.

Here, for example, the case where the positive electrode 503 illustrated in FIG. 17 includes the conductor 201 and the layer 102 which is formed over the conductor 201 and includes a positive electrode active material is considered. In the storage battery 500 illustrated in each of FIGS. 18A and 18B, the plurality of positive electrodes 503 are stacked. Here, the area of the conductor 201 included in the positive electrode 503 may be, for example, greater than or equal to 1 $mm^2$ and less than or equal to 1 $m^2$, greater than or equal to 25 $mm^2$ and less than or equal to 1 $m^2$, or greater than or equal to 100 $mm^2$ and less than or equal to 0.1 $m^2$.

Next, a variety of examples of the stack of the positive electrode, the negative electrode, and the separator are described.

Figure 21A:
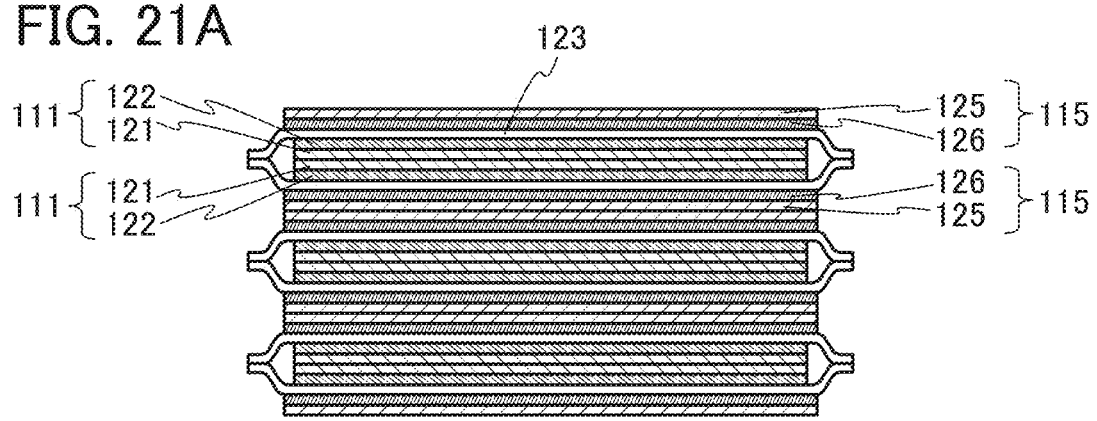
FIGS. 21A to 21C are diagrams each illustrating part of a cross section of a power storage device.

FIG. 21A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 21A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the secondary battery 10 is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body 509 of the thin storage battery 500 in the case where the thin storage battery 500 is curved, for example. Therefore, the deterioration of the thin storage battery 500 can be inhibited. Furthermore, the thin storage battery 500 can have high reliability.

Figure 21B:
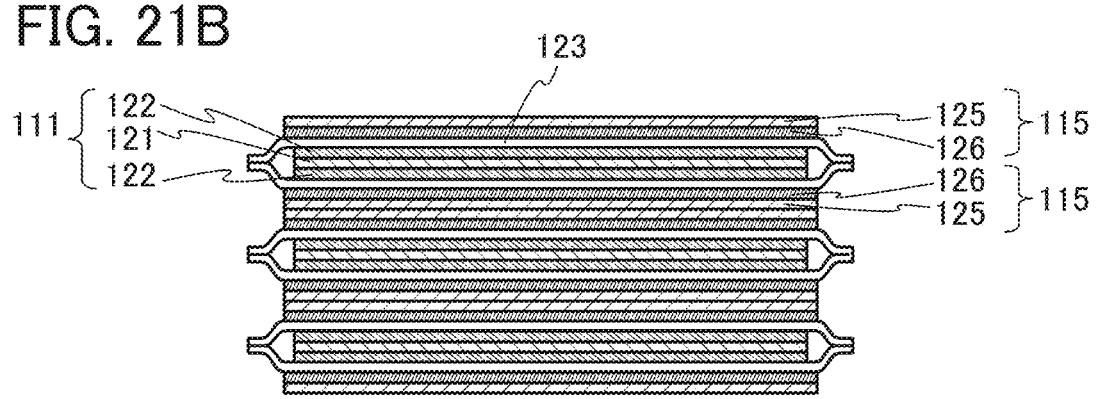

FIG. 21B illustrates an example of a stacked-layer structure of the positive electrodes 111 and the negative electrodes 115 which is different from that in FIG. 21A. The structure illustrated in FIG. 21B is different from that in FIG. 21A in that the positive electrode active material layers 122 are provided on both surfaces of the positive electrode current collector 121. When the positive electrode active material layers 122 are provided on both the surfaces of the positive electrode current collector 121 as illustrated in FIG. 21B, the capacity per unit volume of the thin storage battery 500 can be increased.

Figure 21C:
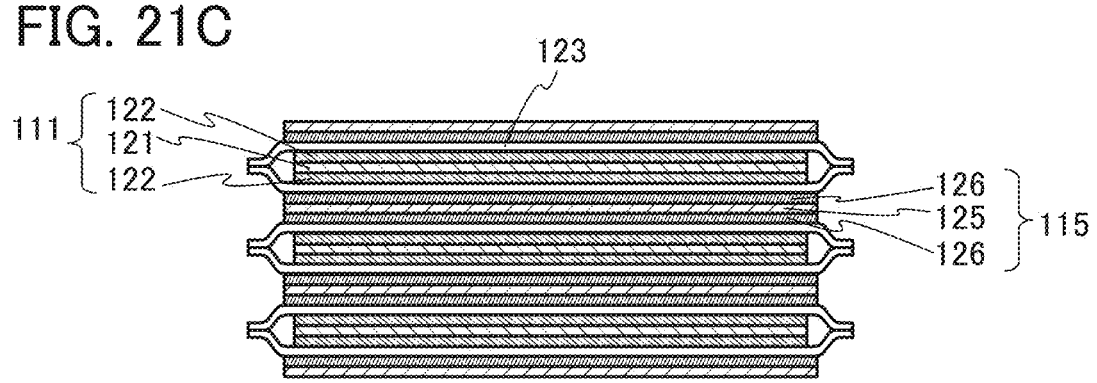

FIG. 21C illustrates an example of a stack of the positive electrodes 111 and the negative electrodes 115 which is different from that in FIG. 21B. The structure illustrated in FIG. 21C is different from that in FIG. 21B in that the negative electrode active material layers 126 are provided on both surfaces of the negative electrode current collector 125. When the negative electrode active material layers 126 are provided on both the surfaces of the negative electrode current collector 125 as illustrated in FIG. 21C, the capacity per unit volume of the thin storage battery 500 can be further increased.

Figure 22A:
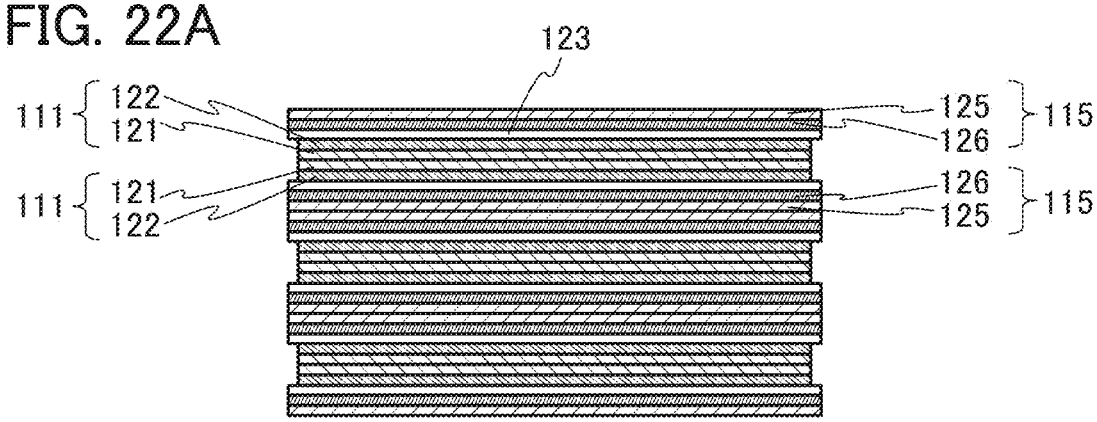
FIGS. 22A and 22B are diagrams each illustrating part of a cross section of a power storage device.

In the structures illustrated in FIGS. 21A to 21C, the separator 123 has a bag-like shape by which the positive electrodes 111 are surrounded; however, one embodiment of the present invention is not limited thereto. FIG. 22A illustrates an example in which the separator 123 has a different structure from that in FIG. 21A. The structure illustrated in FIG. 22A is different from that in FIG. 21A in that the separator 123, which is sheet-like, is provided between every pair of the positive electrode active material layer 122 and the negative electrode active material layer 126. In the structure illustrated in FIG. 22A, six positive electrodes 111 and six negative electrodes 115 are stacked, and six separators 123 are provided.

Figure 22B:
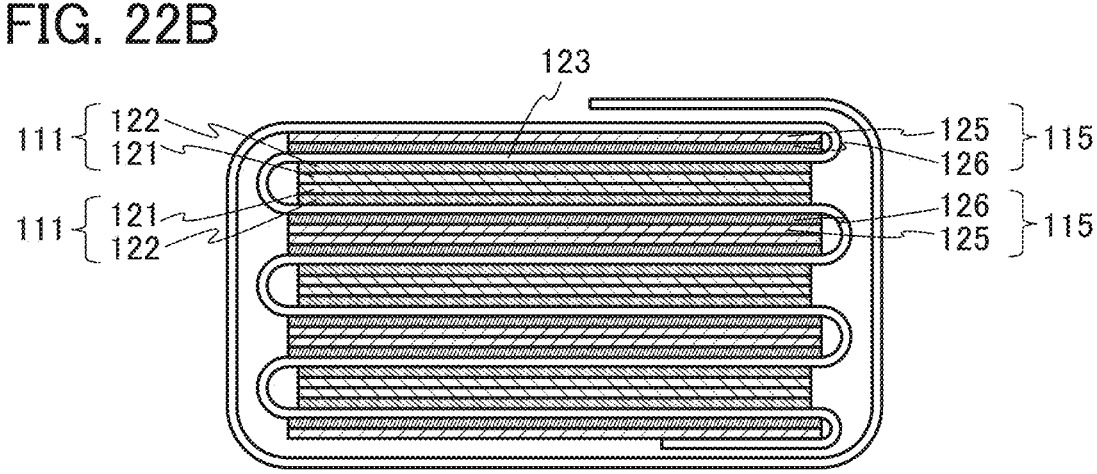

FIG. 22B illustrates an example in which the separator 123 different from that in FIG. 22A is provided. The structure illustrated in FIG. 22B is different from that in FIG. 22A in that one sheet of separator 123 is folded more than once to be interposed between every pair of the positive electrode active material layer 122 and the negative electrode active material layer 126. It can be said that the structure illustrated in FIG. 22B is a structure in which the separators 123 in the respective layers which are illustrated in FIG. 22A are extended and connected together between the layers. In the structure of FIG. 22B, six positive electrodes 111 and six negative electrodes 115 are stacked and thus the separator 123 is folded at least five times. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 23A:
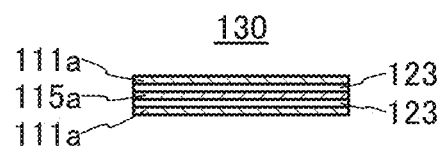
FIGS. 23A to 23C are diagrams each illustrating part of a cross section of a power storage device.
Figure 23B:
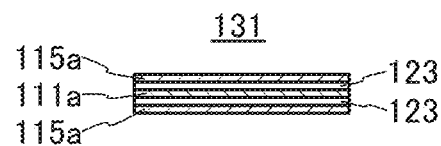
Figure 23C:
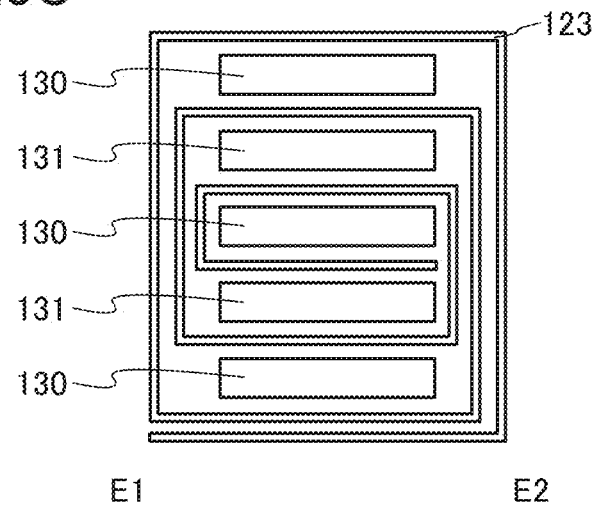

Note that the positive electrode, the negative electrode, and the separator may be stacked as illustrated in FIGS. 23A to 23C. FIG. 23A is a cross-sectional view of a first electrode assembly 130, and FIG. 23B is a cross-sectional view of a second electrode assembly 131. FIG. 23C is a cross-sectional view taken along the dashed-dotted line A1-A2 in FIG. 1A. In FIG. 23C, the first electrode assembly 130, the second electrode assembly 131, and the separator 123 are selectively illustrated for the sake of clarity.

As illustrated in FIG. 23C, the thin storage battery 500 includes a plurality of first electrode assemblies 130 and a plurality of second electrode assemblies 131.

As illustrated in FIG. 23A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 23B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 23C, the plurality of first electrode assemblies 130 and the plurality of second electrode assemblies 131 are covered with the wound separator 123.

<Coin-Type Storage Battery>

Figure 24A:
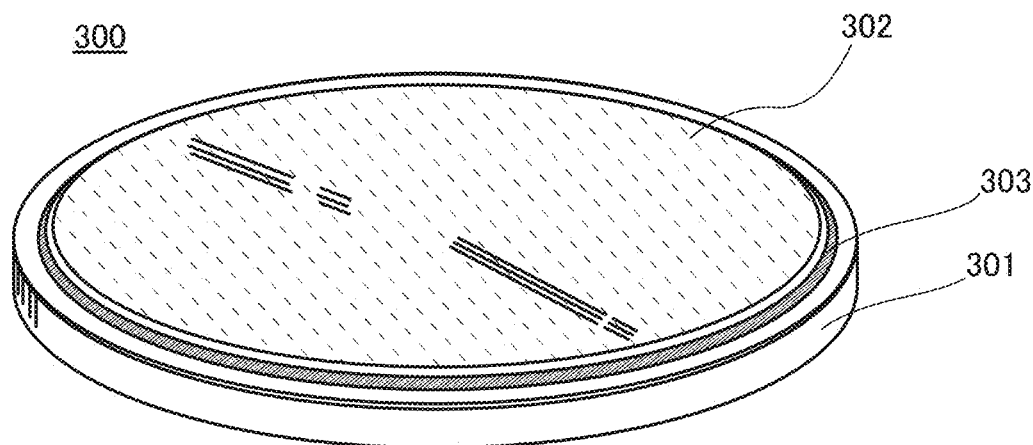
FIGS. 24A and 24B are diagrams illustrating a power storage device.
Figure 24B:
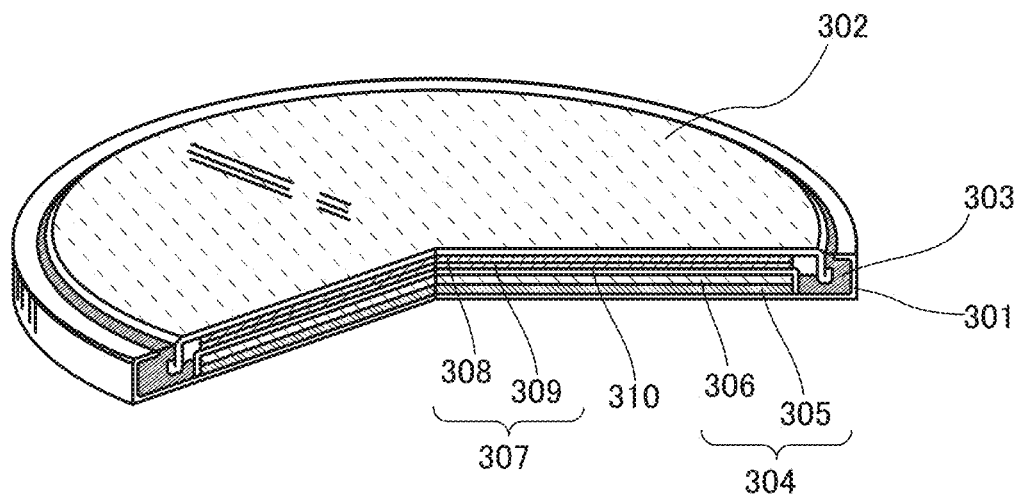

An example of a coin-type storage battery is described with reference to FIGS. 24A and 24B. FIG. 24A is an external view of a coin-type (single-layer flat type) storage battery, and FIG. 24B is a cross-sectional view thereof. As an exterior body of the coin-type storage battery, a positive electrode can and a negative electrode can are used.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel or the like) can be used. Alternatively, it is preferable to cover the positive electrode can 301 and the negative electrode can 302 with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 24B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Curvature of Exterior Body>

The exterior body of the power storage device can change its form such that the smallest curvature radius is greater than or equal to 3 mm and less than or equal to 30 mm, preferably greater than or equal to 3 mm and less than or equal to 10 mm. One or two films are used as the exterior body of the power storage device. The power storage device has a cross section sandwiched by two curved surfaces of the films when it is bent.

Figure 25A:
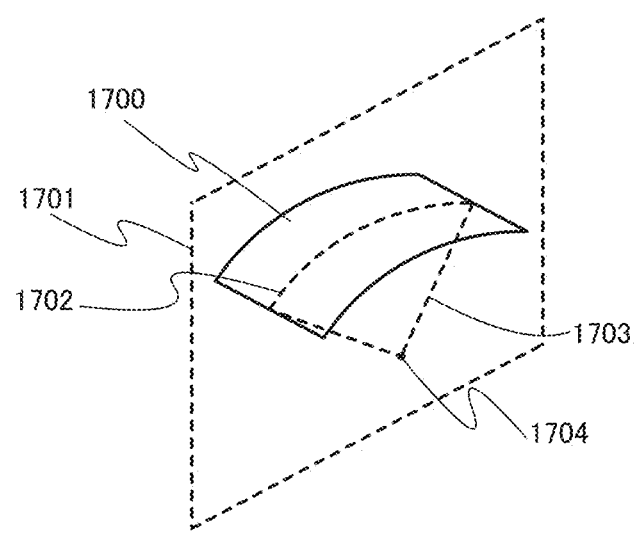
FIGS. 25A to 25C illustrate a curvature radius of a surface.
Figure 25B:
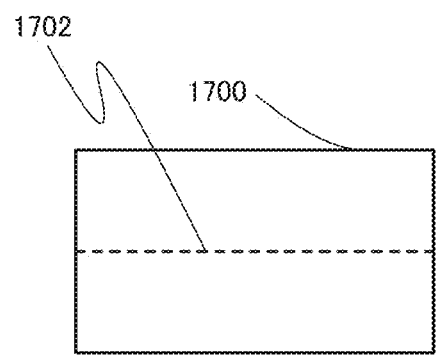
Figure 25C:
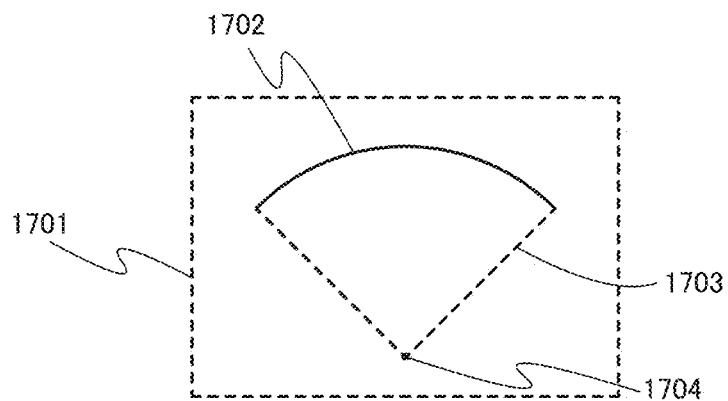

Description will be given of the radius of curvature of a surface with reference to FIGS. 25A to 25C. In FIG. 25A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 25B is a top view of the curved surface 1700. FIG. 25C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 26A:
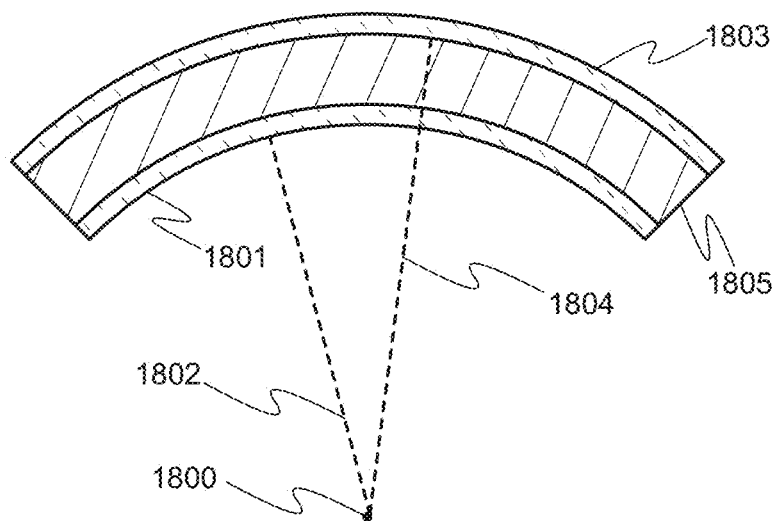
FIGS. 26A to 26D illustrate a curvature radius of a film.
Figure 26B:
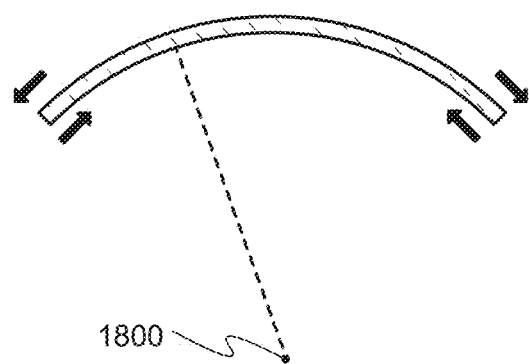

In the case of bending a power storage device in which a component 1805 including electrodes and an electrolyte solution is sandwiched between two films as exterior bodies, a radius 1802 of curvature of a film 1801 close to a center 1800 of curvature of the power storage device is smaller than a radius 1804 of curvature of a film 1803 far from the center 1800 of curvature (FIG. 26A). When the power storage device is curved and has an arc-shaped cross section, compressive stress is applied to a surface of the film on the side closer to the center 1800 of curvature and tensile stress is applied to a surface of the film on the side farther from the center 1800 of curvature (FIG. 26B). However, by forming a pattern including projections or depressions on surfaces of the exterior bodies, the influence of a strain can be reduced to be acceptable even when compressive stress and tensile stress are applied. For this reason, the power storage device can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 26C:
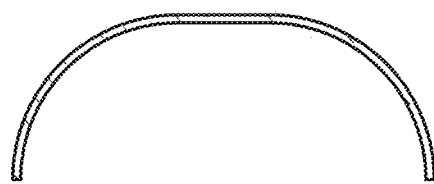
Figure 26D:
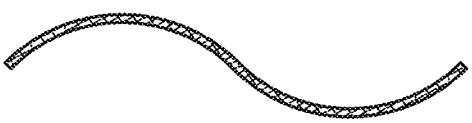

Note that the cross-sectional shape of the power storage device is not limited to a simple arc shape, and the cross section can be partly arc-shaped; for example, a shape illustrated in FIG. 26C, a wavy shape illustrated in FIG. 26D, or an S shape can be used. In the case where the curvature radius is changed by application of external force to the power storage device, the range of the curvature radius may be greater than or equal to 3 mm and less than or equal to 30 mm, for example. For example, the curvature radius of the power storage device which is bent to maximum, that is the smallest curvature radius, is preferably greater than or equal to 3 mm and less than or equal to 10 mm, and further preferably greater than or equal to 3 mm and less than or equal to 6 mm. Here, in the case where the curved surfaces of the power storage device have a plurality of curvature centers, the curvature radius of the power storage device may be the smallest curvature radius of one of the two external bodies whose curvature center is closer to the curvature center in the curved surface having the smallest curvature radius among curvature radii of the plurality of curvature centers.

<Curvature of Conductor>

The conductor of one embodiment of the present invention has a sheet-like shape and can be changed in its shape so that the smallest curvature radius is, for example, greater than or equal to 3 mm and less than or equal to 30 mm, and further preferably greater than or equal to 3 mm and less than or equal to 10 mm. Accordingly, the conductor of one embodiment of the present invention is less likely to be cracked by being wound or bent, for example. Thus, the conductor of one embodiment of the present invention is suitable for a wound power storage device. Furthermore, the conductor of one embodiment of the present invention can be changed in its shape in accordance with a change in shape of the power storage device by external force. Accordingly, when the conductor of one embodiment of the present invention is used for a flexible power storage device, the power storage device can have higher reliability.

Structural Example of Power Storage System

Structural examples of power storage systems will be described with reference to FIGS. 27A and 27B to FIGS. 29A and 29B. Here, a power storage system refers to, for example, a device including a power storage device.

Figure 27A:
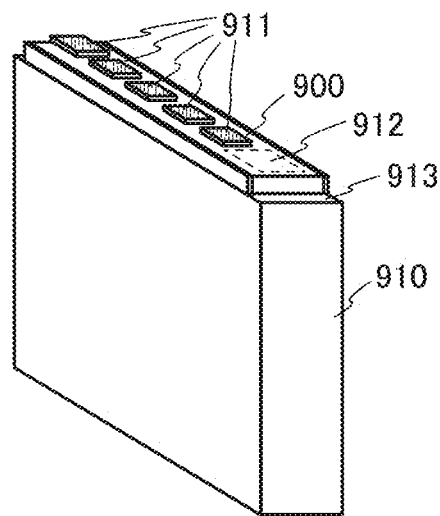
FIGS. 27A and 27B are diagrams illustrating an example of a power storage system.
Figure 27B:
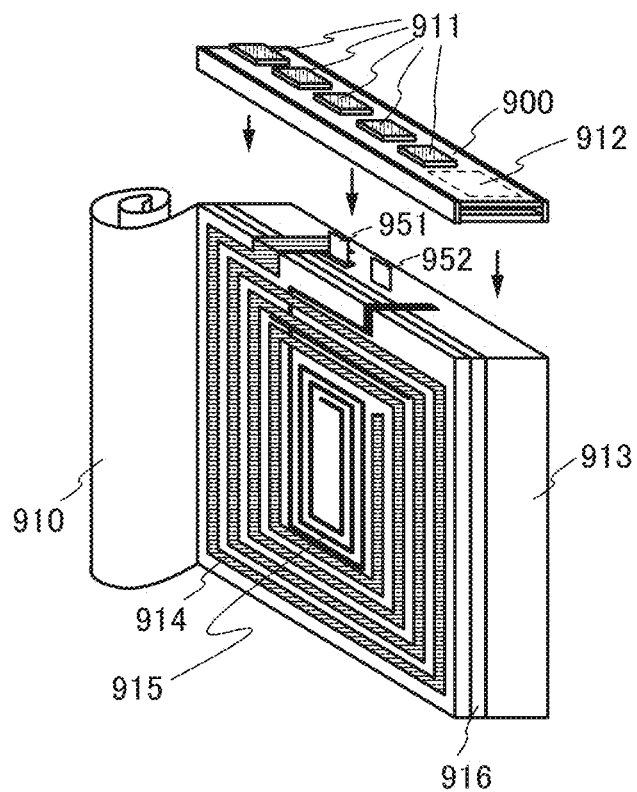

FIGS. 27A and 27B are external views of a power storage system. The power storage system includes a circuit board 900 and a storage battery 913. A label 910 is attached to the storage battery 913. As shown in FIG. 27B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 27A and 27B.

For example, as shown in FIGS. 28A1 and 28A2, two opposite surfaces of the storage battery 913 in FIGS. 27A and 27B may be provided with respective antennas. FIG. 28A1 is an external view showing one side of the opposite surfaces, and FIG. 28A2 is an external view showing the other side of the opposite surfaces. For portions similar to those in FIGS. 27A and 27B, the description of the power storage system illustrated in FIGS. 27A and 27B can be referred to as appropriate.

As illustrated in FIG. 28A1, the antenna 914 is provided on one of the opposite surfaces of the storage battery 913 with the layer 916 interposed therebetween, and as illustrated in FIG. 28A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 28B1 and 28B2, two opposite surfaces of the storage battery 913 in FIGS. 27A and 27B may be provided with different types of antennas. FIG. 28B1 is an external view showing one side of the opposite surfaces, and FIG. 28B2 is an external view showing the other side of the opposite surfaces. For portions similar to those in FIGS. 27A and 27B, the description of the power storage system illustrated in FIGS. 27A and 27B can be referred to as appropriate.

As illustrated in FIG. 28B1, the antennas 914 and 915 are provided on one of the opposite surfaces of the storage battery 913 with the layer 916 provided between the storage battery 913 and the antennas 914 and 915, and as illustrated in FIG. 28B2, an antenna 918 is provided on the other of the opposite surfaces of the storage battery 913 with the layer 917 provided therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 29A:
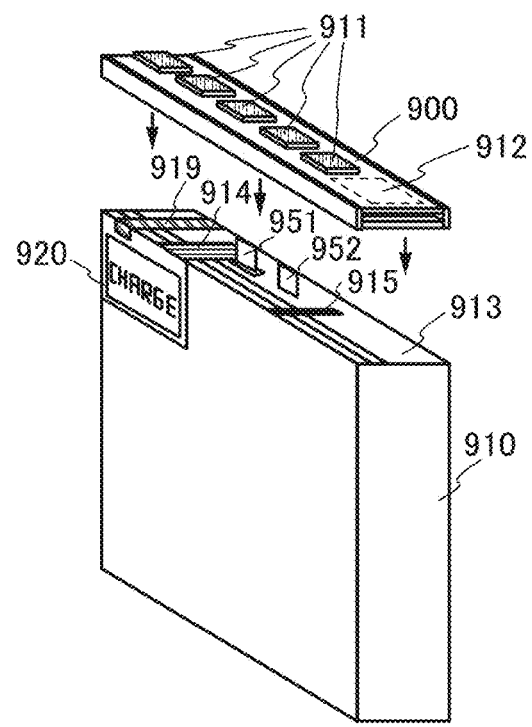
FIGS. 29A and 29B each illustrate an example of a power storage system.

Alternatively, as illustrated in FIG. 29A, the storage battery 913 in FIGS. 27A and 27B may be provided with a display device 920. The display device 920 is electrically connected to the terminal 911 via a terminal 919. It is possible that the label 910 is not provided in a portion where the display device 920 is provided. For portions similar to those in FIGS. 27A and 27B, the description of the power storage system illustrated in FIGS. 27A and 27B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 29B:
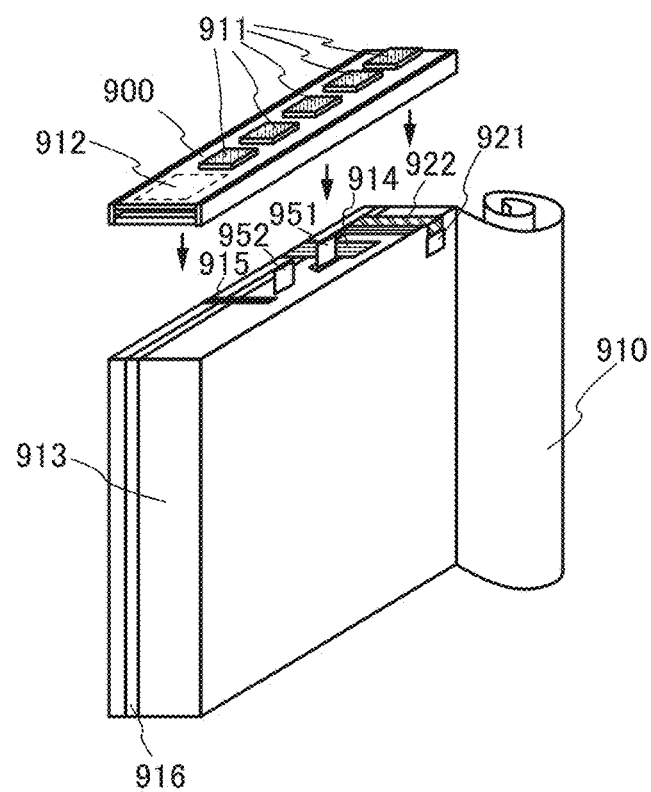

Alternatively, as illustrated in FIG. 29B, the storage battery 913 illustrated in FIGS. 27A and 27B may be provided with a sensor 921. The sensor 921 is electrically connected to the terminal 911 via a terminal 922. For portions similar to those in FIGS. 27A and 27B, the description of the power storage system illustrated in FIGS. 27A and 27B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 4

In this embodiment, an example of an electronic device including a flexible power storage device will be described.

FIGS. 30A to 30G illustrate examples of electronic devices including the flexible power storage devices described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 30A:
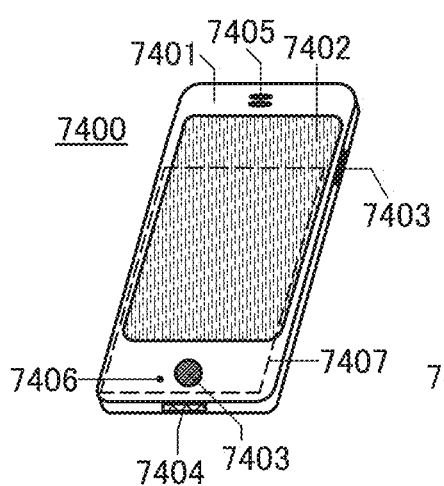
FIGS. 30A to 30G illustrate examples of electronic devices.

FIG. 30A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 30B:
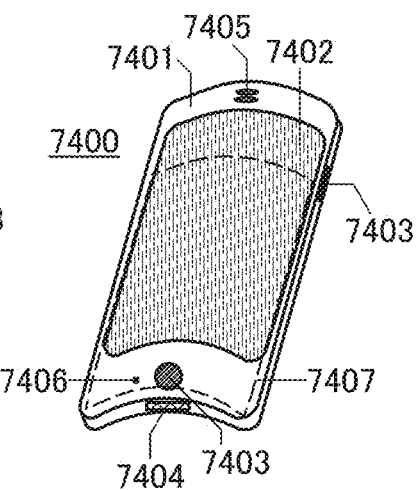
Figure 30C:
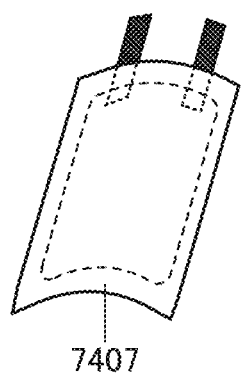

FIG. 30B illustrates the mobile phone 7400 that is bent. When the whole mobile phone 7400 is bent by the external force, the power storage device 7407 included in the mobile phone 7400 is also bent. FIG. 30C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 30D:
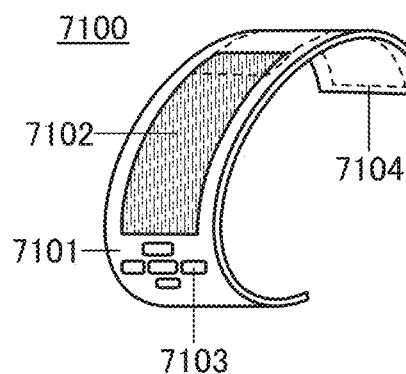
Figure 30E:
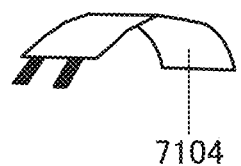

FIG. 30D illustrates an example of a bangle display device. A portable display device 7100 includes a housing 7101, a display portion 7102, an operation button 7103, and a power storage device 7104. FIG. 30E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 30F:
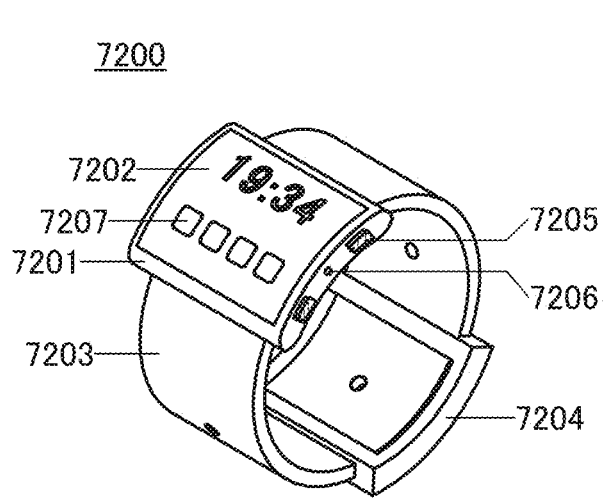

FIG. 30F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 30E that is in the state of being curved can be provided in the housing 7201. Alternatively, the power storage device 7104 illustrated in FIG. 30E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 30G:
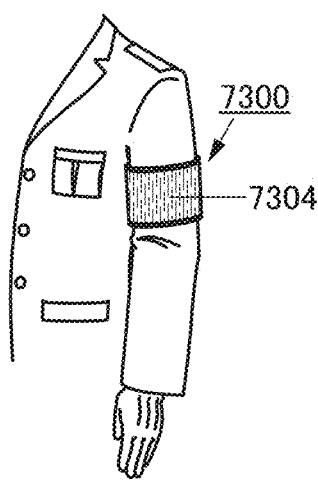

FIG. 30G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 5

In this embodiment, examples of electronic devices that can include power storage devices will be described.

Figure 31A:
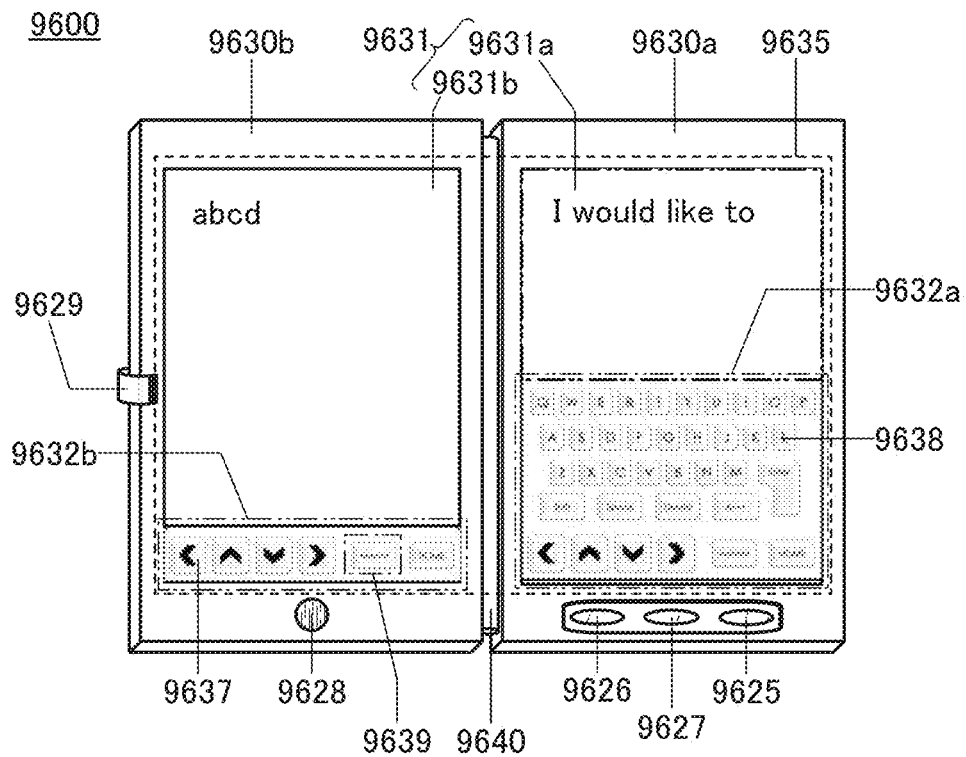
FIGS. 31A to 31C illustrate an example of an electronic device.
Figure 31B:
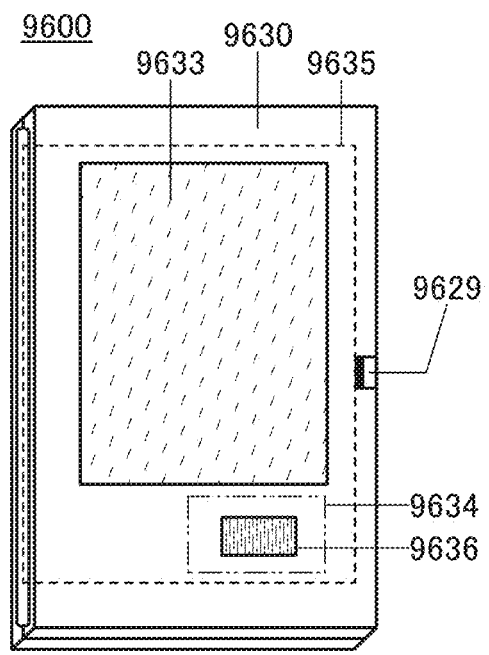

FIGS. 31A and 31B illustrate an example of a tablet terminal that can be folded in half. A tablet terminal 9600 illustrated in FIGS. 31A and 31B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 31A illustrates the tablet terminal 9600 that is opened, and FIG. 31B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 31A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 31A, one embodiment of the present invention is not limited to this example. The display portion 9631*a* and the display portion 9631*b* may have different areas or different display quality. For example, one of the display portions 9631a and 9631b may display higher definition images than the other.

The tablet terminal is closed in FIG. 31B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 31A and 31B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 31C:
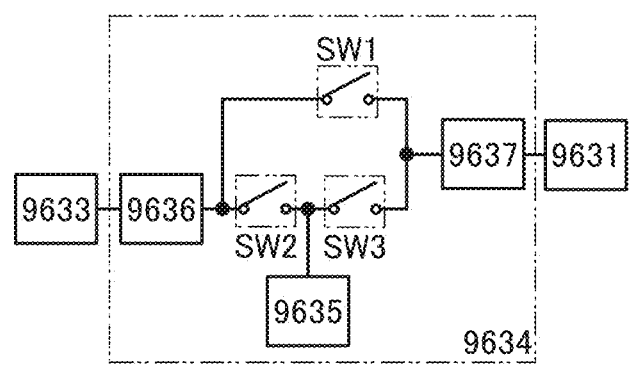

The structure and operation of the charge and discharge control circuit 9634 illustrated in FIG. 31B will be described with reference to a block diagram in FIG. 31C. The solar cell 9633, the power storage unit 9635, the DCDC converter 9636, a converter 9637, switches SW1 to SW3, and the display portion 9631 are illustrated in FIG. 31C, and the power storage unit 9635, the DCDC converter 9636, the converter 9637, and the switches SW1 to SW3 correspond to the charge and discharge control circuit 9634 in FIG. 31B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 32:
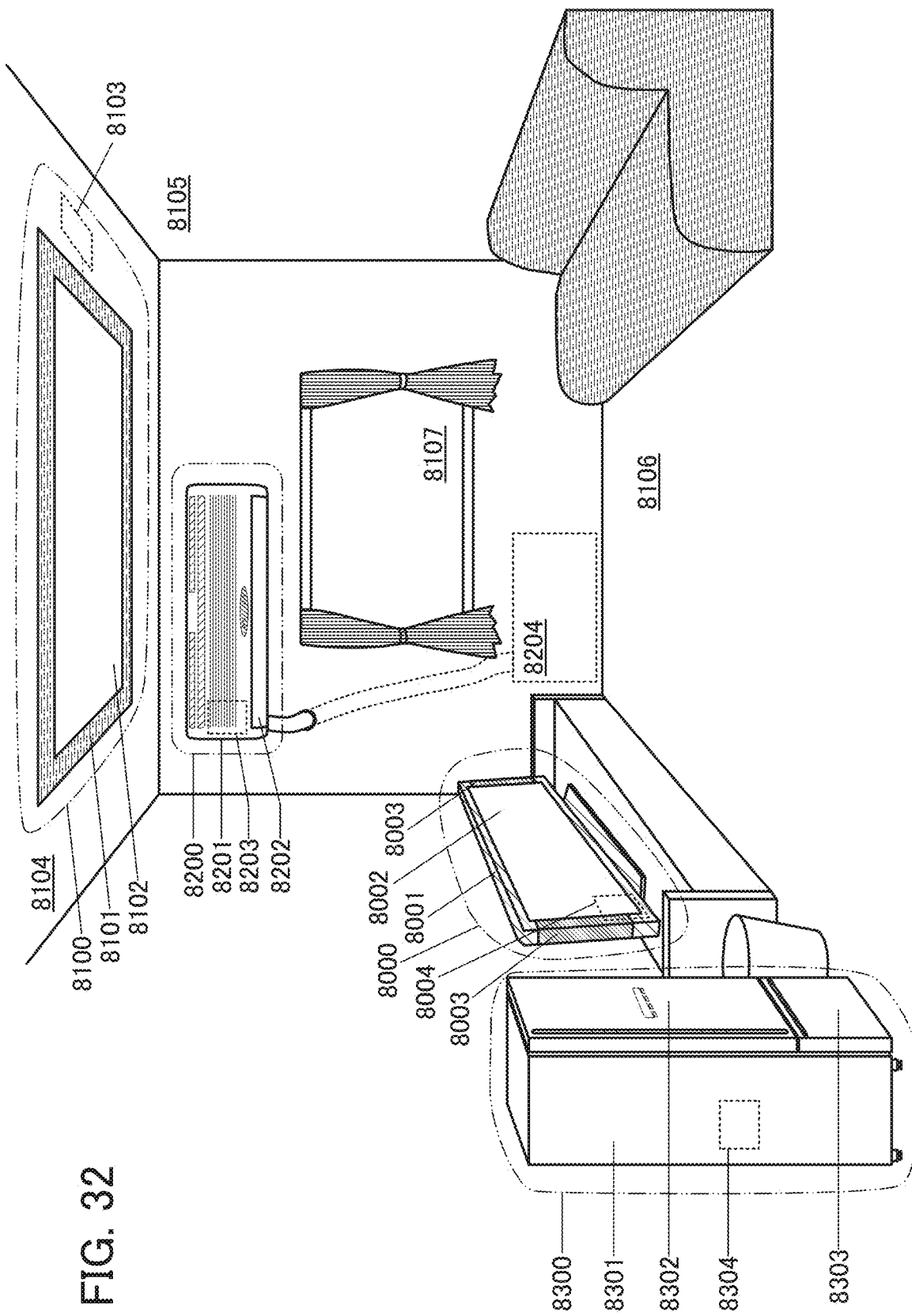
FIG. 32 illustrates an example of an electronic device.

FIG. 32 illustrates other examples of electronic devices. In FIG. 32, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 32, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 32 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 32 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and a light-emitting element such as an LED or an organic EL element are given as examples of the artificial light source.

In FIG. 32, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 32 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 32 as an example, the power storage device of one embodiment of the present invention can be used in an air conditioner in which the functions of an indoor unit and an outdoor unit are integrated in one housing.

In FIG. 32, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 32. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 6

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 33A:
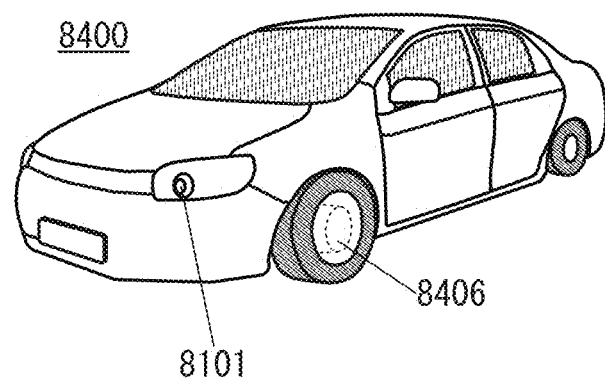
FIGS. 33A and 33B illustrate examples of electronic devices.
Figure 33B:
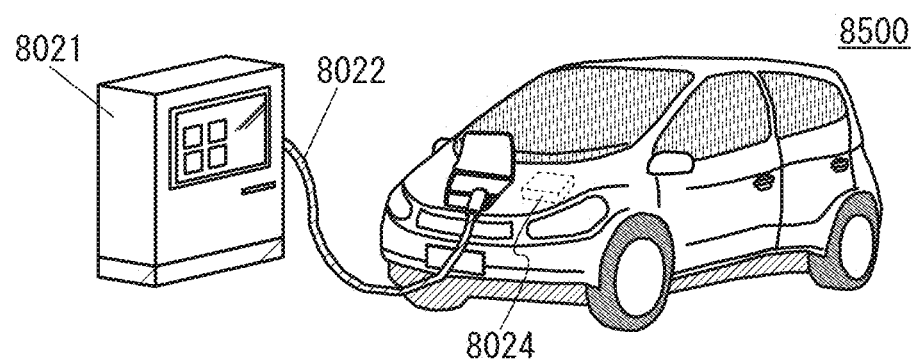

FIGS. 33A and 33B each illustrate an example of a vehicle using one embodiment of the present invention. An automobile 8400 illustrated in FIG. 33A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 33B illustrates an automobile 8500 including the power storage device. The automobile 8500 can be charged when the power storage device is supplied with electric power through external charging equipment by a plug-in system, a contactless power feeding system, or the like. In FIG. 33B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

A battery management unit (BMU) that can be used in combination with battery cells each including the materials described in the above embodiment and transistors that are suitable for a circuit included in the battery management unit will be described with reference to FIG. 34 to FIG. 40. In this embodiment, in particular, a battery management unit of a power storage device including battery cells connected in series will be described.

When a plurality of battery cells connected in series is charged and discharged repeatedly, each battery cell has different capacity (output voltage) from one another due to the variation in characteristics among the battery cells. A discharge capacity of all of the plurality of battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an InGaZnO$_4$ crystal is analyzed by an out-of-plane method using an X-ray diffraction (XRD) apparatus, a peak may appear at a diffraction angle (2θ) of around 31°. This peak is derived from the (009) plane of the InGaZnO$_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 34:
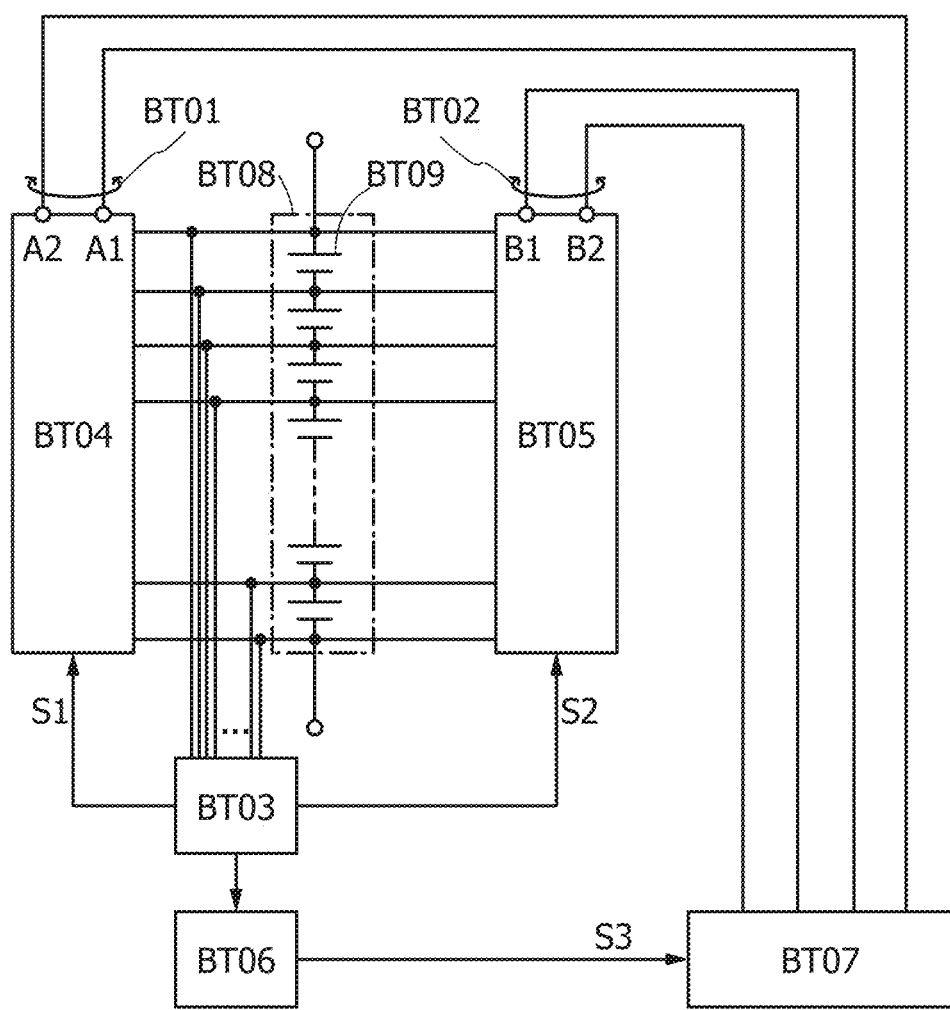
FIG. 34 is a block diagram showing one embodiment of the present invention.

FIG. 34 is an example of a block diagram of the power storage device. A power storage device BT00 illustrated in FIG. 34 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 34, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 35A:
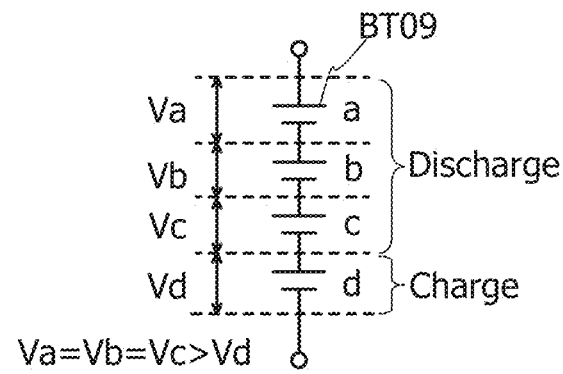
FIGS. 35A to 35C are schematic views illustrating one embodiment of the present invention.
Figure 35B:
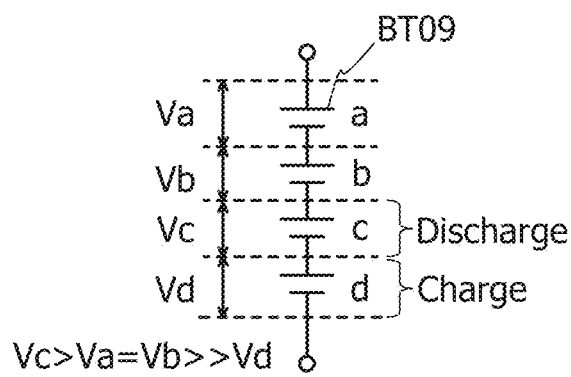
Figure 35C:
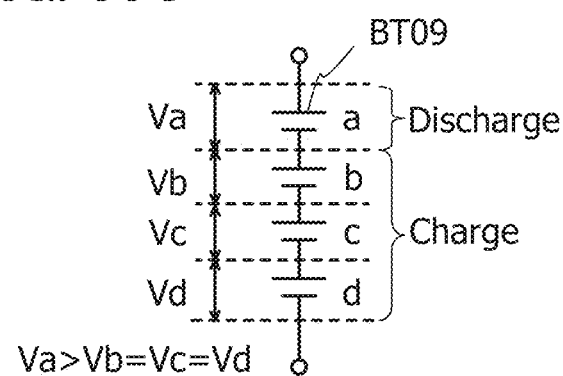

Here, operation examples of the switching control circuit BT03 in this embodiment will be described with reference to FIGS. 35A to 35C. FIGS. 35A to 35C illustrate the operation examples of the switching control circuit BT03. Note that FIGS. 35A to 35C each illustrate the case where four battery cells BT09 are connected in series as an example for convenience of explanation.

FIG. 35A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 35B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost overdischarged, the switching control circuit BT03 preferentially selects the low-voltage cell d as the charge battery cell group instead of the series of two low-voltage cells a and b.

Lastly, FIG. 35C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 35A to 35C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 36:
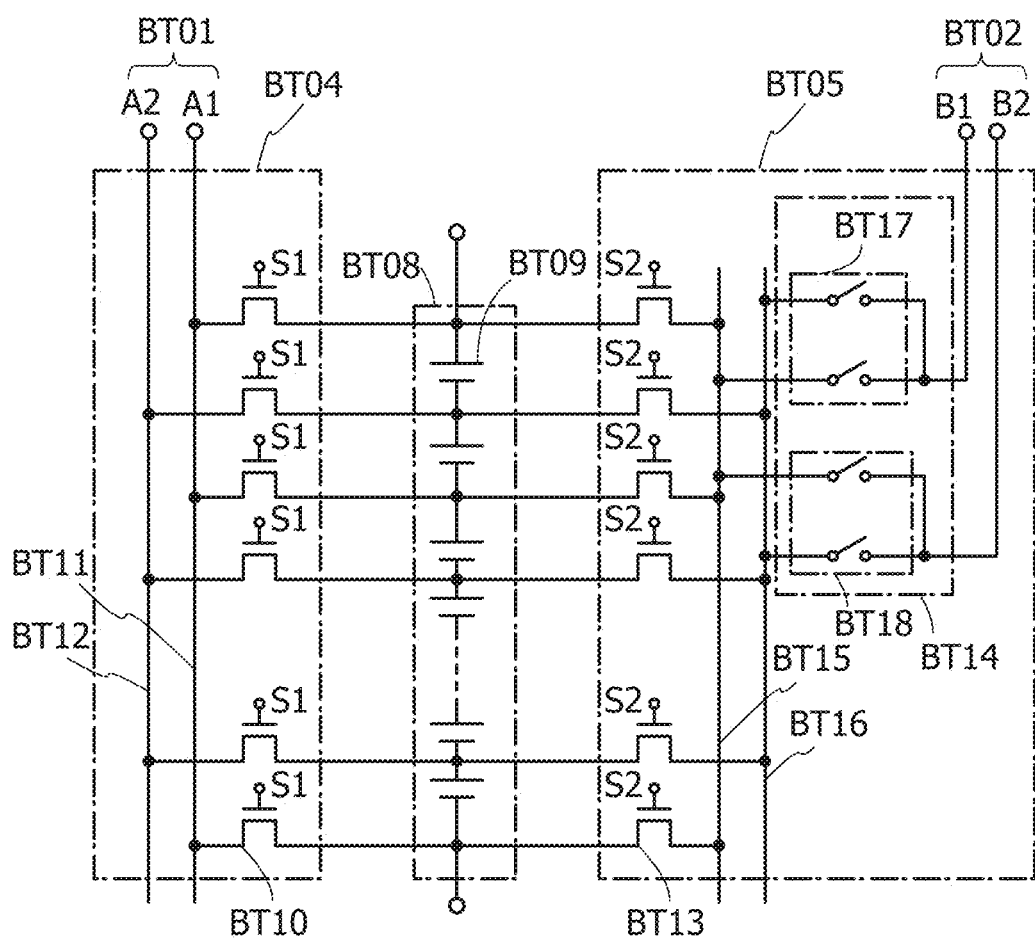
FIG. 36 is a circuit diagram illustrating one embodiment of the present invention.
Figure 37:
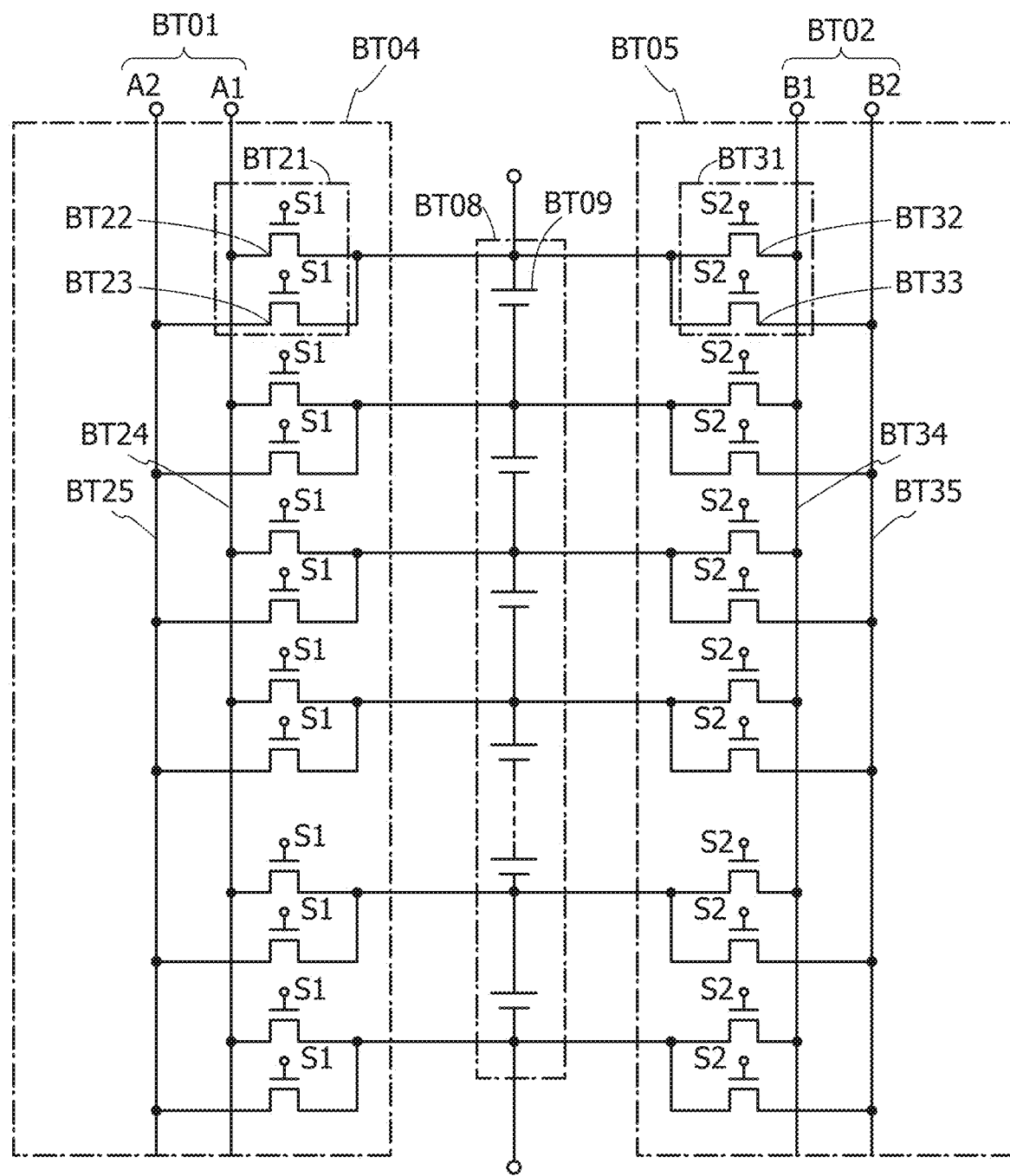
FIG. 37 is a circuit diagram illustrating one embodiment of the present invention.

FIG. 36 and FIG. 37 are circuit diagrams showing configuration examples of the switching circuits BT04 and BT05.

In FIG. 36, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 36, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or a drain of the transistor BT13 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 branch off from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 37 is a circuit diagram illustrating configuration examples of the switching circuit BT04 and the switching circuit BT05 which are different from those of FIG. 36.

In FIG. 37, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 38A:
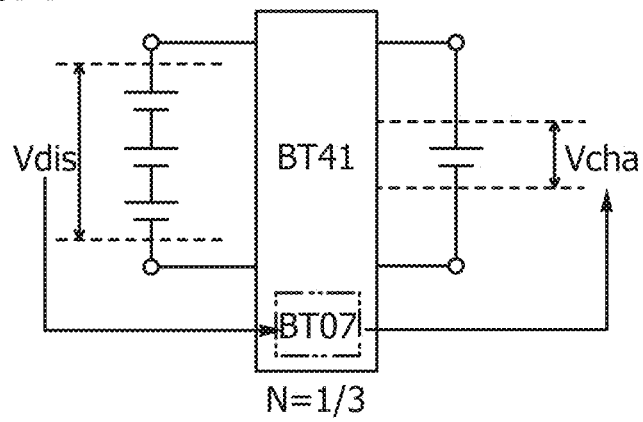
FIGS. 38A to 38C are schematic views illustrating one embodiment of the present invention.
Figure 38B:
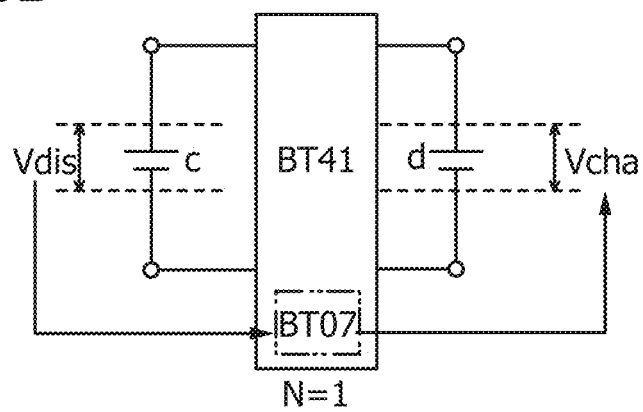
Figure 38C:
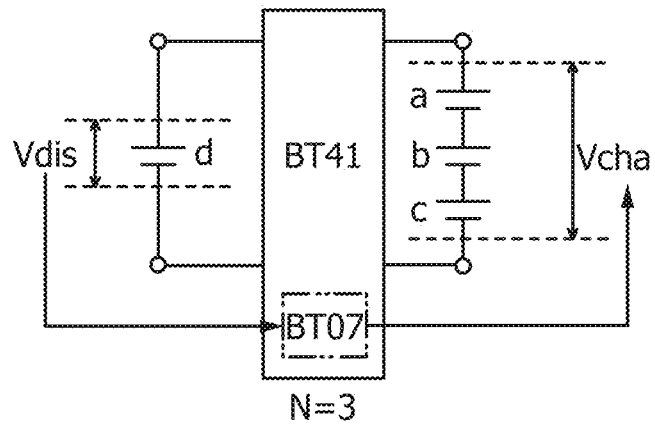
Figure 49A:
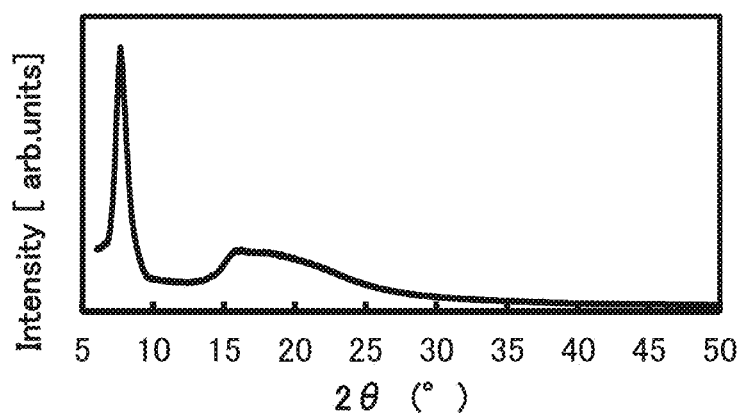
FIGS. 49A and 49B show XRD evaluation results.
Figure 49B:
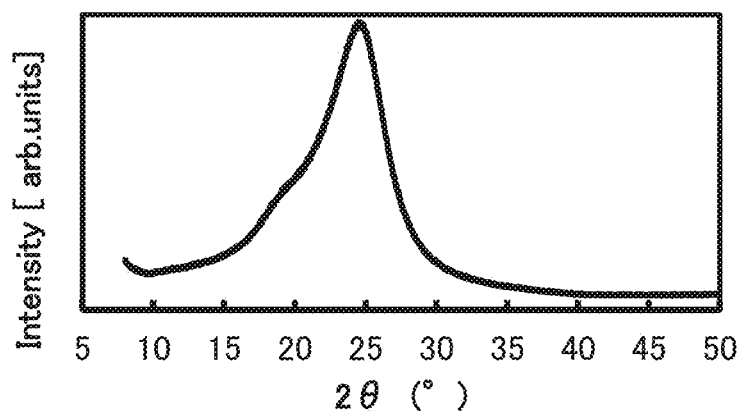

Here, operation examples of the voltage transformation control circuit BT06 in this embodiment will be described with reference to FIGS. 38A to 38C. FIGS. 49A to 49C are conceptual diagrams for explaining the operation examples of the voltage transformation control circuits BT06 for the discharge battery cell groups and the charge battery cell groups described in FIGS. 35A to 35C. FIGS. 38A to 38C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 38A, the series of three high-voltage cells a to c and one low-voltage cell d are connected in series as described in FIG. 35A. In this case, as described using FIG. 35A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 38A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the conversion ratio N for raising or lowering voltage larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N for raising or lowering voltage in order to make the voltage of the charge battery cell group equal to the charging voltage. The value of the current is set by the voltage transformation control circuit BT06.

In the example illustrated in FIG. 38A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N for raising or lowering voltage. Then, the voltage transformation control circuit BT06 outputs the voltage transformation signal S3, which lowers the discharging voltage in accordance with the conversion ratio N for raising or lowering voltage and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 38B and 38C, the conversion ratio N for raising or lowering voltage is calculated in a manner similar to that of FIG. 38A. In each of the examples illustrated in FIGS. 38B and 38C, since the number of the battery cells BT09 included in the discharge battery cell group is less than or equal to the number of the battery cells BT09 included in the charge battery cell group, the conversion ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 39:
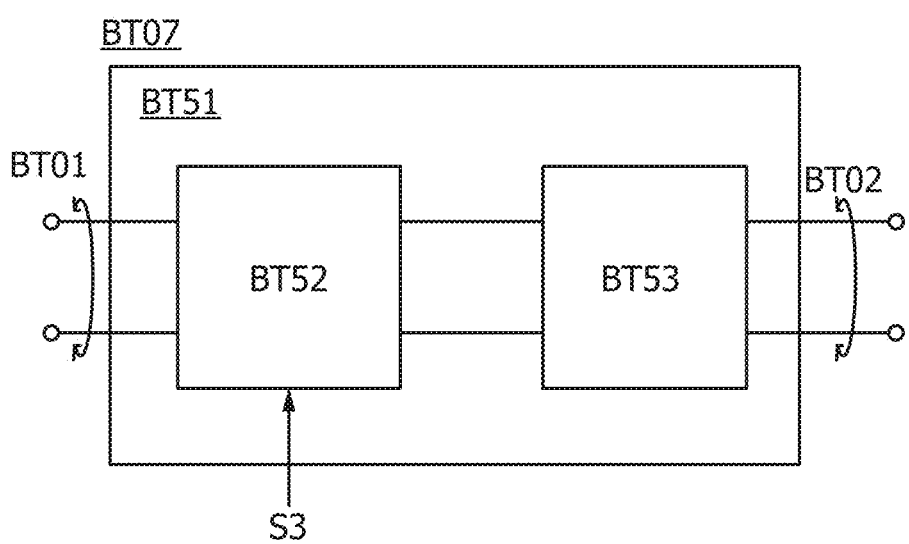
FIG. 39 is a block diagram showing one embodiment of the present invention.

The configuration of the voltage transformer circuit BT07 including the insulated DC-DC converter is illustrated in FIG. 39. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 40:
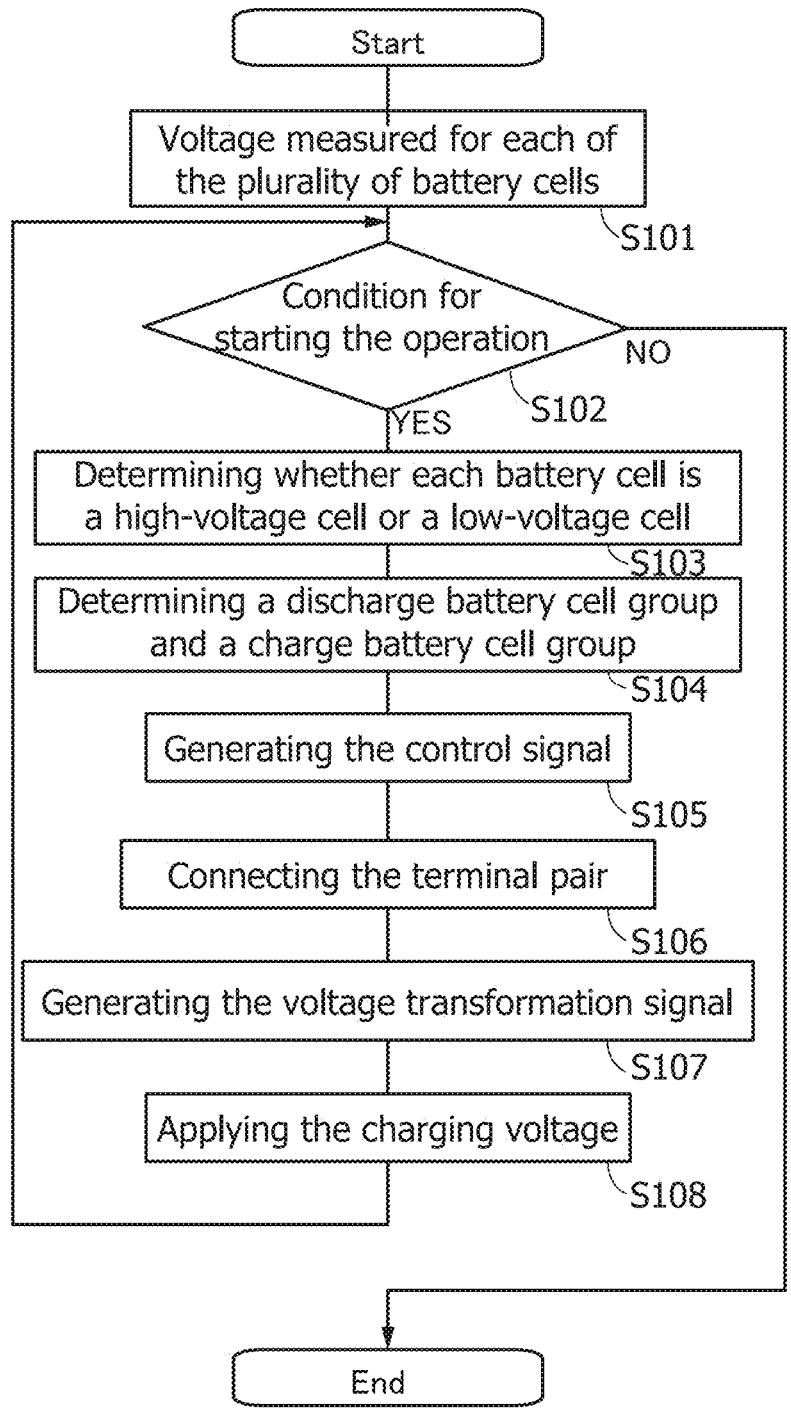
FIG. 40 is a flow chart showing one embodiment of the present invention.

A flow of operations of the power storage device BT00 in this embodiment will be described with reference to FIG. 40. FIG. 40 is a flow chart showing the flow of the operations of the power storage device BT00.

First, the power storage device BT00 obtains a voltage measured for each of the plurality of battery cells BT09 (step S101). Then, the power storage device BT00 determines whether or not the condition for starting the operation of reducing variations in voltage of the plurality of battery cells BT09 is satisfied (step S102). For example, the condition that the difference between the maximum value and the minimum value of the voltage measured for each of the plurality of battery cells BT09 is higher than or equal to the predetermined threshold value can be used. In the case where the condition is not satisfied (step S102: NO), the power storage device BT00 does not perform the following operation because voltages of the battery cells BT09 are well balanced. In contrast, in the case where the condition is satisfied (step S102: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of the battery cells BT09 included in the discharge battery cell group and the number of the battery cells BT09 included in the charge battery cell group (step S107). Then, the power storage device BT00 converts, in response to the voltage transformation signal S3, the discharging voltage applied to the terminal pair BT01 into a charging voltage and applies the charging voltage to the terminal pair BT02 (step S108). In this way, charge of the discharge battery cell group is transferred to the charge battery cell group.

Although the plurality of steps are shown in order in the flow chart of FIG. 40, the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in combination with any of the other embodiments as appropriate.

Example 1

In this example, an example of the method for forming the conductor described in Embodiment 1, and the physical property and characteristics of the obtained conductor are described.

<Formation of Conductor>

A method for forming the conductor 201 of one embodiment of the present invention is described.

Figure 53A:
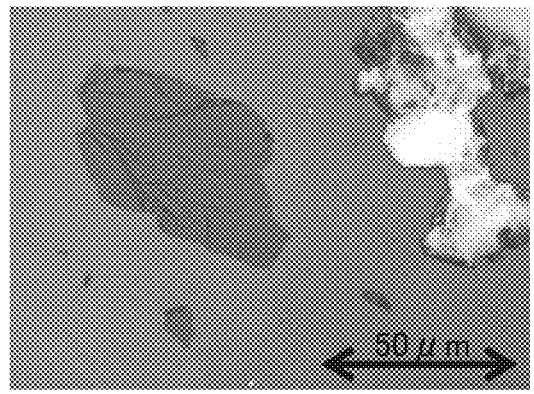
FIGS. 53A to 53C are optical micrographs.
Figure 53B:
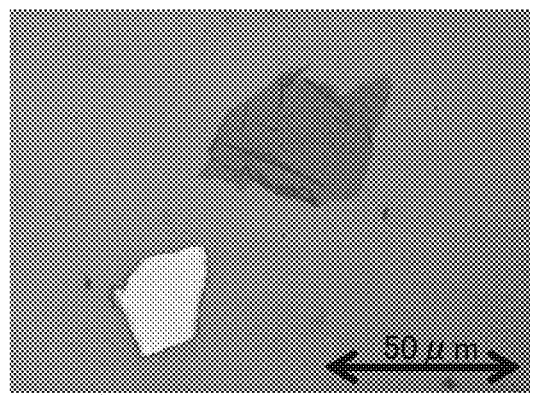
Figure 53C:
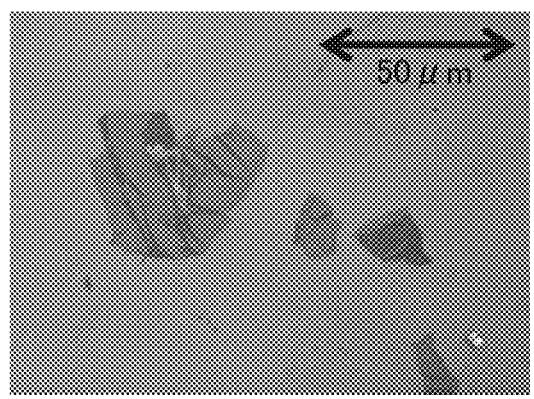

First, graphene oxide was prepared. As the graphene oxide, graphene oxide formed by using flake graphite as a raw material and oxidizing the flake graphite with potassium permanganate and sulfuric acid by the modified Hummers method was used. After a silicon nitride film was formed over a silicon wafer, a solution in which the graphene oxide was dispersed into water was applied, and the graphene oxide was observed with an optical microscope. Many flakes of the graphene oxide had a size of approximately 15 µm to 50 µm, for example. FIGS. 53A to 53C shows examples of optical micrographs of the graphene oxide.

Next, the graphene oxide was dispersed in a solvent to form graphene oxide dispersion liquid. 600 ml of water was added to 200 ml of dispersion liquid in which 3 weight % of graphene oxide was dispersed in water, and stirring was performed for 12 hours with a stirrer at 600 rpm, so that dispersion liquid A was formed.

Next, a graphene compound sheet (represented by GO-1) was formed using graphene oxide dispersion liquid as a raw material by a spray dry method. Here, GO-1 was formed on a wall surface of a chamber of a spray dry apparatus. The following shows details.

As the spray dry apparatus, a mini spray dryer B-290 manufactured by Nihon BUCHI K.K. was used. An inlet was set to 160° C. It is considered that a nozzle and the vicinity thereof were heated to a temperature higher than or equal to 100° C. The dispersion liquid A was supplied to the nozzle of the spray dry apparatus at a rate of approximately 65 ml/minute. The dispersion liquid A was supplied from the nozzle to the chamber in the form of mist together with a nitrogen gas at a flow rate of 60 L/min.

Part of the dispersion liquid A supplied to the chamber in the form of mist was collected to a collection container as powder of the graphene oxide, and the other part was formed as GO-1 on an inner wall of a wall 281a of a cylindrical chamber. FIG. 41 is a photograph of GO-1 formed on the inner wall.

Figure 42:
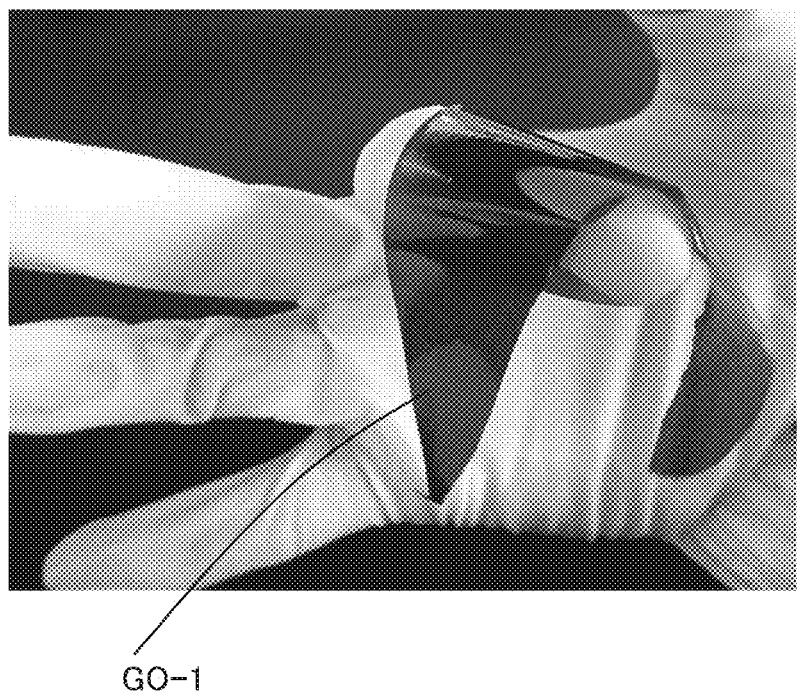
FIG. 42 is a photograph showing one embodiment of the present invention.
Figure 54A:
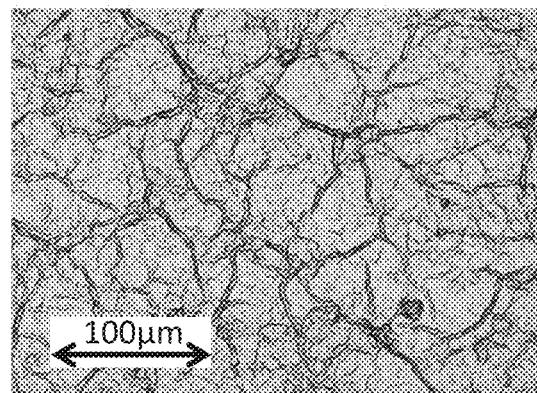
FIG. 54A is an optical micrograph and FIG. 54B shows a SEM observation result.
Figure 54B:
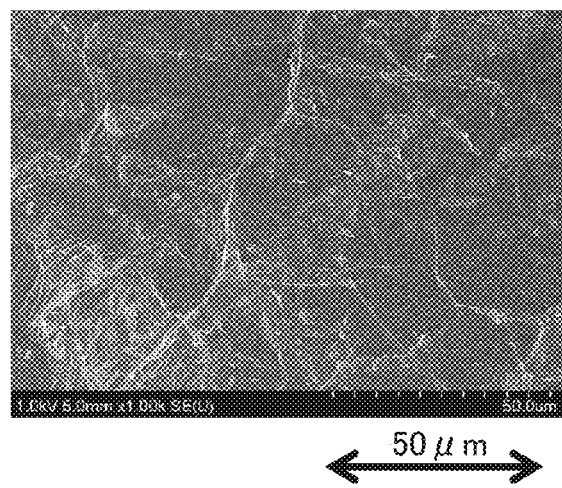

Next, GO-1 was peeled from the inner wall of the chamber. GO-1 includes a plurality of sheets of graphene oxide overlapping with each other. The average of the thicknesses of GO-1 was 8.6 µm. Ten points in a region of approximately 10 cm square in GO-1 were measured, and the average was calculated. GO-1 which was obtained was subjected to XRD evaluation and electrical conductivity measurement. The results are shown later. FIG. 42 is an example of a photograph of GO-1. FIG. 54A is an optical micrograph of GO-1, and FIG. 54B is an SEM image thereof.

Figure 43:
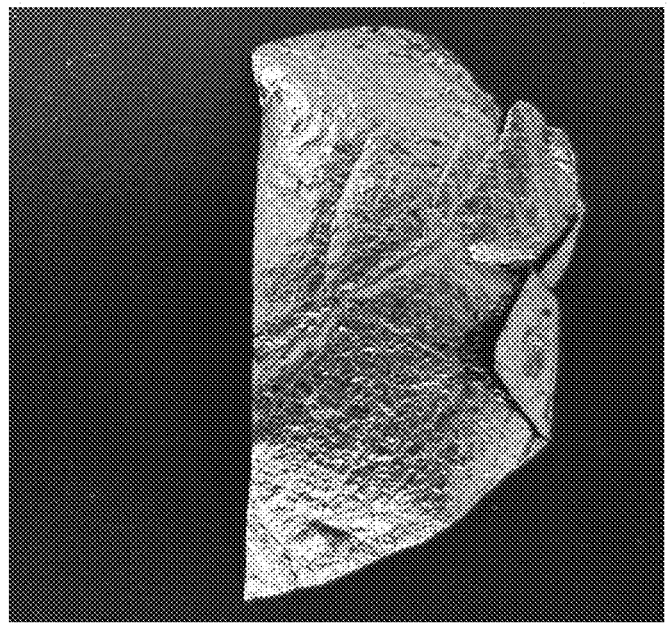
FIG. 43 is a photograph showing one embodiment of the present invention.
Figure 55A:
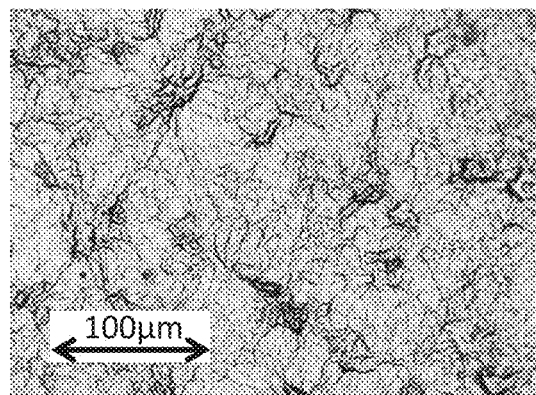
FIGS. 55A and 55B are optical micrographs.
Figure 55B:
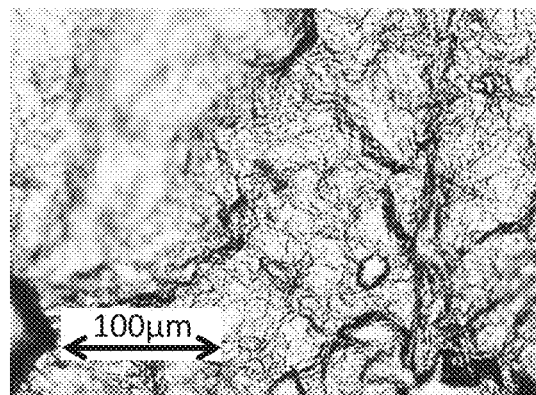
Figure 56A:
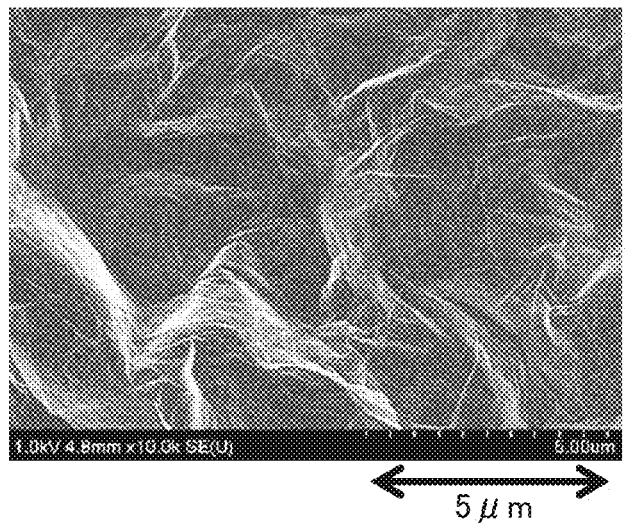
FIGS. 56A and 56B show SEM observation results.
Figure 56B:
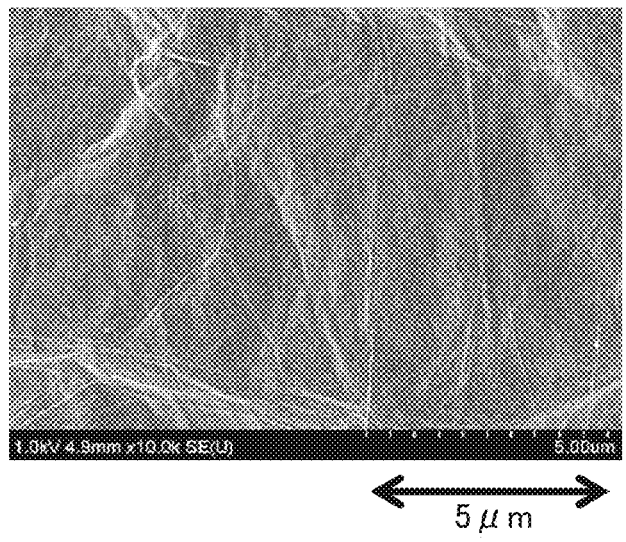

Next, GO-1 was subjected to reduction treatment to obtain conductors. Here, as conditions for the reduction treatment, three conditions were employed. In the obtained conductors, a conductor which was subjected to only thermal reduction at 250° C. is referred to as RGO-1A, a conductor which was subjected to only thermal reduction at 300° C. is referred to as RGO-1B, and a conductor which was subjected to chemical reduction and then subjected to thermal reduction at 250° C. is referred to as RGO-1C. FIG. 43 is an example of a photograph of RGO-1C. FIGS. 55A and 55B are optical micrographs of RGO-1A and the RGO-1C. FIGS. 56A and 56B are SEM images of RGO-1A and RGO-1C.

Graphene oxide included in GO-1 was reduced by the reduction treatment, and thus the oxygen content was reduced. RGO-1A to RGO-1C each include a graphene compound. RGO-1A to RGO-1C are each a graphene compound sheet.

Conditions for chemical reduction are described. Ascorbic acid was used as a reducing agent, and an ethanol water solution at a concentration of 80% was used as a solvent. 0.3375 g of ascorbic acid and 0.078 g of lithium hydroxide were added to 100 ml of an ethanol water solution to form a reducing solution.

GO-1 which was obtained was put in the reducing solution, and reduction was performed at 60° C. for 3 hours. After that, washing was performed with ethanol.

Next, conditions of the thermal reduction are described. Heat treatment was performed at 250° C. in a reduced-pressure atmosphere (1 kPa) for 10 hours. Through the above process, RGO-1A to RGO-1C of sheet-like conductors were obtained.

<Evaluation of Conductor or the Like>

Next, evaluation results of the physical properties and characteristics of GO-1 and RGO-1A to RGO-1C are described.

The electrical conductivities of the obtained samples were measured. For the measurement of the electrical conductivities, Loresta GP (MCP-T610) manufactured by Mitsubishi Chemical Analytech, Co., Ltd. was used. MCP-TP06P was used for a probe, and the measurement was performed at room temperature.

The electrical conductivities of GO-1, RGO-1A, RGO-1B, and RGO-1C were 0.0021 S/cm, 4.2 S/cm, 6.3 S/cm, and 25 S/cm, respectively.

Figure 44A:
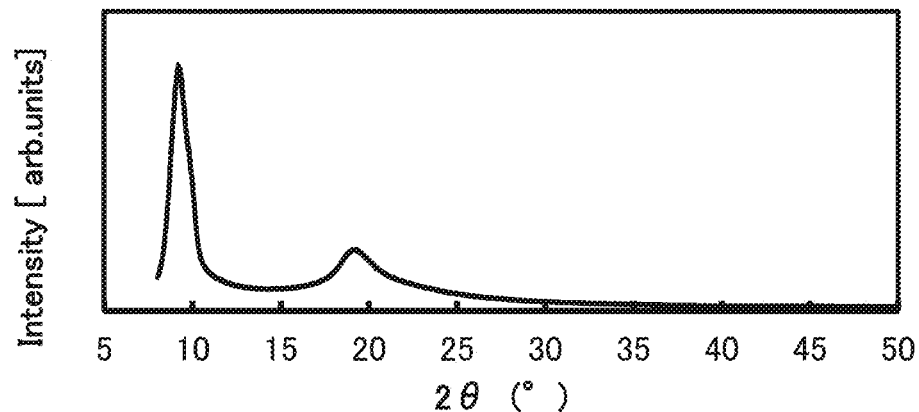
FIGS. 44A to 44C show XRD evaluation results.
Figure 44B:
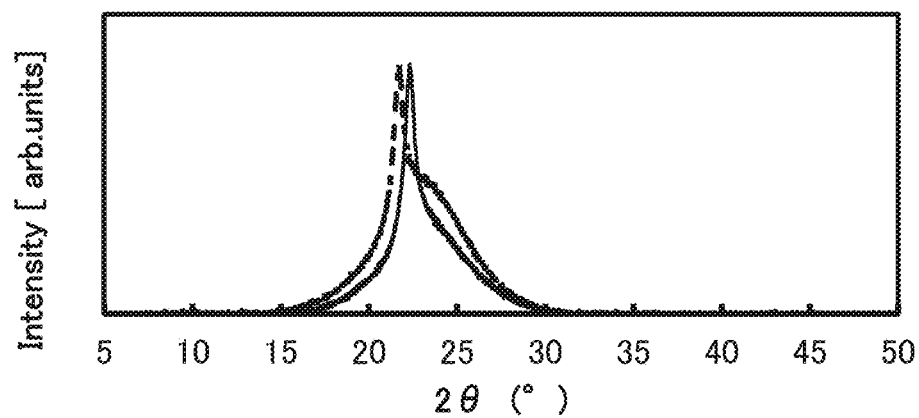
Figure 44C:
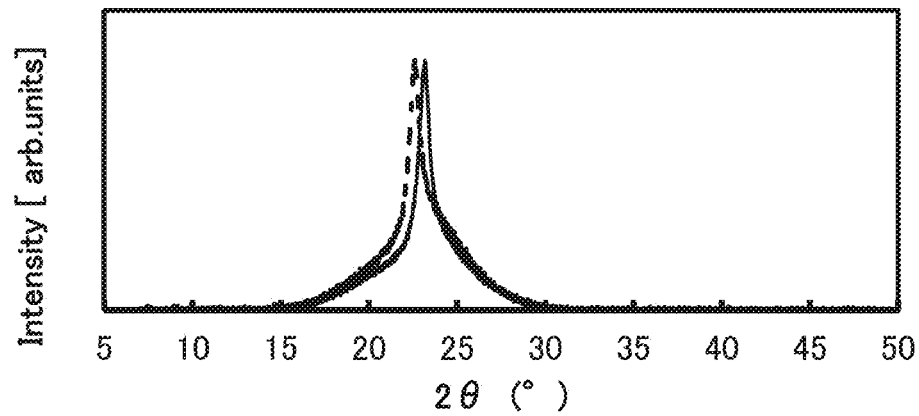
Figure 45A:
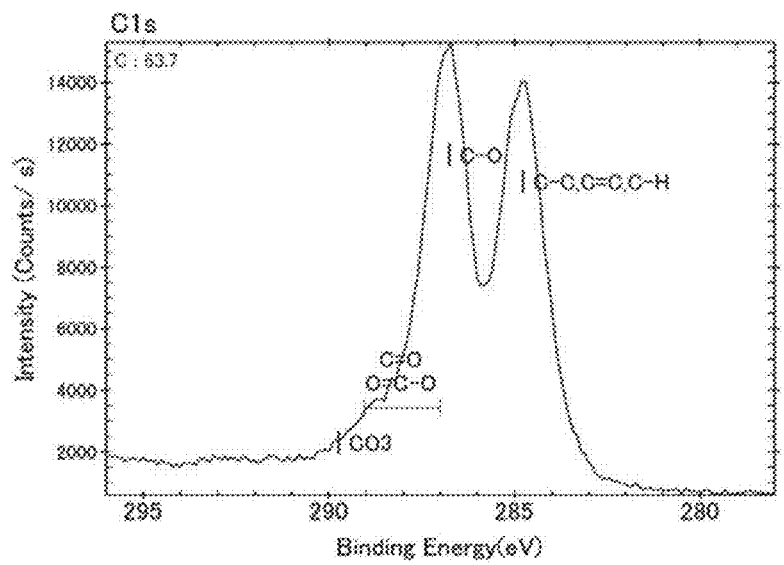
FIGS. 45A and 45B show XPS analysis results.
Figure 45B:
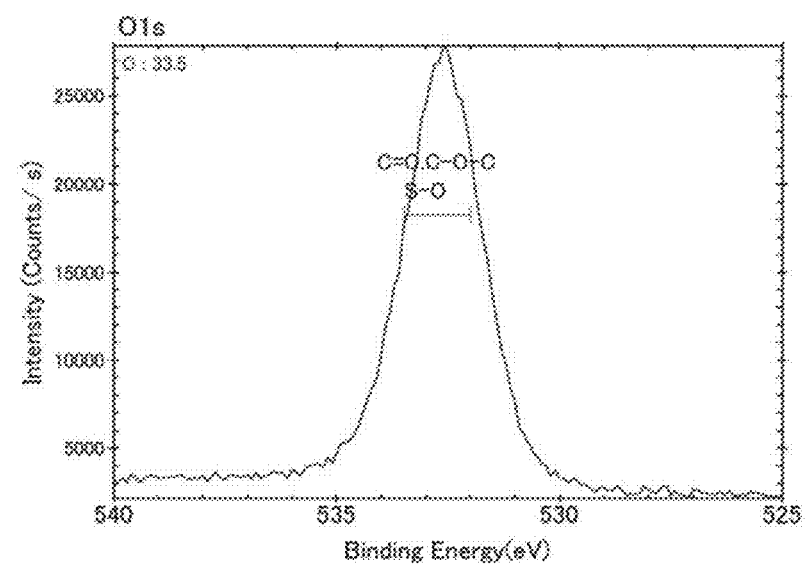
Figure 46A:
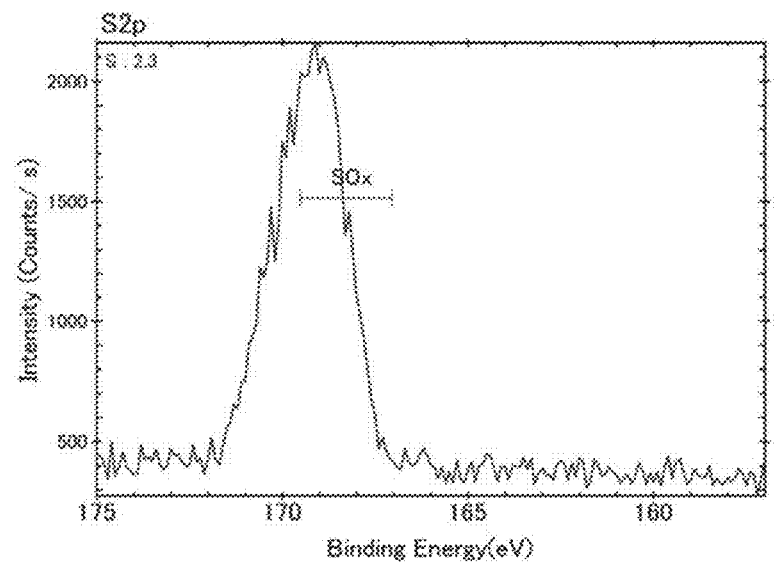
FIGS. 46A and 46B show XPS analysis results.
Figure 46B:
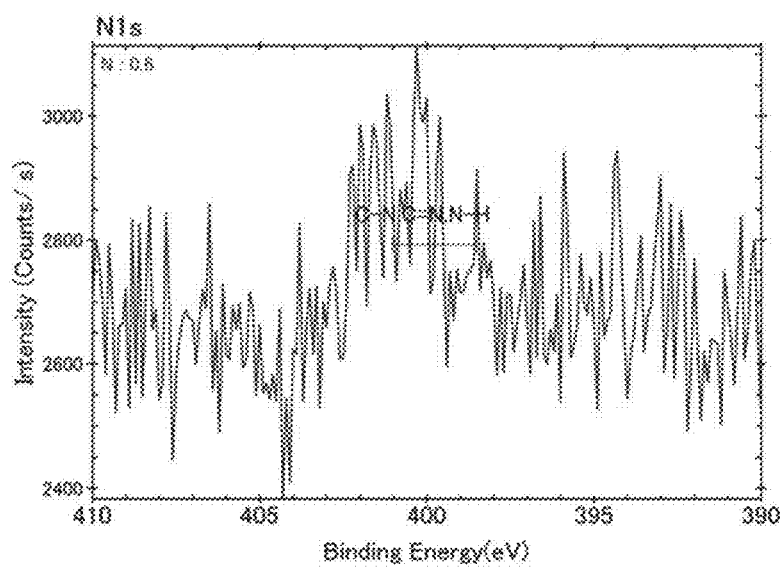
Figure 47A:
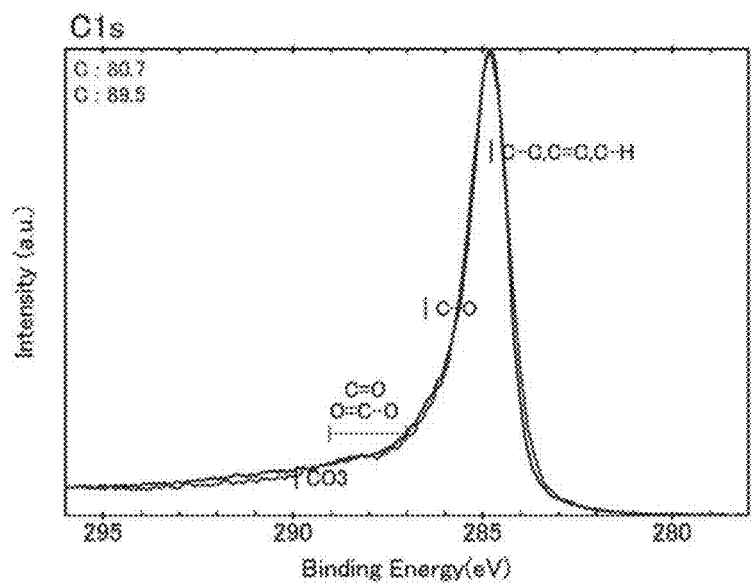
FIGS. 47A and 47B show XPS analysis results.
Figure 47B:
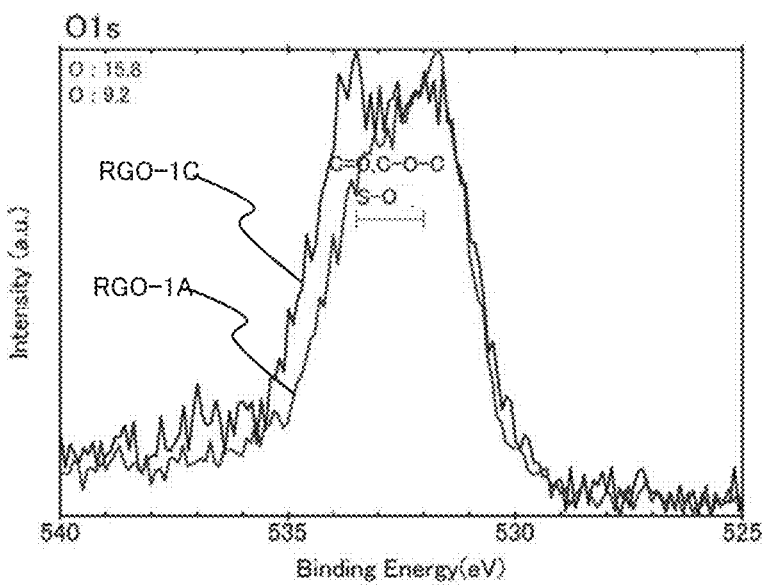
Figure 48A:
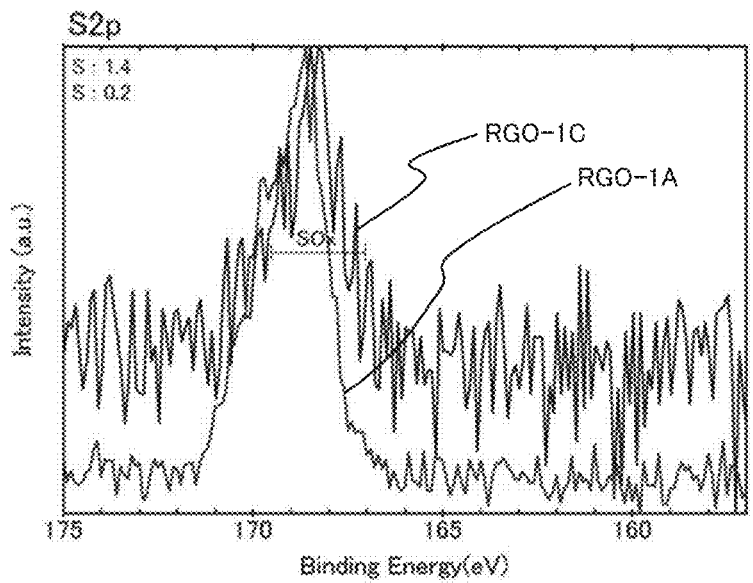
FIGS. 48A and 48B show XPS analysis results.
Figure 48B:
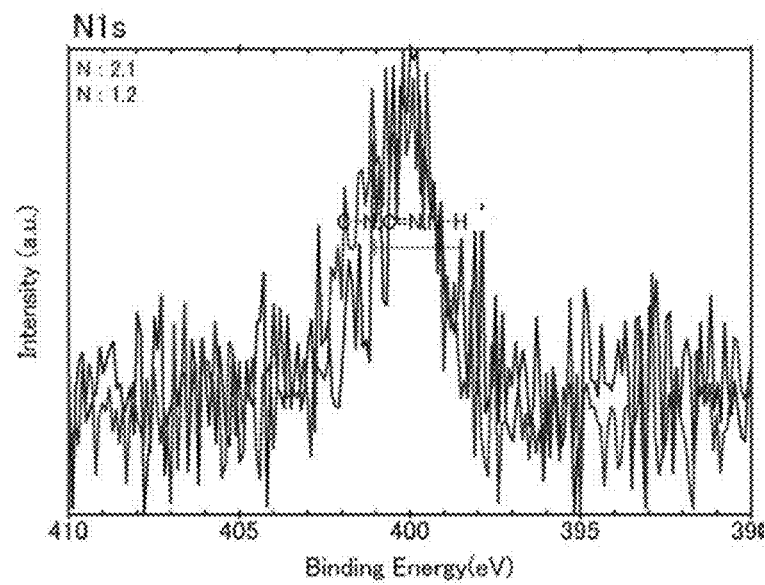

Next, XRD evaluation was performed. The XRD evaluation results of GO-1, RGO-1A, and RGO-1B are shown in FIG. 44A, FIG. 44B, and FIG. 44C, respectively. As each of RGO-1A and RGO-1B, two samples were fabricated under the same conditions. The samples of RGO-1A and the samples of RGO-1B were fabricated in different lots. The evaluation results are shown by a solid line and a dashed line in FIGS. 44B and 44C.

Peaks were observed at around 9°, around 22°, and around 23° in in FIG. 44A, FIG. 44B, and FIG. 44C, respectively, and thus it is suggested that the average values of the interlayer distances in GO-1, RGO-1A, and RGO-1B are approximately 0.98 nm, approximately 0.40 nm, and approximately 0.39 nm, respectively. Here, the term "around" means±0.7° or ±0.5° of an angle "2θ" measured by XRD evaluation, for example. That is, "around 9°" is, for example, greater than or equal to 8.3° and less than or equal to 9.7°, or greater than or equal to 8.5° and less than or equal to 9.5°.

Next, XPS analysis was performed. First, the result of GO-1 is shown.

The quantification values (unit: atomic %) of elements of carbon, oxygen, sulfur, and nitrogen in GO-1 were 63.7, 33.5, 2.3, and 0.6, respectively.

FIG. 45A, FIG. 45B, FIG. 46A, and FIG. 46B show a C1s spectrum of carbon, an O1s spectrum of oxygen, a S2p spectrum of sulfur, and a N1s spectrum of nitrogen, respectively.

Next, the XPS analysis results of RGO-1A and RGO-1C are shown.

The quantification values (unit: atomic %) of elements of carbon, oxygen, sulfur, and nitrogen in RGO-1A were 80.7, 15.8, 1.4, and 2.1, respectively.

The quantification values (unit: atomic %) of elements of carbon, oxygen, sulfur, and nitrogen in RGO-1C were 89.5, 9.2, 0.2, and 1.2, respectively.

FIG. 47A, FIG. 47B, FIG. 48A, and FIG. 48B show a c1s spectrum of carbon, an O1s spectrum of oxygen, a S2p spectrum of sulfur, and a N1s spectrum of nitrogen, respectively, of RGO-1A and RGO-1C.

Example 2

In this example, a method for forming the conductor of one embodiment of the present invention and the physical property and characteristics thereof are described.

<Treatment with Solvent>

A solvent was applied to GO-1 of the graphene compound sheet obtained in Example 1. Specifically, NMP was dropped over GO-1 and then applied using a blade with a gap of 100 μm. After that, the solvent was volatilized (a graphene compound sheet obtained by the treatment with the solvent is referred to as GO-2). As the solvent, NMP was used.

<Reduction>

Next, GO-2 was subjected to reduction treatment. As conditions for the reduction treatment, two conditions were employed. A conductor which was subjected to heat treatment at 250° C. for 10 hours is referred to as RGO-2A, a conductor which was subjected to heat treatment at 300° C. for 10 hours is referred to as RGO-2B.

<Evaluation of Conductor or the Like>

Next, evaluation results of the physical properties and characteristics of GO-2, RGO-2A, and RGO-2B are described.

The electrical conductivities of RGO-2A and RGO-2B were 86 S/cm and 101 S/cm, respectively. The electrical conductivity of GO-2 was lower than or equal to the lower measurement limit.

The XRD evaluation results of GO-2 and RGO-2A are shown in FIGS. 49A and 49B.

A peak at around 8° and a broad peak at around 16° are observed in FIG. 49A. It is suggested that the interlayer distances at the peaks in GO-2 are approximately 1.1 nm and approximately 0.50 nm.

A peak was observed at around 25° in FIG. 49B, and thus it is suggested that the average of the interlayer distances in RGO-2A is approximately 0.36 nm.

Figure 50A:
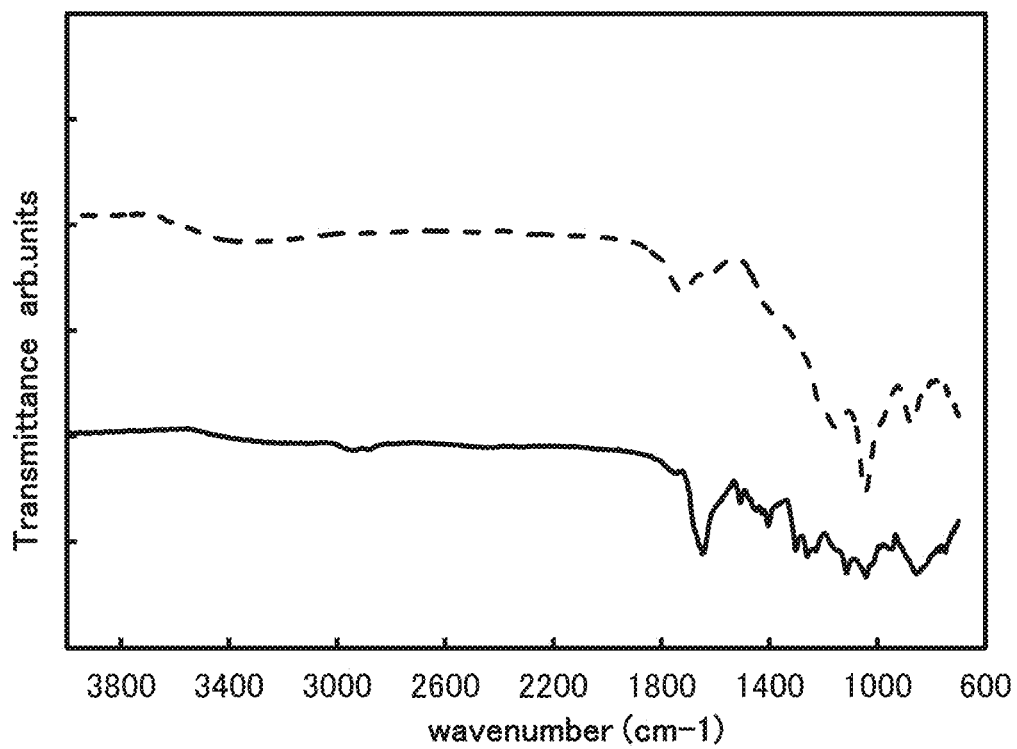
FIGS. 50A and 50B show FT-IR evaluation results.

FIG. 50A shows FT-IR evaluation results of GO-1 formed in Example 1 and GO-2 formed in this example. The evaluation result of GO-1 is shown by a dashed line, and the evaluation result of GO-2 is shown by a solid line. In the FT-IR, the measurement was performed by attenuated Total Reflection, and cadmium telluride mercury detector was used as a detector.

As shown in FIG. 50A, in GO-1, peaks were observed in ranges of wavenumbers of 1250 $cm^{-1}$ to 1000 $cm^{-1}$, 1620 $cm^{-1}$ to 1680 $cm^{-1}$, and 1750 $cm^{-1}$ to 1650 $cm^{-1}$, which are considered to show a C—O bond, a C=C bond, and a C=O bond, respectively. In GO-2, the ratio of the peak intensity and the peak position were different from those in GO-1, and a slightly strong peak was observed at around 1640 $cm^{-1}$. Furthermore, a peak was observed at around 1045 $cm^{-1}$ in GO-1. This peak may be derived from a sulfur compound, for example.

Figure 50B:
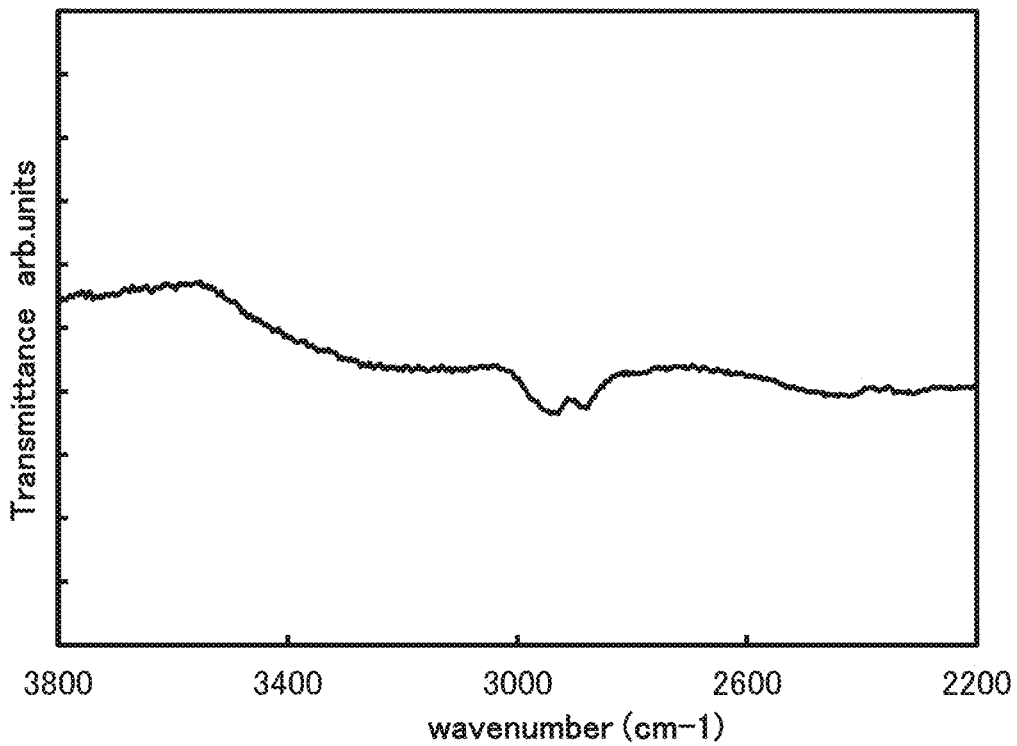

The FT-IR evaluation results suggest that in GO-2 which was subjected to drying after application of NMP, changes in the kind of a functional group and the concentration, such as a reduction in a C—O bond, were produced. Accordingly, there is a possibility that the interlayer distance was increased. Furthermore, there is a possibility that an intercalation compound was formed by existence of an element such as nitrogen between layers. FIG. 50B is an enlarged view of FIG. 50A at around 3000 cm$^{-1}$ in GO-2. Peaks were observed at around 2880 cm$^{-1}$ and around 2950 cm$^{-1}$, which are considered to show a C—H bond. It is considered that there is a possibility that H in NMP is related, for example.

Example 3

In this example, a storage battery including RGO-1A and RGO-1B formed in Example 1 in an electrode was manufactured.
<Manufacture and Evaluation of Storage Battery>
A storage battery was manufactured using RGO-1A or RGO-1B in an electrode and using a lithium metal in a counter electrode. The characteristics were measured with the use of a CR2032 coin-type storage battery (with a diameter of 20 mm and a height of 3.2 mm). As a separator, polypropylene was used. An electrolyte solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 1:1. A positive electrode can and a negative electrode can were formed of stainless steel (SUS).

Next, charging and discharging of the manufactured storage battery were performed. The measurement temperature was 25° C. Constant current charging was performed at a current density per weight of 30 mA/g with the upper voltage limit set to 4.8 V and constant current discharging was performed at a current density per weight of 30 mA/g with the lower voltage limit set to 2 V.

Figure 51A:
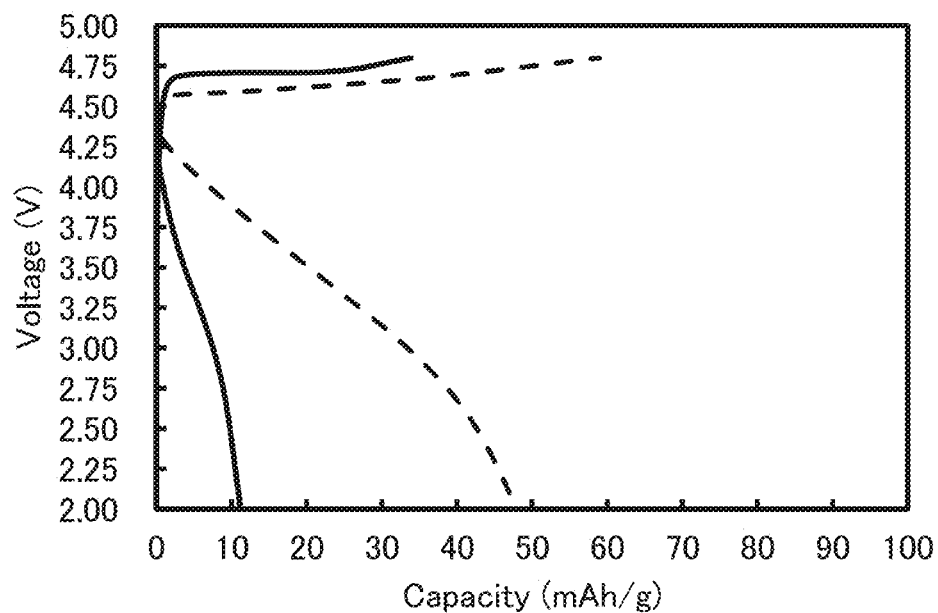
FIGS. 51A and 51B are graphs each showing charge and discharge characteristics.
Figure 51B:
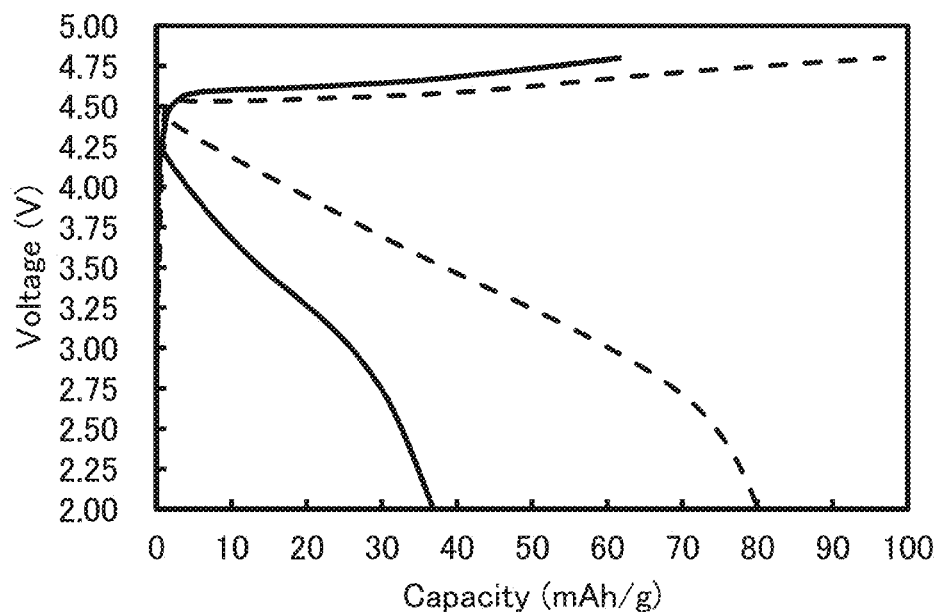

The charge and discharge characteristics of RGO-1A and RGO-1B are shown in FIGS. 51A and 51B. Samples represented by solid lines in FIGS. 51A and 51B correspond to the samples represented by the solid lines in FIGS. 44B and 44C, and samples represented by dashed lines in FIGS. 51A and 51B correspond to the samples represented by the dashed lines in FIGS. 44B and 44C. The vertical axis represents voltage, and the horizontal axis represents capacity per weight of RGO-1A or RGO-1B.

As shown in FIGS. 51A and 51B, favorable charge and discharge characteristics were obtained.

Here, it is considered that conductors such as RGO-1A and RGO-1B contribute to oxidation-reduction reaction in charging and discharging. As a reason of high capacity, there is a possibility that anions and cations were intercalated into and deintercalated from the conductor 201 in charging and discharging of a power storage device. There is a possibility that oxidation-reduction reaction occurred by intercalation and deintercalation of anions or cations. As the anion and the cation, a lithium ion or an ion other than a lithium ion included in an electrolyte solution can be given. Alternatively, it is considered that there is a possibility that decomposition product of an electrolyte solution, such as Li$_2$CO$_3$ or Li$_2$O, was precipitated on a surface of the sheet-like conductor and an electrochemical reaction by a peroxide ion occurs.

Example 4

In this example, an electrode which includes GO-1 formed in Example 1 as a current collector and is described in Embodiment 2 as an example was formed.
[Synthesis of Lithium-Manganese Composite Oxide]
Using any of the active materials described in Embodiment 2 as a raw material, Li$_2$CO$_3$, MnCO$_3$, and NiO were mixed at a ratio of Li$_2$CO$_3$:MnCO$_3$:NiO=0.84:0.8062:0.318.

After that, baking was performed at 1000° C., so that Sample A which is a lithium-manganese composite oxide including nickel was fabricated.
<Coating>
Next, graphene oxide dispersion liquid was formed. Water was used as a solvent. The concentration of graphene oxide was 2 weight %.

300 g of the obtained Sample A was added to the graphene oxide dispersion liquid in which the content of graphene oxide is 6 g and mixed to obtain Solution A. After that, heat treatment was performed on Solution A at 50° C. under reduced pressure, so that Mixture B was obtained.

Next, Mixture B which was subjected to the heat treatment was added to a reducing solution, and heat treatment was performed at 60° C. for three hours, so that Solution C was obtained. In the reducing solution, ascorbic acid was used as a reducing agent, an ethanol water solution at a concentration of 80 vol % was used as a solvent, lithium hydroxide at a concentration of 3.90 weight % was added to Sample A, and the concentration of the ascorbic acid was 16.87 weight % with respect to Sample A.

Next, Solution C was collected with a centrifuge to obtain Mixture D. After that, Mixture D was ground in an alumina mortar, and Mixture D which was ground was subjected to heat treatment at 170° C. under a reduced pressure for 10 hours to obtain Sample E. Sample E includes a lithium-manganese composite oxide. The lithium-manganese composite oxide includes nickel. A surface of the lithium-manganese composite oxide is coated with a graphene compound.
<Formation of Electrode>
Next, Sample E, AB, PVDF, and NMP were mixed to form Mixture F. In Mixture F, the compounding ratio of Sample E:AB:PVDF was set to 90:5:5 (weight %). Next, Mixture F to be the layer 102 was applied to GO-1. After that, heat treatment was performed at 80° C. for 30 minutes, so that the NMP was volatilized. After that, an electrode was pressed with a roller press machine. After that, heat treatment was further performed at 250° C. for 10 hours, so that Electrode G including the layer 102 was formed over GO-1 which was subjected to the heat treatment. The description of the conductor 201 described in Embodiment 1 as an example can be referred to for GO-1 which was subjected to the heat treatment. GO-1 which was subjected to heat treatment is referred to as the conductor 201.

Figure 57:
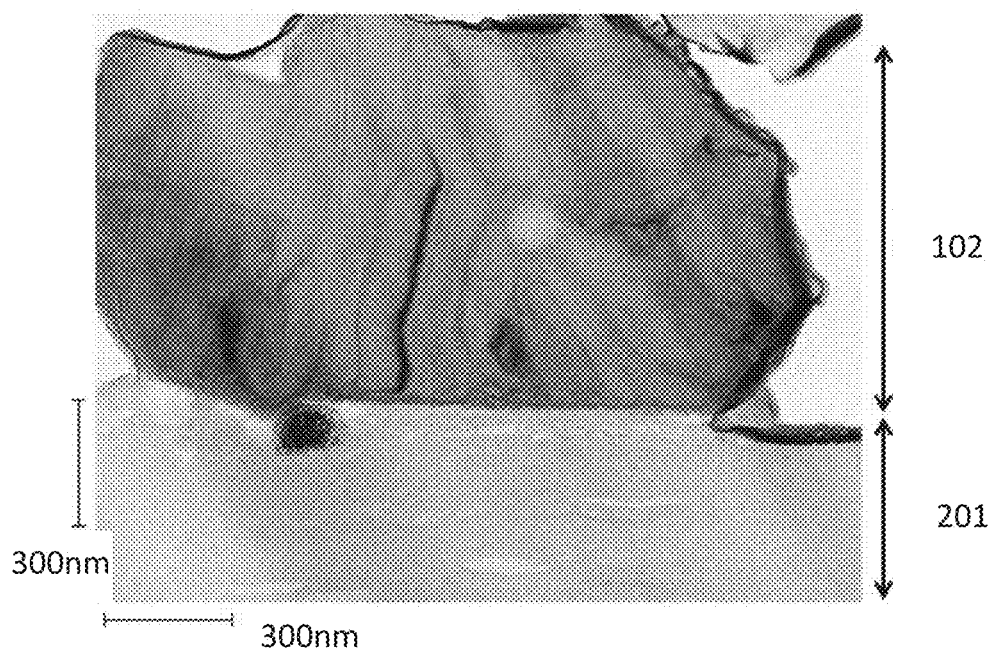
FIG. 57 shows a cross-sectional TEM observation result.
Figure 58:
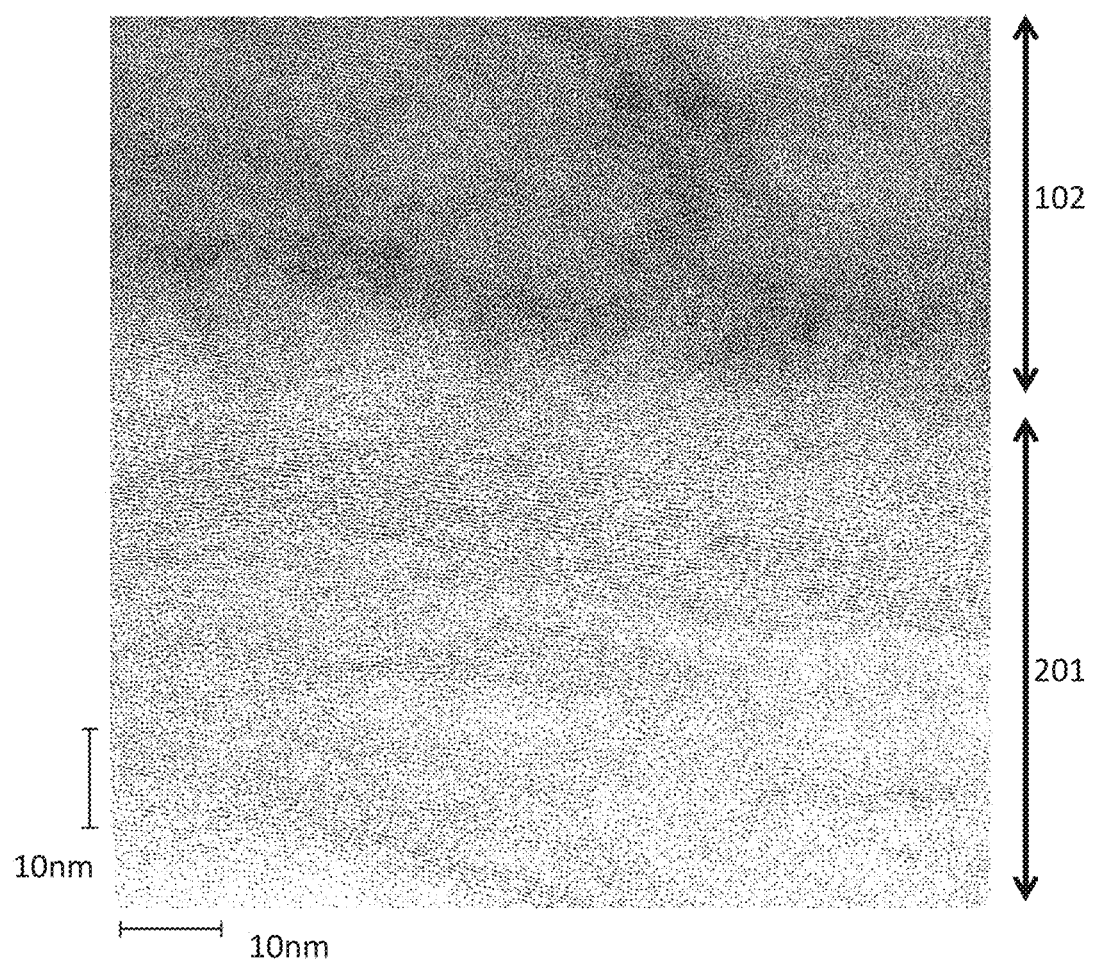
FIG. 58 shows a cross-sectional TEM observation result.

Furthermore, Electrode H was formed in such a manner that Mixture F was applied to aluminum foil, and then the NMP was volatilized, and pressing and the subsequent heat treatment were performed under conditions similar to those of Electrode G.
<Tem Observation>
FIG. 57 is a TEM photograph of a cross section of Electrode G. FIG. 58 is a photograph of Electrode G observed at higher magnification.
<Evaluation of Electrode>
A storage battery was manufactured using obtained Electrodes G and H. A lithium metal was used for a counter electrode. The characteristics were measured with the use of a CR2032 coin-type storage battery (with a diameter of 20 mm and a height of 3.2 mm). As a separator, polypropylene was used. An electrolyte solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 1:1. A positive electrode can and a negative electrode can were formed of stainless steel (SUS). Here, the weight ratio of Sample E and the conductor 201 in Electrode G per unit area was 1:0.54.

Next, charging and discharging of the manufactured storage battery were performed. The measurement temperature was 25° C. Constant current charging was performed at a current density per Sample E weight of 30 mA/g with the upper voltage limit set to 4.8 V and constant current discharging was performed at a current density per weight of 30 mA/g with the lower voltage limit set to 2 V.

Figure 52A:
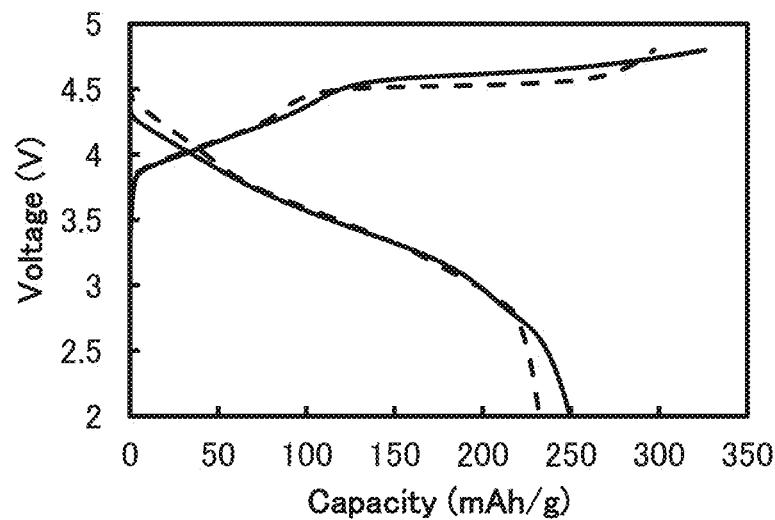
FIGS. 52A and 52B are graphs each showing charge and discharge characteristics.
Figure 52B:
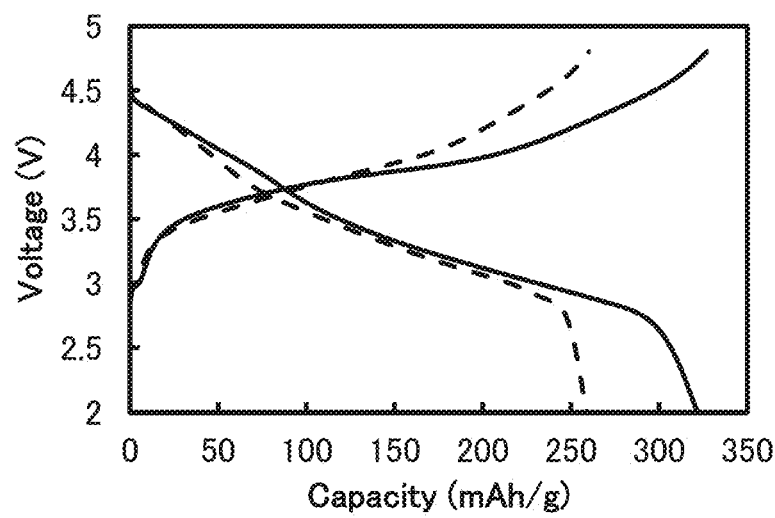

The charge and discharge characteristics of the storage battery including Electrode G and Electrode H are shown in FIGS. 52A and 52B. Electrode G is shown by a solid line, and Electrode H is shown by a dotted line. FIG. 52A shows charge and discharge curves in a first cycle, and FIG. 52B shows charge and discharge curves in a tenth cycle. The vertical axis represents voltage, and the horizontal axis represents capacity normalized by weight of Sample E.

In FIG. 52B, discharge capacities of Electrodes G and H were 322 mAh/g and 259 mAh/g, respectively. The maximum discharge capacity of the conductor 201 (which corresponds to RGO-1A) was 48 mAh/g. Accordingly, the maximum contribution obtained by the reaction of the conductor 201 with respect to the whole discharge capacity can be estimated to be 48×0.54=30 [mAh/g]. Accordingly, the capacity of Electrode G is estimated to be higher than that of Electrode H by 30 mAh/g. However, the result of FIG. 52B shows that the capacity of Electrode G is higher than that of Electrode H by 63 mAh/g. Accordingly, the capacity of the conductor 201 might be increased with the increasing number of charge and discharge cycles. Alternatively, the conductor 201 and Sample E, AB, or PVDF might be reacted by charge and discharge, or the reaction with NMP used in the formation of Electrode G might make a contribution.

Next, Mixture F was applied to a sheet 1103 which was covered with an undercoat over an aluminum current collector to form a layer 1102 in order to investigate reaction between the layer 102 and the conductor 201. After that, GO-1 was placed over the layer 1102 and subjected to heat treatment at 250° C. GO-1 which was subjected to the heat treatment is referred to as a conductor 1201.

Figure 59:
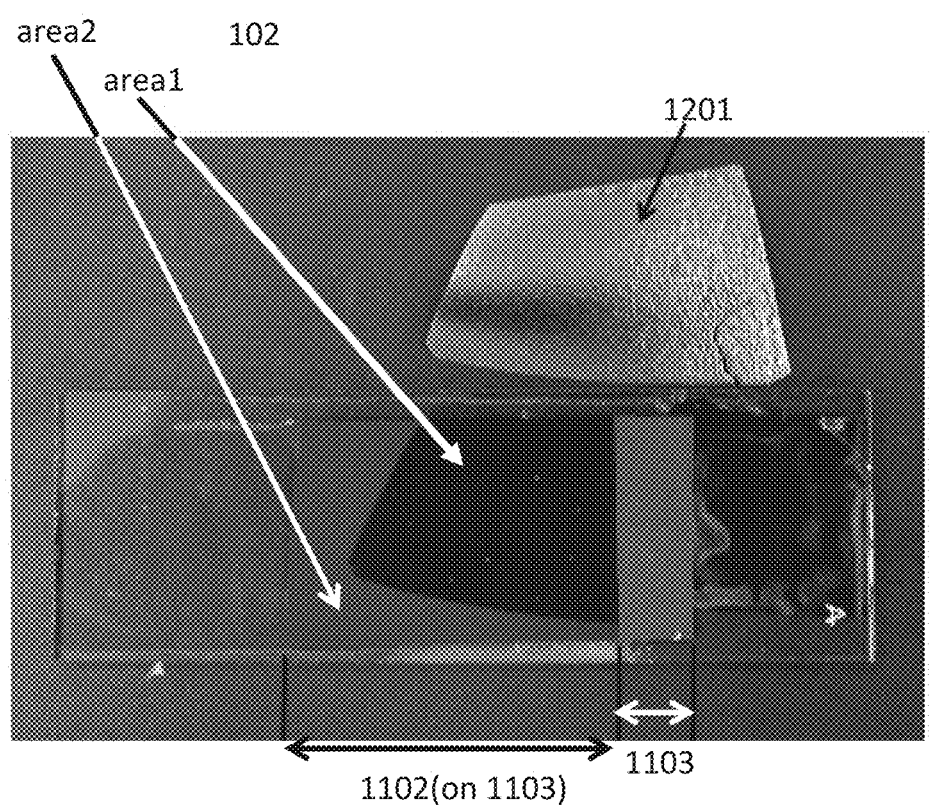
FIG. 59 is a photograph showing an experimental result.

After that, the conductor 1201 was peeled off. FIG. 59 is a photograph of the layer 1102 and the conductor 1201 after the peeling. A region where the conductor 1201 overlapped with the layer 1102 is referred to as area 1, and a region where the conductor 1201 did not overlap with the layer 1102 is referred to as area 2.

Figure 60A:
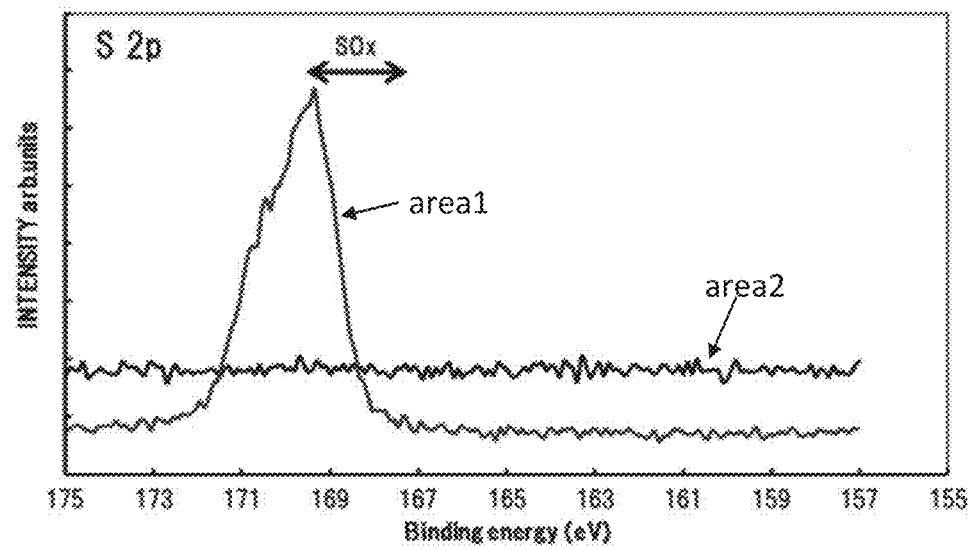
FIGS. 60A and 60B show XPS analysis results.
Figure 60B:
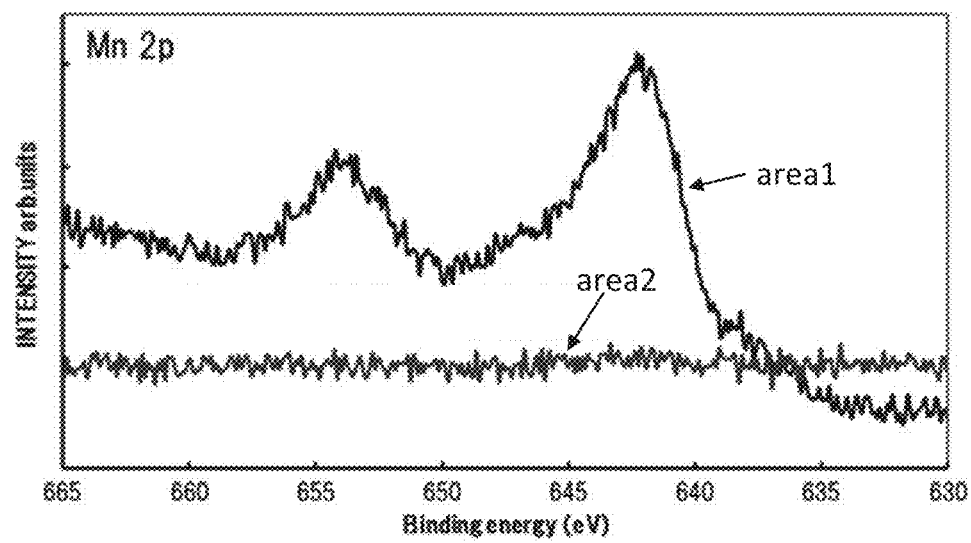

FIGS. 60A and 60B show XPS measurement results of the area 1 and the area 2. FIG. 60A shows S2p spectra of sulfur, and FIG. 60B shows Mn2p spectra of manganese.

In the region which overlapped with the conductor 1201, a peak indicating existence of a sulfur compound was detected. The concentration of sulfur in the area 1 which was detected by XPS was 5.7 atomic %, and the concentration of sulfur in the area 2 which was detected by XPS was 0 atomic %.

Furthermore, in the area which overlapped with the conductor 1201, almost no peak indicating existence of manganese was detected. Accordingly, there is a possibility that a layer including sulfur was formed over the layer 1102 in the area 1. The concentration of manganese in the area 1 which was detected by XPS was 0 atomic %, and the concentration of manganese in the area 2 which was detected by XPS was 6.0 atomic %. Sulfur included in GO-1 might be precipitated at an interface between GO-1 and the layer 1102, which suggests a possibility that a reaction occurred between the conductor 1201 and the layer 1102.

This application is based on Japanese Patent Application serial no. 2015-128002 filed with Japan Patent Office on Jun. 25, 2015, the entire contents of which are hereby incorporated by reference.

What is claimed is:

1. A power storage device comprising:
a conductor comprising a graphene compound,
wherein an interlayer distance between adjacent layers in the graphene compound is longer than or equal to 0.335 nm and shorter than or equal to 0.7 nm,
wherein an area of the conductor is larger than or equal to 25 mm$^2$ and smaller than or equal to 10 m$^2$, and
wherein the conductor is configured to function as a current collector.

2. The power storage device according to claim 1, wherein a proportion of carbon in the graphene compound is higher than 80% with respect to the whole conductor.

3. The power storage device according to claim 1, wherein a thickness of the graphene compound is greater than or equal to 800 nm and less than or equal to 20 µm.

4. The power storage device according to claim 1, wherein a length of one side of the graphene compound is greater than or equal to 50 nm and less than or equal to 100 µm.

5. The power storage device according to claim 1, wherein the graphene compound at least comprises one of epoxy group, carboxy group, and hydroxyl group bonded to carbon.

6. The power storage device according to claim 1, wherein the graphene compound is a graphene compound sheet.

7. A power storage device comprising:
a positive electrode;
a negative electrode; and
a conductor comprising a graphene compound,
wherein an interlayer distance between adjacent layers in the graphene compound is longer than or equal to 0.335 nm and shorter than or equal to 0.7 nm,
wherein an area of the conductor is larger than or equal to 25 mm$^2$ and smaller than or equal to 10 m$^2$,
wherein the conductor comprises a region whose electrical conductivity is greater than or equal to 0.1 S/cm and less than or equal to 10$^7$ S/cm, and
wherein the conductor is configured to function as a current collector.

8. The power storage device according to claim 7, wherein a proportion of carbon in the graphene compound is higher than 80% with respect to the whole conductor.

9. The power storage device according to claim 7, wherein a thickness of the graphene compound is greater than or equal to 800 nm and less than or equal to 20 µm.

10. The power storage device according to claim 7, wherein a length of one side of the graphene compound is greater than or equal to 50 nm and less than or equal to 100 µm.

11. The power storage device according to claim 7, wherein the graphene compound at least comprises one of epoxy group, carboxy group, and hydroxyl group bonded to carbon.

12. The power storage device according to claim 7, wherein the graphene compound is a graphene compound sheet.

13. A conductor,
a conductor,
wherein the conductor is obtained by subjecting a graphene compound sheet to thermal reduction and chemical reduction after the thermal reduction, wherein the thermal reduction is performed at a temperature higher than or equal to 120° C. and lower than or equal to 400° C.,
wherein the chemical reduction is performed at a temperature higher than or equal to 40° C. and lower than or equal to 70° C.,
wherein an electrical conductivity of the conductor is S/cm, and
wherein the conductor is configured to function as a current collector.

14. The power storage device according to claim 13, wherein ascorbic acid is used as a reducing agent in the chemical reduction.

* * * * *